US010337884B2

(12) United States Patent
Wahdan et al.

(10) Patent No.: US 10,337,884 B2
(45) Date of Patent: Jul. 2, 2019

(54) METHOD AND APPARATUS FOR FAST MAGNETOMETER CALIBRATION

(71) Applicant: Trusted Positioning Inc., Calgary (CA)

(72) Inventors: Ahmed Wahdan, Calgary (CA); Jacques Georgy, Calgary (CA); Walid Abdelfatah, Calgary (CA); Aboelmagd Noureldin, Calgary (CA)

(73) Assignee: InvenSense, Inc., San Jose, CA (US)

( * ) Notice: Subject to any disclaimer, the term of this patent is extended or adjusted under 35 U.S.C. 154(b) by 95 days.

(21) Appl. No.: 14/764,470

(22) PCT Filed: Mar. 5, 2014

(86) PCT No.: PCT/CA2014/000175
§ 371 (c)(1),
(2) Date: Jul. 29, 2015

(87) PCT Pub. No.: WO2014/134710
PCT Pub. Date: Sep. 12, 2014

(65) Prior Publication Data
US 2015/0354980 A1 Dec. 10, 2015

Related U.S. Application Data

(60) Provisional application No. 61/772,699, filed on Mar. 5, 2013.

(51) Int. Cl.
*G01C 25/00* (2006.01)
*G01C 17/02* (2006.01)
*G01C 17/38* (2006.01)

(52) U.S. Cl.
CPC .......... *G01C 25/00* (2013.01); *G01C 17/02* (2013.01); *G01C 17/38* (2013.01)

(58) Field of Classification Search
CPC ...... G01C 25/00; G01C 25/005; G01C 17/02; G01C 17/38; G01R 35/00; G01R 33/0035
USPC .... 324/202; 702/92, 141, 150, 151, 153, 93, 702/152, 15; 33/356
See application file for complete search history.

(56) References Cited

U.S. PATENT DOCUMENTS 7,451,549 B1 * 11/2008 Sodhi ...................... G01C 17/38
33/356
2005/0138825 A1 * 6/2005 Manfred ................ G01C 17/38
33/356
2005/0242800 A1 * 11/2005 Heger .................... G01V 13/00
324/67

(Continued)

*Primary Examiner* — Jeff W Natalini
*Assistant Examiner* — Steven L Yeninas
(74) *Attorney, Agent, or Firm* — Bay Area Technology Law Group PC

(57) ABSTRACT

A method and apparatus for fast magnetometer calibration with little space coverage is described herein. The present method and apparatus is capable of performing both 2-dimensional (2D) and 3-dimensional (3D) calibration for a magnetometer (magnetic sensor) and calculating calibration parameters. The present method and apparatus does not need the user to be involved in the calibration process and there are no required specific movements that the user should perform. The present method and apparatus performs magnetometer calibration in 2D or 3D depending on the natural device movements whatever the application that the magnetometer is used in.

22 Claims, 40 Drawing Sheets

(56) References Cited

U.S. PATENT DOCUMENTS

| | | | | |
|---|---|---|---|---|
| 2007/0156337 A1* | 7/2007 | Yanni | G01C 21/165 | |
| | | | 701/469 | |
| 2011/0077889 A1* | 3/2011 | Vogt | G01C 17/38 | |
| | | | 702/93 | |
| 2011/0248704 A1* | 10/2011 | Chowdhary | G01C 17/38 | |
| | | | 324/202 | |
| 2012/0086438 A1* | 4/2012 | Tu | G01R 33/0035 | |
| | | | 324/202 | |
| 2012/0101762 A1* | 4/2012 | Almalki | G01C 17/38 | |
| | | | 702/85 | |
| 2013/0006573 A1* | 1/2013 | Brunner | G01C 17/38 | |
| | | | 702/141 | |
| 2013/0320966 A1* | 12/2013 | Oliver | G01R 33/0035 | |
| | | | 324/202 | |

* cited by examiner

Figure 25B

| | |
|---|---|
| 101 | Start Post Calibration Checks Routine |
| 102 | Input: Current Working parameters |
| 103 | Call QualityChecksRoutine |
| 104 | Quality checks Passed? |
| 105 | Take another set of points from collection buffer and Call QualityChecksRoutine |
| 106 | Is Shelf empty? |
| 107 | Quality checks Passed? |
| 108 | Is Shelf empty? |
| 109 | Empty Data collection buffer |
| 110 | Is Shelf empty ? |
| 111 | Perform Quality checks on parameters in Shelf |
| 112 | Quality checks Passed? |
| 113 | WorkingParameters = Parameters in Shelf |
| 114 | Keep shelved parameters |
| 115 | Return : Post Calibration Checks Failed |
| 116 | Empty Shelf |
| 117 | Return: Post Calibration Checks Succeeded, WorkingParameters |
| 118 | Compare with parameters in Shelf |
| 119 | Shelf parameters are better? |
| 120 | Keep shelved parameters in Shelf |
| 121 | WorkingParameters = Parameters in Shelf |
| 122 | WorkingParameters = new calibration parameters |
| 123 | Empty Shelf |

Figure 26B

| | | | |
|---|---|---|---|
| 201 | Start Periodic Checks Routine | | |
| 202 | Input: Current Working parameters | 222 | Keep current Working parameters |
| 203 | Call QualityChecksRoutine forWorking parameters | 223 | Compare with parameters in shelf |
| 204 | Quality checks Passed? | 224 | Shelf parameters are better? |
| 205 | Check the Number of periodic checks succeeded for the current working parameters | 225 | WorkingParameters = Parameters in Shelf |
| | | 226 | Empty Shelf |
| 206 | Is Shelf empty? | 227 | Increment the counter of periodic checks that succeeded for Working parameters |
| 207 | Number of periodic checks succeeded > =1? | 228 | Is Shelf empty? |
| 208 | Is Shelf empty? | 229 | Shelf parameters = WorkingParameters |
| 209 | Is Shelf empty? | 230 | Keep shelved parameters |
| 210 | Shelf parameters = WorkingParameters | | |
| 211 | Call QualityChecksRoutine for parameters in shelf | | |
| 212 | Return : Periodic Calibration Failed | | |
| 213 | Shelved parameters passed Quality Checks? | | |
| 214 | Replace parameters in Shelf with Working parameters | | |
| 215 | Swap WorkingParameters with Parameters in Shelf | | |
| 216 | Return: Periodic Succeeded, WorkingParameters | | |
| 217 | Call QualityChecksRoutine for parameters in shelf | | |
| 218 | Shelf parameters passed Quality Checks? | | |
| 219 | WorkingParameters = Parameters in Shelf | | |
| 220 | Keep shelved parameters in Shelf | | |
| 221 | Empty Shelf | | |

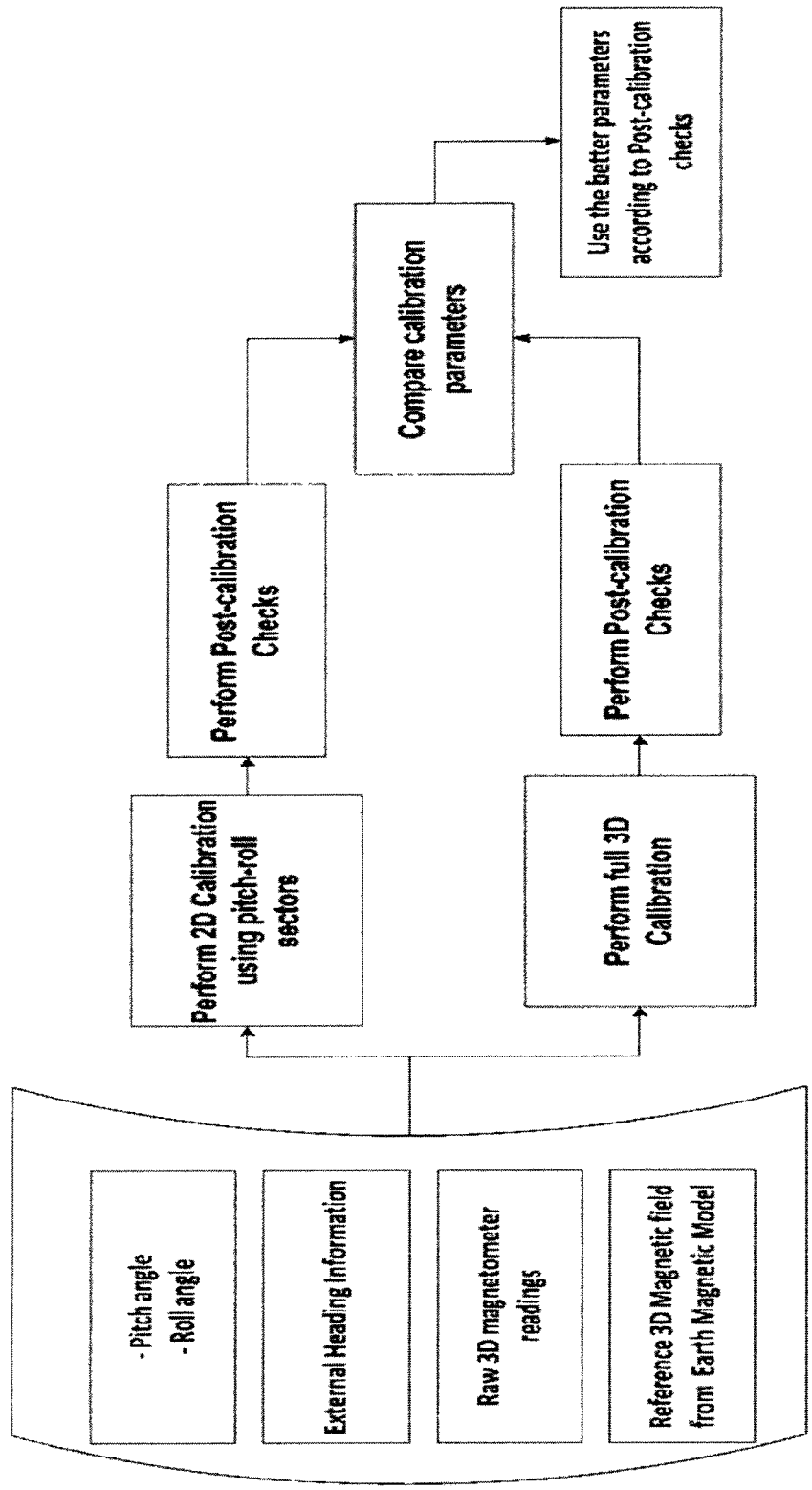

Main operation routine

Figure 28B

| 301 | Start iteration |
|---|---|
| 302 | Call MagnetometerCalibrationRoutine |
| 303 | UseMagFlag == 1? |
| 304 | Magnetometer is not used for heading calculation this iteration, UseMagFlag =0; |
| 305 | Is it time for periodic Check |
| 306 | Call Periodic Check routine |
| 307 | Periodic Check routine returns success |
| 308 | Magnetometer is used for headig calculation, UseMagFlag = 1; |
| 309 | Magnetometer is not used for headig calculation this iteration, UseMagFlag =0; |
| 310 | Output: UseMagFlag , Calibration parameters |
| 311 | Output: UseMagFlag = 0 |
| 312 | End of Iteration |

Magnetometer Calibration Routine Part1

Figure 29B

| 401 | Start Magnetometer Calibration Routine |
| --- | --- |
| 402 | Inputs: -Saved "Working parameters" If not empty and "0" if empty  -Saved "Shelf parameters" If not empty and "0" if empty |
| 403 | Is 2D pitch-roll sector Y maintained? |
| 404 | Check why 2D pitch-roll sector is not maintained |
| 405 | Turn ON data Collection for 3D calibration and 2D calibration in pitch-roll sector Y |
| 406 | Is there oscillation between pitch-roll sectors with high frequency? |
| 407 | Turn ON 3D data collection |
| 408 | Switch current pitch-roll sector to new sector Y = New pitch-roll sector |
| 409 | 3D Calibration Parameters are saved earlier ? |
| 410 | Call QualityChecksRoutine for the save 3D calibration parameters |
| 411 | 3D Collection is done? |
| 412 | Do not use magnetometer this iteration |
| 413 | Perform 3D calibration |
| 414 | Call post calibration routine with 3D calibration parameters |
| 415 | Post calibration returns success? |
| 416 | Use 3D calibration parameters as working parameters |
| 417 | Quality Checks succeed? |
| 418 | Use 3D saved calibration parameters as working parameters |
| 419 | Are there saved 2D calibration parameters for pitch-roll sector Y? |
| 420 | Call QualityChecksRoutine for the save 2D calibration parameters |
| 421 | Quality Checks succeed? |
| 422 | Use 2D saved calibration parameters as working parameters |
| 423 | Return: UseMagFlag = 1, Calibration parameters |
| 424 | Return: UseMagFlag = 0, Calibration parameters |
| 425 | A |

Magnetometer Calibration Routine Part2

Figure 30B

| 425 | A |
|---|---|
| 501 | (2D Collection ready OR 2D Calibration parameters are saved earlier for pitch-roll sector Y) AND (3D Collection Data is not ready AND 3D Calibration parameters are not saved earlier)? |
| 502 | (3D Collection ready OR 3D Calibration parameters are saved earlier) AND (2D Collection Data is not ready for pitch-roll sector Y AND 2D Calibration parameters are not saved earlier for pitch-roll sector Y)? |
| 503 | Are 2D Calibration parameters saved earlier for pitch-roll sector Y? |
| 504 | Use 2D Calibration parameters |
| 505 | Perform 2D Calibration |
| 506 | Call Post calibration routine with 2D parameters |
| 507 | Post calibration returns success? |
| 508 | Do not use magnetometer this iteration |
| 509 | Return: UseMagFlag = 0 |
| 510 | 3D Calibration parameters are saved earlier? |
| 511 | Perform 3D Calibration |
| 512 | Call Post calibration routine with 3D parameters |
| 513 | Post calibration returns success? |
| 514 | Use 3D Calibration parameters |
| 515 | Return: UseMagFlag = 1, Calibration parameters |
| 516 | B |

Magnetometer Calibration Routine Part3

Figure 31B

| | B | |
|---|---|---|
| 516 | | 618 | 3D parameters are better |
| 601 | (3D Collection ready OR 3D Calibration parameters are saved earlier for pitch-roll sector Y) AND (2D Collection Data is ready OR 2D Calibration parameters are saved earlier) | | Perform 3D Calibration |
| 602 | 3D Calibration Parameters are saved earlier AND 2D Calibration Parameters are saved earlier? | 621 | Perform 3D Calibration |
| 603 | 3D Calibration Parameters are saved earlier AND 2D Calibration collection is done for current pitch-roll sector? | 622 | Perform 3D Calibration |
| 604 | Perform 2D Calibration | 623 | Call Post calibration routine with 3D parameters |
| 605 | Call Post calibration routine with 2D parameters | 624 | Call Post calibration routine with 2D parameters |
| 606 | Post calibration routine returns success? | 625 | Post calibration routine returns success in both 2D and 3D? |
| 607 | Compare with 3D saved parameters | 626 | Post calibration routine returns success in 2D only? |
| 608 | 2D parameters are better? | 627 | Compare between 2D and 3D calibrations |
| 609 | Use saved 3D calibration parameters as Working parameters | 628 | Is 2D calibration better? |
| 610 | Use new 2D calibration parameters as Working parameters | 629 | Use 2D calibration parameters as Working parameters |
| 611 | Use Calibration parameters which were used in the previous iteration | 630 | Use 2D calibration parameters as Working parameters |
| 612 | 2D Calibration Parameters are saved earlier for current pitch-roll sector AND 3D collection is done? | 631 | Use 3D calibration parameters as Working parameters |
| 613 | Perform 3D Calibration | 632 | Post calibration routine returns success in 3D only? |
| 614 | Call Post calibration routine with 3D parameters | 633 | Use 3D calibration parameters as Working parameters |
| 615 | Post calibration routine returns success | 634 | Do not use magnetometer this iteration |
| 616 | Compare with 2D saved parameters | 635 | Return UseMagFlag = 0 |
| 617 | Use saved 2D calibration parameters as Working parameters | 636 | Return : UseMagFlag =1 , Working Calibration parameters |

METHOD AND APPARATUS FOR FAST MAGNETOMETER CALIBRATION

RELATED APPLICATIONS

This application claims the benefit of U.S. Provisional Patent Application No. 61/772,699 filed Mar. 5, 2013, which is hereby incorporated by reference.

TECHNICAL FIELD

The present disclosure relates to a method and apparatus for calibrating a magnetometer (also known as magnetic sensor) in order to get calibration parameters to correct magnetometer sensor readings.

BACKGROUND OF THE INVENTION

Determining the direction of motion (the heading) is an old problem that faced travelers, sailors, or anyone seeking to know their position accurately. Sensing the earth magnetic field was used long ago for finding direction using magnetic compasses. The earth's magnetic field can be expressed as a dipole magnet where the magnetic north and south poles lie in an axis that does not coincide with the earth's true north and south poles. The difference between the true north and the magnetic north defines an angle called "declination angle" that should be accounted for when determining heading using magnetometer.

The electronic compass is an electronic device that includes magnetometers (magnetic sensors) that are capable of measuring the Earth's magnetic field. Magnetometers have many applications, such as calculating the heading of a vehicle or a pedestrian relative to the earth's magnetic north. A 2-dimensional (2D) electronic compass senses magnetic field via two orthogonally placed magnetometers by which heading can be calculated when the compass is placed in horizontal plane. A 3-dimensional (3D) electronic compass uses three orthogonally placed magnetometers to measure the magnetic field. Heading can be calculated from a 3D electronic compass if the pitch and roll angles are known. Pitch and roll can be used for levelling the 3D magnetometer readings. Heading can be obtained from the 2 levelled horizontal magnetometer readings as follows:

$$\text{Heading} = -\arctan\left(\frac{M_y}{M_x}\right) \quad (1)$$

where $M_y$ and $M_x$ represent the two levelled measurements of the earth's magnetic field vector in a coordinate system attached to the compass body while Heading is the angle the device makes with the magnetic north.

Magnetometer readings are usually affected by magnetic fields other than the earth's magnetic field; the effects of these fields are not negligible so they result in an inaccurate heading measurement due to corrupted magnetometer readings. Therefore a calibration procedure should be applied to the electronic compass to correct the effect of these interfering fields.

Some examples of different error sources and their effects on magnetometer are as follows (among others):

(i) Hard iron effect which is considered as a constant offset added to each axis of sensor output. This kind of distortion comes from permanent magnets or magnetized iron or steel placed close to the magnetic sensor. If the hard iron distortion source is attached to the same reference frame of the sensor the offset remains constant for all heading orientations.

(ii) Soft iron distortion which arises from the interaction of earth's magnetic field and any magnetically soft iron material such as nickel or iron. Soft iron distortion distorts the earth's magnetic field lines depending on which direction the field acts relative to the sensor. In most cases hard iron distortion will have a much larger contribution to the total error than soft iron.

(iii) Different sensitivities of magnetometer sensors in different axes are one source of error. For example for a triad of magnetometers, the three orthogonally mounted magnetometers are not identical as they have different sensitivities. Therefore when all three magnetometers are subjected to an identical magnetic field, the observed output from each will not be the same due to scale factor errors.

(iv) Other error sources may be due to different factors such as sensor material, sensor fabrication, and temperature.

The above list represents examples of the sources of errors that affect magnetometer sensors. The effects of error sources appear in corrupted magnetometer readings. Calibration parameters can be calculated to correct these readings where each calibration parameter can correct for the effects of one or more error sources. For example when bias is calculated for a magnetometer reading, the bias can be used to correct the reading from both hard iron effects as well as any offset-type error source, whether because of sensor material, sensor fabrication, or temperature. Another example occurs when scale factor is calculated for a magnetometer reading; in such a case the scale factor can be used to correct the reading from sensitivity effects, part of the soft iron effects, as well as any scale factor-type errors source, whether because of sensor material, sensor fabrication, or temperature.

Different approaches are used for calibrating magnetometers; the main goal of magnetometers calibration is to use magnetometers as a heading source. One of the old and well known methods for calibrating a compass is compass swinging. Compass swinging was used for compass calibration for heading determination in marine and aviation when other absolute navigation information systems (such as GPS) were not available. The procedure involves leveling and rotating the vehicle or the aircraft containing the compass through a series of known headings, like performing compass swinging on a compass rose at an airport, or using a calibrated master compass to align the aircraft during the swing which indicates that another heading source is required for calibration. The main drawbacks of using traditional compass swinging are that the method is limited to use with two-axis systems as it cannot be used to calibrate a 3D compass, and that it requires the user to be instructed to rotate the compass in certain predefined directions. Another approach for compass calibration that does not require an external heading source to perform the calibration is depending on that if the compass is rotated, assuming there is no ferrous interference with the earth's field, the locus made by magnetometer readings in 2D forms a circle, similarly in 3D the locus forms a sphere. In some implementations it is assumed that if a 2D compass is rotated in normal operation conditions (in the presence of ferrous interference) the locus of its readings forms a translated hyperbolic shape in case of 2D for example among others, an ellipse, while in 3D it forms a translated hyperboloid shape for example among others, an ellipsoid. This is due to the effects of perturbation caused by ferrous materials such as biases (hard iron effects) in magnetometer readings, scale factors, soft iron effects, etc.

Either geometric or mathematical based methods can be used to best fit the magnetometer measurements to the assumed manifold, for example, an ellipse in case of 2D or to an ellipsoid in case of 3D. The main drawback of this approach is that it requires the device having the magnetometers rotate at least 360 degrees in horizontal plane in case of 2D. In case of 3D, a rotation should cover a significant portion of an ellipsoid (if the ellipsoid is the assumed locus); this requires rotating the device having the magnetometers in all directions. This drawback makes the calibration process slow, or may require the user to move the device in certain movement (for example a figure eight), or rotate the vehicle for one complete loop to cover 360 degrees. In the latter scenarios the user becomes involved in the calibration process which is not efficient in daily life scenarios when the user requires an accurate heading from his portable device, for example smart phone or personal navigator or from his vehicle navigation device without getting involved in a calibration process. One available method used for magnetometer calibration exploits the minimum and maximum values of measurements collected during a full rotation of the leveled sensor in the horizontal plane to estimate the scale factors and biases of the compass. This method shares the same drawback of requiring a full rotation which makes the calibration process slower or involves the user to be instructed to rotate the sensor to cover certain orientations.

Thus there is a need for a method and apparatus capable of mitigating such drawbacks by being able to perform fast magnetometer calibration with little space coverage that neither requires performing full rotation of the device nor involves the user to be instructed to rotate the sensor to cover certain orientations.

SUMMARY

The present disclosure relates to a method and apparatus for fast magnetometer calibration with little space coverage, and capable of performing both 2-dimensional (2D) and 3-dimensional (3D) calibration for the magnetometer (magnetic sensor). The present method and apparatus for magnetometer calibration involves calculating calibration parameters and using them to correct the 2D or the 3D magnetometer readings.

One of the advantages of the present method and apparatus is that it uses natural motion and does not need the user to be involved in the calibration process so the calibration can be performed automatically; there are no instructions or certain specific movements for the device that the user should perform to obtain calibration results. The present method and apparatus performs magnetometer calibration in 2D or 3D depending on the regular device movements (natural motion) whatever the application that the magnetometer is used in.

In some embodiments reference earth magnetic field information in the region where the calibration is performed is used. Earth magnetic field information can be obtained according to any model that describes the earth magnetic field, and examples on how earth magnetic field information can be obtained during calibration according to the earth magnetic field model used include (among others): (i) the earth magnetic field model can be saved on the memory of the device performing the magnetometer calibration and when the earth magnetic field information is needed, it is calculated from the model directly, (ii) the earth magnetic field information obtained from the model used can be saved on the device memory where it is accessed when the earth magnetic field information is needed for calibration, or (iii) the earth magnetic field information or model is obtained from outside the device through a communication means whether wireless or wired. Some examples of the information that may be required from the earth magnetic field model are (among others) the value of the components of the magnetic field vector (from which the horizontal field magnitude, or the 3D magnitude of the magnetic field can be calculated), and the declination angle. To get this information from the earth magnetic field model the position of the device on earth in terms of latitude and longitude is required.

In some embodiments the present method and apparatus uses an external heading source to be used during calibration to supply different readings of the device heading. In some other embodiments no external heading source is used to perform magnetometer calibration, in cases where the calibration does not require the device heading as an input to the calibration method.

In some embodiments the present method and apparatus uses the pitch and roll angles of the device including the magnetometer to perform calibration.

In some embodiments the present method and apparatus performs magnetometer calibration in 2D space, in this case 2D calibration parameters are calculated in horizontal plane.

In one of these embodiments, the present apparatus may include a device having the magnetometer mounted horizontally to a moving platform where the moving platform is regularly moving in horizontal plane. The magnetometer readings can be taken directly from the magnetic sensor and 2D calibration can be performed. In another one of these embodiments, the device that includes the magnetometer is not mounted horizontally with the moving platform but tethered in a non-horizontal position. In this embodiment, levelling the magnetometer readings is completed before applying the 2D magnetometer calibration. The aforementioned two embodiments share the following inputs for 2D calibration (i) raw magnetometer readings, (ii) an external heading source, and (iii) a reference horizontal magnetic field for a certain region on earth at which the calibration is performed. The earth horizontal magnetic field can be acquired according to any model for the earth magnetic field. In the second case of the aforementioned embodiments there are other inputs utilized including the pitch and roll angles to be used for levelling. Knowing different heading values and the horizontal magnetic field together with either levelled or originally horizontal (or near horizontal) magnetometer 2D readings, a mathematical calculation or an estimation approach can be used to determine the calibration parameters.

In some embodiments the present method and apparatus performs magnetometer calibration in 3D space.

In some of these embodiments the present method and apparatus can perform magnetometer calibration in 3D space using 2D calibration equations together with pitch and roll angles to divide the 3D space into a group of pitch and roll sectors where 2D calibration equations can be applied on levelled magnetometer readings in each sector. In these embodiments the space in which the device moves in is divided into a group of pitch and roll ranges, where a certain range of pitch and a certain range of roll can form what is referred to as a "pitch-roll sector". Using pitch-roll sectors, 2D magnetometer calibration equations can perform a 3D space calibration for a magnetometer without the need of calibrating the magnetometer's levelled vertical reading. In these embodiments before magnetometer calibration is performed, the pitch-roll sector in which the device is placed or held is determined using pitch and roll angles. After determining the pitch-roll sector different magnetometer calibration techniques can be applied in which data collection is performed according to the technique used before calibration. In one of the embodiments in which the magnetometer calibration in 3D space is performed using 2D calibration equations in pitch-roll sectors, the following inputs are used: (i) raw magnetometer readings, (ii) an external heading source, (iii) reference horizontal magnetic field acquired using an earth magnetic model, and (iv) pitch and roll values for levelling magnetometer readings and for detecting pitch-roll sectors. The raw 2D magnetometer levelled readings are represented as functions of calibration parameters in the horizontal plane, together with the horizontal earth magnetic field acquired according the earth magnetic field model used. For each axis in the horizontal plane an equation relating the device heading, the levelled raw magnetometer reading represented as a function of the reference magnetometer horizontal field (acquired according to any earth magnetic field model), and unknown calibration parameters can be solved using different heading values to calculate unknown calibration parameters for each axis in the horizontal plane. Mathematical or estimation approaches for example Least Square (LS) can be used to solve for 2D calibration parameters and using different heading values with pitch and roll used for levelling magnetometer readings. After 2D calibration parameters are calculated for a pitch-roll sector, whenever the device moves so that its pitch and roll falls in this pitch-roll sector, calibration parameters are applied directly to calibrate the 2D levelled magnetometer readings. If obtaining heading is the application for which the 2D magnetometer calibration is performed, then heading can be calculated whenever data collection is completed in a given pitch-roll sector, calibration is accomplished, and the device is placed or held in a way its pitch and roll fall in this sector.

In one embodiment the present method and apparatus can perform magnetometer calibration in 3D space using 3D calibration equations when an external heading is available during calibration. To calculate 3D calibration parameters in the device frame some inputs are utilized. The inputs for such 3D calibration include (i) raw magnetometer readings, (ii) an external heading source, (iii) reference 3D earth magnetic field components for a certain region in earth in which the calibration is performed (the earth magnetic field components may be acquired according to any earth magnetic model), and (iv) pitch and roll values. Using heading value with the corresponding pitch and roll values can be used for transforming the reference earth magnetic field components acquired according to the earth magnetic field model which are in local level frame (such as North-East-Down (NED) frame) to be in device frame. Different sets of heading, pitch, and roll values are collected to solve calibration equations for calculating 3D calibration parameters. The raw 3D magnetometer readings are represented as functions of calibration parameters together with earth magnetic field components acquired according the earth magnetic field model used. Mathematical or estimation approaches such as for example Least Square (LS) can be used to solve for 3D calibration parameters using different sets of readings including heading, pitch and roll.

In some embodiments the present method and apparatus can perform magnetometer calibration in 3D space using 3D calibration equations when no external heading is available during calibration, or when a 3D magnetometer calibration is required without depending on external heading source. In this embodiment the inputs include (i) raw magnetometer readings, (ii) reference 3D earth magnetic field components for a certain region in earth at which calibration is performed (the earth magnetic field components can be acquired according to any earth magnetic model), and (iii) a source providing gravity acceleration. The source providing the gravity acceleration can be, for example, any of the following among others: (i) a model for gravity that is able to calculate the free fall acceleration value in certain region on earth, together with pitch and roll values, (ii) readings of a sensor capable of providing the gravity vector, for example accelerometer readings or filtered/smoothed accelerometer readings (for example averaged accelerometer readings). In this embodiment the external heading values are not necessary for calculating 3D calibration parameters. In some embodiments what is used are different pitch and roll values during calibration together with a gravity model. In this case, the 3D calibration parameters are calculated after collecting pitch and roll values, the gravity value is acquired from the gravity model used; the gravity vector in a local level frame can assume zero components in north and east directions, while the effective nonzero component is the component in the vertical direction which value is the one acquired from the gravity model. This gravity vector in the local level is rotated using pitch and roll to provide the gravity vector in the device frame. The 3D earth's magnetic field vector in local level frame is represented in three components: one pointing to the earth's north, one to the east and one pointing vertically and the components are taken from the earth magnetic field model directly when the region on earth is known. The same 3D earth's magnetic field vector can be represented in the device frame as a function of the 3D magnetometer readings with the 3D calibration parameters as unknowns. The angle between the gravity vector and the 3D magnetic field vector is constant in any frame (device frame or local level frame) so the dot product between the gravity vector and the earth magnetic field vector in local level frame is equal to the dot product between the gravity vector and the earth magnetic field vector in the device frame. Depending on this relation, mathematical or estimation approaches for example Least Square (LS) can be used to get calibration parameters.

In one embodiment the present method and apparatus can be used for 2D magnetometer calibration when external heading is available during calibration.

In another embodiment the present method and apparatus can be used for 3D space magnetometer calibration using 2D magnetometer calibration equations with pitch-roll sectors when external heading is available during calibration.

In another embodiment the present method and apparatus can be used for 3D space magnetometer calibration using 3D magnetometer calibration equations when external heading is available during calibration.

In another embodiment the present method and apparatus can be used for 3D space magnetometer calibration using 3D magnetometer calibration when there is no external heading available during calibration equations.

In some embodiments, 3D space calibration can be performed using more than one approach at the same time. In some of these embodiments 2D magnetometer calibration using pitch-roll sectors to calibrate the 3D space is used simultaneously with 3D magnetometer calibration to calculate calibration parameters. In this embodiment both 2D calibration using pitch-roll sectors and 3D calibrations can run together, and when data collection is done for one of them, the calibration parameters can be used to correct magnetometer readings. 2D calibration using pitch-roll sectors and 3D calibrations can work simultaneously and parameters calculated by 2D calibration using pitch-roll sectors can replace parameters calculated by 3D calibration and vice versa when data collection is done, then a determination can be made as to which parameters will be used after comparing the different sets of parameters calculated.

In some embodiments, when no external heading is available, the embodiment that performs calibration in 3D space using 3D calibration equations without depending on an external heading source can be used for 3D magnetometer calibration. If the external heading source becomes available later, any of the 3D space calibration embodiments that depend on external heading source including 2D calibration using pitch-roll sectors and/or 3D calibration can be used in any of the following fashions: (i) determining which parameters are the preferred parameters to be used to correct the magnetometer reading and keeping the preferred parameters, (ii) discarding the calibration parameters calculated when external heading was not available and using new calibration parameters calculated after heading becomes available, (iii) combining the parameters with the calibration parameters calculated when heading was not available (such as for example the two sets of calibration parameters can be averaged), or (iv) the parameters can be used simultaneously and a comparison can be made determining which parameters are the better parameters to be used to correct the magnetometer reading.

If some or all of the criteria required for performing 2D and/or 3D magnetometer calibration described in the previous embodiments were not available, any other calibration technique can be applied for magnetometer calibration for example (among others) ellipse/ellipsoid fitting which can either work solely or simultaneously with one or more of the embodiments described herein in which a determination is made on which parameters are used based on a comparison.

Optionally in some embodiments, the present method and apparatus may have an optional quality check routine that can be called after calibration parameters are calculated. This post calibration check routine is optionally called directly after the calibration parameters are calculated to check whether the calibration parameters are valid or not, and the parameters are not valid a recalibration is conducted which may require new data collection.

Optionally in some embodiments, the present method and apparatus may have an optional quality check routine that can be called periodically after the calibration is done. The time period that is used for calling the periodic checks routine depends on the calibration type whether 2D or 3D or both, and on the application for which magnetometer calibration is required. This periodic check routine is optionally called to check whether the calibration parameters are valid or not every certain time period, and if the parameters are not valid a recalibration is conducted which may require new data collection. This check can be useful in case calibration parameters are calculated when the device was in a certain environment and the environment has changed, for example if the user entered a steel elevator after he or she was walking in a different environment.

Optionally in some embodiments, the present method and apparatus may have both a post calibration check routine and periodic check routine, where the post calibration check routine can be called directly after the calibration parameters are calculated to check whether the calibration parameters are valid or not, and the periodic check routine can be called to check whether the calibration parameters are valid or not every certain time period. If either the post calibration check routine or the periodic check routine return that the calibration parameters are not valid, a recalibration is conducted which may require new data collection.

Optionally in some embodiments, the calibration parameters can be shelved and saved for future use even if a quality check routine is called and returns that the parameters are invalid. Some benefits of shelving the parameters for future use is when calibration parameters are calculated and pass several periodic quality checks, then fail a check, in which case discarding these parameters and recollecting data for a recalibration may not be the best decision because the failure in checks can be due a temporary change in the environment which when ends, the shelved parameters can be applied directly after performing quality checks instead of waiting for new data collection.

Any one or any combination from all the above embodiments and/or optional routines can be used.

A method for fast magnetometer calibration from natural motion with little space coverage is provided, the method including the steps of: a) obtaining earth magnetic field information in a region where the magnetometer is located, the magnetic field information to be used as reference values; b) collecting magnetometer readings; c) determining sufficient space coverage; and d) performing magnetometer calibration to calculate calibration parameters when the sufficient space coverage is available.

The method may be for performing 2-dimensional magnetometer calibration, wherein the earth magnetic field information is horizontal earth magnetic field information; wherein the method further includes obtaining heading information from a source different from the magnetometer, the heading information to be used as a second reference; wherein determining sufficient space coverage uses the heading information; and wherein the 2-dimensional calibration uses a relationship between the horizontal earth magnetic field information, the magnetometer readings, the heading information, and the calibration parameters.

The method may be for performing 3-dimensional magnetometer calibration utilizing 2-dimensional calibration and different sectors covering pitch and roll angles, wherein the earth magnetic field information is horizontal earth magnetic field information; wherein the method further includes obtaining heading information from a source different from the magnetometer, the heading information to be used as a second reference; wherein the method further includes obtaining pitch and roll angles; wherein the method further includes using the pitch and roll angles to level the magnetometer readings; wherein the method further includes using the pitch and roll angles to determine a current sector; wherein determining sufficient space coverage for the current sector uses the heading information; and wherein the 2-dimensional calibration for the current sector uses a relationship between the horizontal earth magnetic field information, the levelled magnetometer readings, the heading information, and the calibration parameters.

The method may be for performing 3-dimensional magnetometer calibration utilizing heading information from a source different from the magnetometer, wherein the method further includes obtaining heading information to be used as a second reference; wherein the method further includes obtaining pitch and roll angles; wherein determining sufficient space coverage uses the heading information and one or both of the pitch and roll angles; and wherein the 3-dimensional calibration uses a relationship between the earth magnetic field information, the magnetometer readings, the pitch and roll angles, the heading information, and the calibration parameters.

The method may be for performing 3-dimensional magnetometer calibration utilizing gravity acceleration, wherein the method further includes obtaining gravity acceleration;

wherein the method further includes obtaining pitch and roll angles; wherein determining sufficient space coverage uses the pitch and roll angles; and wherein the 3-dimensional calibration uses a relationship between the earth magnetic field information, the magnetometer readings, the pitch and roll angles, the gravity acceleration, and the calibration parameters.

The method may be for performing 3-dimensional magnetometer calibration; and wherein the method utilizes any one or any combination of the following: (i) 2-dimensional calibration and use of different sectors covering pitch and roll angles; (ii) 3-dimensional calibration using heading information from a source different from the magnetometer; or (iii) 3-dimensional calibration using gravity acceleration.

The method may further include quality checks to determine if the calibration parameters are valid. The method may include a post-calibration quality check to determine if the calibration parameters are valid. The may include conducting a periodic quality check that is called periodically starting after the calibration is done to check whether the calibration parameters are valid. The method may include storing the calibration parameters. The method may include shelving the calibration parameters for future use. The shelving of the calibration parameters may happen even if quality checks determine that the calibration parameters are not valid.

A device is provided, including: a magnetometer; and a processor, coupled to receive readings from the magnetometer, and operative to perform magnetometer calibration from natural motion with little space coverage, wherein the processor is operative to: i) obtain earth magnetic field information in a region where the magnetometer is located, the magnetic field information to be used as reference values; ii) collect magnetometer readings; iii) determine sufficient space coverage; and iv) perform magnetometer calibration to calculate calibration parameters when the sufficient space coverage is available.

The processor may be operative to perform 2-dimensional magnetometer calibration; wherein the earth magnetic field information is horizontal earth magnetic field information; wherein the processor is further operative to obtain heading information from a source different from the magnetometer to be used as a second reference; wherein the determination of sufficient space coverage uses the heading information, and wherein the 2-dimensional calibration uses a relationship between the horizontal earth magnetic field information, the magnetometer readings, the heading information, and the calibration parameters.

The processor may be operative to perform 3-dimensional magnetometer calibration utilizing 2-dimensional calibration and different sectors covering pitch and roll angles; wherein the earth magnetic field information is horizontal earth magnetic field information; wherein the processor is further operative to obtain heading information from a source different from the magnetometer to be used as a second reference; wherein the processor is further operative to obtain pitch and roll angles; wherein the processor is further operative to use the pitch and roll angles to level the magnetometer readings; wherein the processor is further operative to use the pitch and roll angles to determine the current sector; wherein the determination of sufficient space coverage for the current sector uses the heading information, and wherein the 2-dimensional calibration for the current sector uses a relationship between the horizontal earth magnetic field information, the levelled magnetometer readings, the heading information, and the calibration parameters.

The processor may be operative to perform 3-dimensional magnetometer calibration utilizing heading information from a source different from the magnetometer; wherein the processor is further operative to obtain heading information to be used as a second reference; wherein the processor is further operative to obtain pitch and roll angles; wherein the determination of sufficient space coverage uses the heading information and one or both of the pitch and roll angles, and wherein the 3-dimensional calibration uses a relationship between the earth magnetic field information, the magnetometer readings, the pitch and roll angles, the heading information, and the calibration parameters.

The processor may be operative to perform 3-dimensional magnetometer calibration utilizing gravity acceleration; wherein the processor is further operative obtain gravity acceleration; wherein the processor is further operative to obtain pitch and roll angles; wherein the determination of sufficient space coverage uses the pitch and roll angles, and wherein the 3-dimensional calibration uses a relationship between the earth magnetic field information, the magnetometer readings, the pitch and roll angles, the gravity acceleration, and the calibration parameters.

The processor may be operative to perform 3-dimensional magnetometer calibration; and wherein the processor is operative to utilize any one or any combination of the following: (i) 2-dimensional calibration use of different sectors covering pitch and roll angles; (ii) 3-dimensional calibration using heading information from a source different from the magnetometer; or (iii) 3-dimensional calibration using gravity acceleration.

The magnetometer is a two-axial magnetometer or a tri-axial magnetometer, and may be part of a plurality of sensors. The device may include a receiver for receiving absolute navigational information about the device from an external source.

DESCRIPTION OF THE DRAWINGS

FIGS. 25A and 25B show a flow chart showing a routine that performs post calibration quality checks on calibration parameters according to an embodiment of the invention.

FIGS. 26A and 26B show a flow chart showing a routine that performs periodic quality checks on calibration parameters according to an embodiment of the invention.

FIG. 27 is a block diagram showing the performance of 2D and 3D online magnetometer calibration together for heading calculation in pedestrian navigation when heading information is available according to an embodiment of the invention.

FIGS. 28A and 28B show a flow chart showing the main operation routine at each time epoch according to an embodiment of the invention.

FIGS. 29A and 29B show a flow chart showing the first part of a routine that can perform magnetometer calibration according to an embodiment of the invention.

FIGS. 30A and 30B show a flow chart showing the second part of a routine that can perform magnetometer calibration according to an embodiment of the invention.

FIGS. 31A and 31B show a flow chart showing the third part of a routine that can perform magnetometer calibration according to an embodiment of the invention.

DETAILED DESCRIPTION

Figure 1:
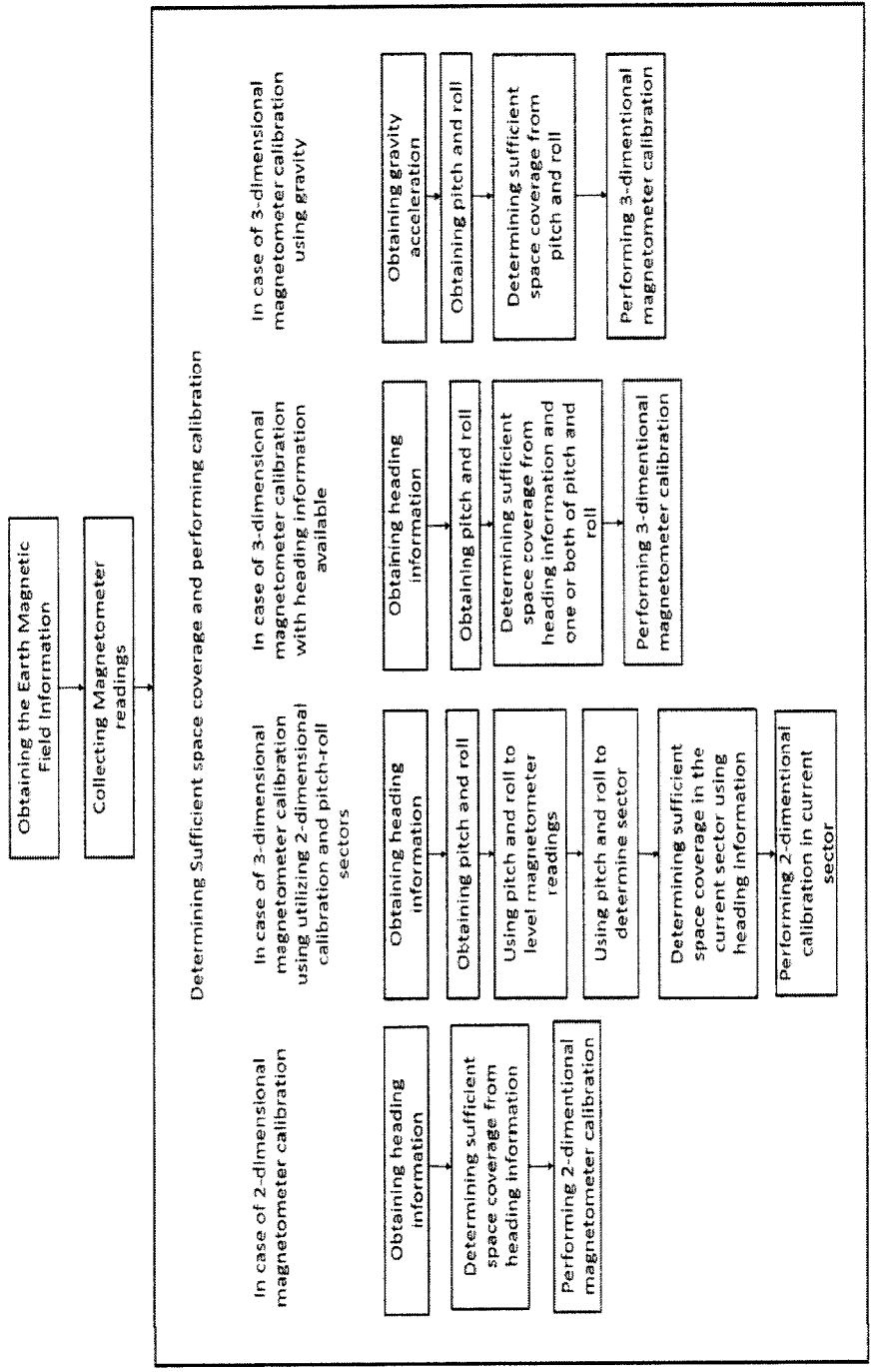
FIG. 1 is a flow chart showing an embodiment of the method according to the invention.

The present disclosure relates to a method and apparatus for fast magnetometer calibration with little space coverage. The present method and apparatus is capable of performing both 2-dimensional (2D) and 3-dimentional (3D) calibration for magnetic sensors. The calibration involves calculating calibration parameters and using them to correct the 2D or 3D magnetometer.

One of the advantages of the present method and apparatus is that it is fully automatic, meaning that it depends on "natural motion" that the device or apparatus including the magnetometer is undergoing; in which the user does not need to be involved in the calibration process, meaning that there are no instructions or certain specific movements for the device that the user must perform to obtain calibration results. The present method and apparatus performs magnetometer calibration in 2D or 3D depending on the regular device movements (referred to as "natural motion") performed by the user whatever the application the magnetometer is used in.

Another advantage of the present method and apparatus is that little "space coverage" that can be achieved by the "natural motion" is sufficient to achieve magnetometer calibration. Based on the different cases of 2D and 3D calibration, the term "sufficient space coverage" is defined later.

Absolute navigational information is information related to navigation and/or positioning and is provided by "reference-based" systems that depend upon external sources of information, for example GNSS. Self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers and gyroscopes.

In some embodiments reference earth magnetic field information in the region where the calibration is performed should be provided to the present method and apparatus. Earth magnetic field information can be obtained according to any model that describes the earth magnetic field (for example the International Geomagnetic Reference Field (IGRF) model). Examples on how earth magnetic field information can be obtained according to the earth magnetic field model used include (among others): (i) the model can be saved in the memory of the device performing the magnetometer calibration and whenever earth magnetic field information is needed, it is calculated from the model directly, (ii) the earth magnetic field information obtained from the model can be saved in the device memory where it is accessed when earth magnetic field information is needed for calibration, or (iii) the earth magnetic field information or model is obtained from outside the device through a communication means whether wireless or wired. Some examples of the information that may be required from the earth magnetic field model are (among others) the value of the components of the magnetic field vector (from which the horizontal field magnitude, or the 3D magnitude of the magnetic field can be calculated), and the declination angle. To get this information from the earth magnetic field model the position of the device on earth in teens of latitude and longitude is required. Therefore in order to acquire the earth's magnetic field information the position of the device on earth in terms of latitude and longitude is required. Determining this position can be done using any absolute navigation information updates (such as, for example, GNSS, WiFi, or any other wireless technique), or an integrated navigation system integrating any absolute navigation system with any sensor or sensors (such as gyroscopes, accelerometers, barometer, odometer).

In some embodiments the present method and apparatus requires an external heading source to be used during calibration to supply different readings of the device heading. In some other embodiments no external heading source is required to perform magnetometer calibration, as the calibration does not require the device heading as an input to the calibration method. In some embodiments that require external heading during calibration, the device heading can be calculated using (among others): (i) any absolute navigational information (such as, for example, GNSS, WiFi, or any other wireless technique), or (ii) any integrated navigation solution using any type of integration technique and integrating different sensors and/or systems for example some or all of the following: accelerometers, gyroscopes, magnetometers, barometers, odometers, or any navigational information (for example, GNSS, WiFi, or any other wireless technique). Since the magnetometer heading is the device heading, in cases where the device and the platform may have a heading misalignment (i.e. the heading of the device is not the same as the heading of the platform), and when an absolute navigational information source is used to obtain heading, which is the platform heading, this heading will need to be compensated for the misalignment between device and platform to obtain the device heading (the external heading mentioned above).

In some embodiments the present method and apparatus requires the pitch and roll angles of the device, which includes the magnetometer, to perform calibration. The pitch and roll angles may be calculated from any one of the following among others: (i) gyroscopes through any one of different methods for example quaternions, (ii) accelerometers readings or averaged accelerometer readings (whether fixed-time average or moving average), and/or (iii) integrated navigation solution using any type of integration technique and integrating different sensors and/or systems for example some or all of the following: accelerometers, gyroscopes, magnetometers, barometers, odometers, or any navigational information updates (for example, GNSS, WiFi, or any other wireless technique).

In some embodiments the present method and apparatus performs magnetometer calibration in 2D space in which 2D calibration parameters are calculated in horizontal plane.

In one of these embodiments, the device including the magnetometer may be mounted horizontally to the moving platform (for example a vehicle) in which the moving platform is regularly moving in horizontal plane. The magnetometer readings can be taken directly from the magnetic sensor and the 2D calibration can be performed. Some example applications (among others) include using the magnetometer for heading determination in a vehicle in which the electronic compass is mounted horizontally to the vehicle body. Although a vehicle can undergo some pitch and roll changes during motion the values do not change with great extent during driving and thus are unlikely to affect the calculated calibration parameters or make them incorrect; therefore the platform (for example the vehicle) is assumed horizontal. In another embodiment of these embodiments, the device, including the magnetometer, is not mounted horizontally with the moving platform but tethered in a non-horizontal position. In this embodiment levelling the magnetometer readings is required before applying the 2D magnetometer calibration. The aforementioned two embodiments share the following required inputs for 2D calibration: (i) raw magnetometer readings, (ii) an external heading source, and (iii) reference horizontal magnetic field for a certain region on earth in which calibration is performed (the earth horizontal magnetic field can be acquired according to any model for the earth magnetic field). In the second case of the aforementioned embodiments the pitch and roll values are used as inputs for levelling. Knowing different heading values and the horizontal magnetic field, together with either levelled or originally horizontal (or near horizontal) magnetometer 2D readings, a mathematical calculation or an estimation approach can be used to get calibration parameters. Some example applications for this embodiment (among others) are when using an e-compass or a device including a magnetometer for heading determination and mounting this device to a vehicle dashboard or any other place where the e-compass or device having the magnetometer is tethered in a non-horizontal position. In the aforementioned two embodiments for each axis in the horizontal plane an equation having the device heading, the levelled raw magnetometer reading represented as a function of the reference horizontal magnetic field (acquired according to any earth magnetic field model), and unknown calibration parameters can be solved using different heading values to calculate calibration parameters for each axis in the horizontal plane.

In some embodiment the present method and apparatus performs magnetometer calibration in 3D space.

In some embodiments the present method and apparatus can perform magnetometer calibration in 3D space using 2D calibration equations together with pitch and roll angles to divide the 3D space into a group of pitch-roll sectors in which 2D calibration equations can be applied on levelled magnetometer readings in each sector. In these embodiments the space in which the device moves in is divided into a group of pitch and roll ranges, in which a certain range of pitch and a certain range of roll can form what is called a "pitch-roll sector", the pitch and roll boundaries for each sector can be defined according to an experimental analysis. In this embodiment 2D magnetometer calibration using pitch-roll sectors can perform a 3D space calibration for a magnetometer without the need of calibrating the magnetometer's levelled vertical reading. In these embodiments, before magnetometer calibration is performed, the pitch-roll sector in which the device is placed or held is determined using pitch and roll angles. After detecting the pitch-roll sector, different magnetometer calibration techniques can be applied in which data collection is performed according to the used technique before calibration.

In one of the embodiments, in which the magnetometer calibration is performed using 2D calibration equations in pitch-roll sector, the following inputs are used: (i) raw magnetometer readings, (ii) an external heading source, (iii) reference horizontal magnetic field acquired according to the earth magnetic model used, and (iv) pitch and roll values for levelling magnetometer readings and for detecting pitch-roll sectors. The raw 2D magnetometer levelled readings are represented as functions of calibration parameters in horizontal plane, together with the horizontal earth magnetic field acquired according the earth magnetic field model used. For each axis in the horizontal plane an equation relating the device heading, the levelled raw magnetometer reading represented as a function of the reference magnetometer component along this axis (acquired according to any earth magnetic field model), and unknown calibration parameters can be solved using different heading values to calculate unknown calibration parameters for each axis in the horizontal plane. Mathematical or estimation approaches, for example Least Square (LS), can be used to solve for 2D calibration parameters using different heading values with pitch and roll used for levelling magnetometer readings. After 2D calibration parameters are calculated for a pitch-roll sector, whenever the device moves so that its pitch and roll falls in this pitch-roll sector, calibration parameters are applied directly to calibrate the 2D levelled magnetometer readings. If obtaining heading is the application for which the 2D magnetometer calibration in the present method is performed, then heading can be calculated whenever the following is achieved: (a) data collection is completed in a given pitch-roll sector, (b) calibration is accomplished, and (c) the device is placed or held in a way its pitch and roll fall in this sector. Some example applications that can use this embodiment that applies 2D magnetometer calibration equations in pitch-roll sectors include (among others): heading determination using partially tethered devices (for example using a device that can be placed on a car dash board for car navigation), and heading determination using untethered devices (such as personal navigators or smart phones).

In some embodiments some conditions can be applied before applying 2D calibration parameters that are calculated for a certain pitch-roll sector, some examples for these conditions include (among others): (i) having a certain lower bound time threshold before which the calibration parameters cannot be applied for a certain pitch-roll sector, i.e. the device must remain in a certain sector for a minimum time before the calibration parameters are applied; or (ii) when the device is placed or held in certain pitch-roll sector, the time average values for both pitch and roll taken for the past samples are used for detecting the pitch roll-sector in which the device is placed or held. The number of past samples used can be defined earlier. None, all or some of these conditions or some other conditions can be applied before applying 2D calibration parameters that are calculated for a certain pitch-roll sector. Using limitations before applying 2D calibration parameters in pitch-roll sectors avoids being affected by reading blunders and noise in pitch-roll sector detection.

In some embodiments, the "pitch-roll sector" boundaries can be statically defined before data collections starts; i.e. their definition is not changed in run time. In these embodiments, the 3D space is divided into a group of pitch-roll sectors with known and defined boundaries. In some other embodiments the definition of pitch-roll sectors boundaries is done in real time, in which the sectors are defined according to the attitude of the device; whenever the device moves in the 3D space new pitch-roll sectors are created and their boundaries are defined. In these embodiments, sectors can optionally be non-overlapping or overlapping. In a case in which sectors are non-overlapping, the upper boundary of a pitch-roll sector is the lower boundary of the preceding sector and the lower boundary of a pitch-roll sector is the upper boundary of the following sector. On the other hand, in a case in which sector's overlapping is used, whenever the device moves so that its pitch and/or roll falls out of the current pitch-roll sector, a new sector is created. The new sector's median pitch angle can be the first pitch angle detected after the device moved outside the current pitch-roll sector, and its median roll angle can be the first roll angle detected after the device moved outside the current pitch-roll sector. The new sector's pitch boundaries can be the pitch median plus or minus half the sector's pitch size, and the new sector's roll boundaries can be the roll median plus or minus half the sector's roll size. The pitch and roll sizes of a pitch-roll sector can be initially defined according to the best practice.

In an embodiment of the present method and apparatus magnetometer calibration is performed in 3D space using 3D calibration equations when an external heading is available during calibration. To calculate 3D calibration parameters in the device frame some inputs are used. The inputs used for 3D calibration are: (i) raw magnetometer readings, (ii) an external heading source, (iii) reference 3D earth magnetic field components for a certain region in earth at which calibration is performed (the earth magnetic field components may be acquired according to any earth magnetic model), and (iv) pitch and roll values. Using heading value with the corresponding pitch and roll values can be used for transforming the reference earth magnetic field components (acquired according the earth magnetic field model used) which are in the local level frame in the device frame. Different sets of heading, pitch and roll values are collected before performing calibration to solve a calibration equation for calculating 3D calibration parameters. The raw 3D magnetometer readings are represented as functions of 3D calibration parameters together with earth magnetic field components acquired according the earth magnetic field model used. Mathematical or estimation approaches, for example Least Square (LS), can be used to calculate 3D calibration parameters using several sets of values including heading, and pitch, and roll. Some example applications that can use this embodiment that applies 3D magnetometer calibration are for example (among others): heading determination using un tethered devices such as personal navigators, using e-compass in a smart phone for navigation applications, getting the direction of motion using e-compass that can move freely in 3D, and using a device that can be placed on a car dash board for car navigation.

In some embodiments the present method and apparatus can perform magnetometer calibration in 3D space using 3D calibration equations when no external heading is available during calibration, or when a 3D magnetometer calibration is required without depending on external heading source. In this embodiment the inputs are: (i) raw magnetometer readings, (ii) reference 3D earth magnetic field components for a certain region in earth at which calibration is performed (the earth magnetic field components can be acquired according to any earth magnetic model) and (iii) a source providing the gravity acceleration. The source providing the gravity acceleration can be, for example, any of the following among others: (i) a model for gravity that is able to calculate the free fall acceleration value in a certain region on earth, together with pitch and roll values, (ii) readings of a sensor capable of providing the gravity vector, for example accelerometer readings or filtered/smoothed accelerometer readings (for example averaged accelerometer readings). In this embodiment the external heading values are not necessary for calculating 3D calibration parameters. In some embodiments, what is used are different pitch and roll values during calibration together with a gravity model. In this case, the way the 3D calibration parameters are calculated starts after collecting pitch and roll values; the gravity value is acquired from the gravity model used. The gravity vector in local level frame can assume zero components in north and east directions, while the effective nonzero component is the component in the vertical direction whose value is the one acquired from the gravity model. This gravity vector in the local level is rotated using pitch and roll to give the gravity vector in the device frame. The 3D earth's magnetic field vector in local level frame is represented in three components: one pointing to the earth's north, one to the east, and one pointing vertically and they are taken from the earth magnetic field model directly when the region on earth is known. The same 3D earth's magnetic field vector can be represented in the device frame as a function of the 3D magnetometer readings with the 3D calibration parameters as unknowns. The angle between the gravity vector and the 3D magnetic field vector is constant in any frame (device frame or local level frame) thus the dot product between the gravity vector and the earth magnetic field vector in local level frame is equal to the dot product between the gravity vector and the earth magnetic field vector in the device frame. Depending on this relation, mathematical or estimation approaches, for example Least Square (LS), can be used to get calibration parameters. The gravity model used to calculate the earth's gravity at a certain region of earth can take latitude and altitude values as inputs, and latitude and altitude can be calculated using any absolute navigational information (for example, GNSS, WiFi, or any other wireless technique), or an integrated navigation system integrating any absolute navigation system with any sensor or sensors (such as gyroscopes, accelerometers, barometer, odometer); while altitude may also be acquired using barometer only.

In one embodiment the present method and apparatus is used only for 2D magnetometer calibration when external heading is available during calibration. The major application for this embodiment is in tethered devices for heading determination, for example tethered vehicle navigation devices.

In another embodiment the present method and apparatus can be used only for 3D space magnetometer calibration using 2D magnetometer calibration equations with pitch-roll sectors in cases when external heading is available during calibration. Applications that can involve 2D magnetometer calibration using pitch-roll sectors to perform 3D space calibration (such as using magnetometers in untethered or tethered devices to calculate heading) include untethered and tethered vehicle navigation devices, personal navigators, and smart phones.

In another embodiment the present method and apparatus can be used only for 3D space magnetometer calibration using 3D magnetometer calibration equations when external heading is available during calibration. Applications that can involve 3D magnetometer calibration to perform 3D space calibration (such as using magnetometers in untethered or tethered devices to calculate heading) include untethered and tethered vehicle navigation devices, personal navigators, and smart phones.

In another embodiment the present method and apparatus can be used only for 3D space magnetometer calibration using 3D magnetometer calibration when there is no external heading available during calibration equations. Applications that can involve 3D magnetometer calibration to perform 3D space calibration (such as using magnetometers in untethered or tethered devices to calculate heading) include untethered and tethered vehicle navigation devices, personal navigators, and smart phones.

In some embodiments, 3D space calibration can be performed using more than one approach at the same time. In some of these embodiments, 2D magnetometer calibration using pitch-roll sectors to calibrate the 3D space is used simultaneously with 3D magnetometer calibration to calculate calibration parameters. In this embodiment both 2D using pitch-roll sectors and 3D calibrations can run together (for example in the background), and when data collection is done for one of them it can be triggered to correct magnetometer readings. 2D calibration using pitch-roll sectors and 3D calibrations can work simultaneously and parameters calculated by 2D calibration using pitch-roll sectors can replace parameters calculated by 3D calibration and vice versa and a decision can be made on which parameters are better for use in a certain sector; i.e. if the data collection is done for both 2D in a pitch-roll sector and 3D calibrations then a comparison can be made to decide which one to use.

Some examples for how the comparison can be done include (among others) checking which heading is closer to the reference heading that was used for calibration or which corrected horizontal reading is closer to the earth's horizontal magnetic field (acquired according the earth magnetic field model used). Another measure that can decide which calibration is better to run is the "use-case" of the device. The "use-case" refers to the way or the moving scenario that the device is moved or placed by the user during calibration and usage, for example (among others) hand held in any orientation, hand dangling, placing the device in one of pants pockets while walking, placing the device in belt clip, mounting the device to the chest of the user, etc. In some cases when the device is partially tethered, for example chest mounted, running 2D calibration using pitch-roll sectors can be better and faster in data collection, while in other cases when a hand dangling scenario is detected or any other use-case is detected where the device is moving with high frequency between pitch-roll sectors, 3D calibration is more efficient as the high frequency of switching between pitch-roll sectors in some cases makes 2D calibration using pitch-roll sectors less accurate relative to full 3D calibration. Another aspect that can affect the decision for choosing 2D calibration using pitch-roll sectors or full 3D calibration is the "mode" the device is used in. The mode is not like the use-case, it usually refers to the bigger picture which includes the moving platform in which a portable device can be used in, for example the mode can be (among others) walking mode, running mode, driving mode, train mode, etc. The mode can affect the decision as well, for example if a driving mode is detected 2D magnetometer calibration using pitch-roll sectors can be a better choice since the device can be placed on vehicle dashboard or any other place where its movement is limited, which will not prevent the 3D calibration from running as it can be triggered once sufficient data is collected and then the results from both 2D calibration using pitch-roll sector and 3D full calibration can be compared to decide which is better. Another example that can show how the mode not only affects the calibration decision but also can trigger a recalibration, is when the user is walking with the portable device and the magnetometer is calibrated, and then enters a vehicle which has its own magnetic field due to the ferrous materials and engine which can distort the earth's magnetic field readings in a different way from which the calibration was built upon, therefore requiring a recalibration. Detecting "use-cases" and "mode" can depend on having separate modules that can decide which use-case or which mode the device is involved in, the output from these modules can be an input to the magnetometer calibration method.

In some embodiments, when no external heading is available, the embodiment that performs calibration in 3D space using 3D calibration equations without depending on an external heading source can be used for 3D magnetometer calibration. If the external heading source becomes available later on, any of the 3D space calibration embodiments that depend on external heading source, including 2D calibration using pitch-roll sectors and/or 3D calibration can be used in any of the following fashions: (i) determining which parameters are the better parameters to be used to correct the magnetometer reading and keeping those better parameters, (ii) discarding the calibration parameters calculated when external heading was not available and using new calibration parameters calculated after heading becomes available, (iii) combining with the calibration parameters calculated when heading was not available (for example the two sets of calibration parameters can be averaged), or (iv) running simultaneously so a comparison can be made determining which parameters are the better parameters to be used to correct the magnetometer reading.

Figure 2:
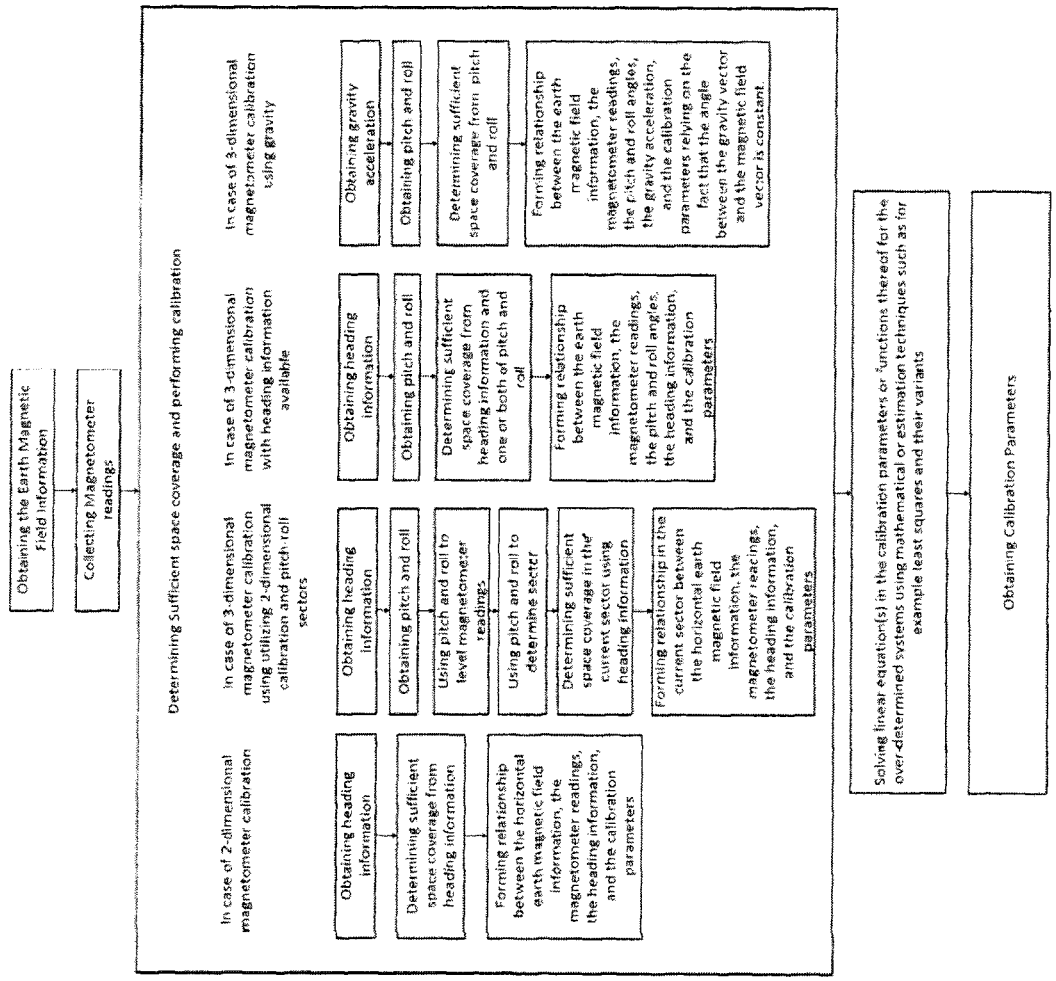
FIG. 2 is a flow chart showing another embodiment of the method according to the invention.
Figure 3:
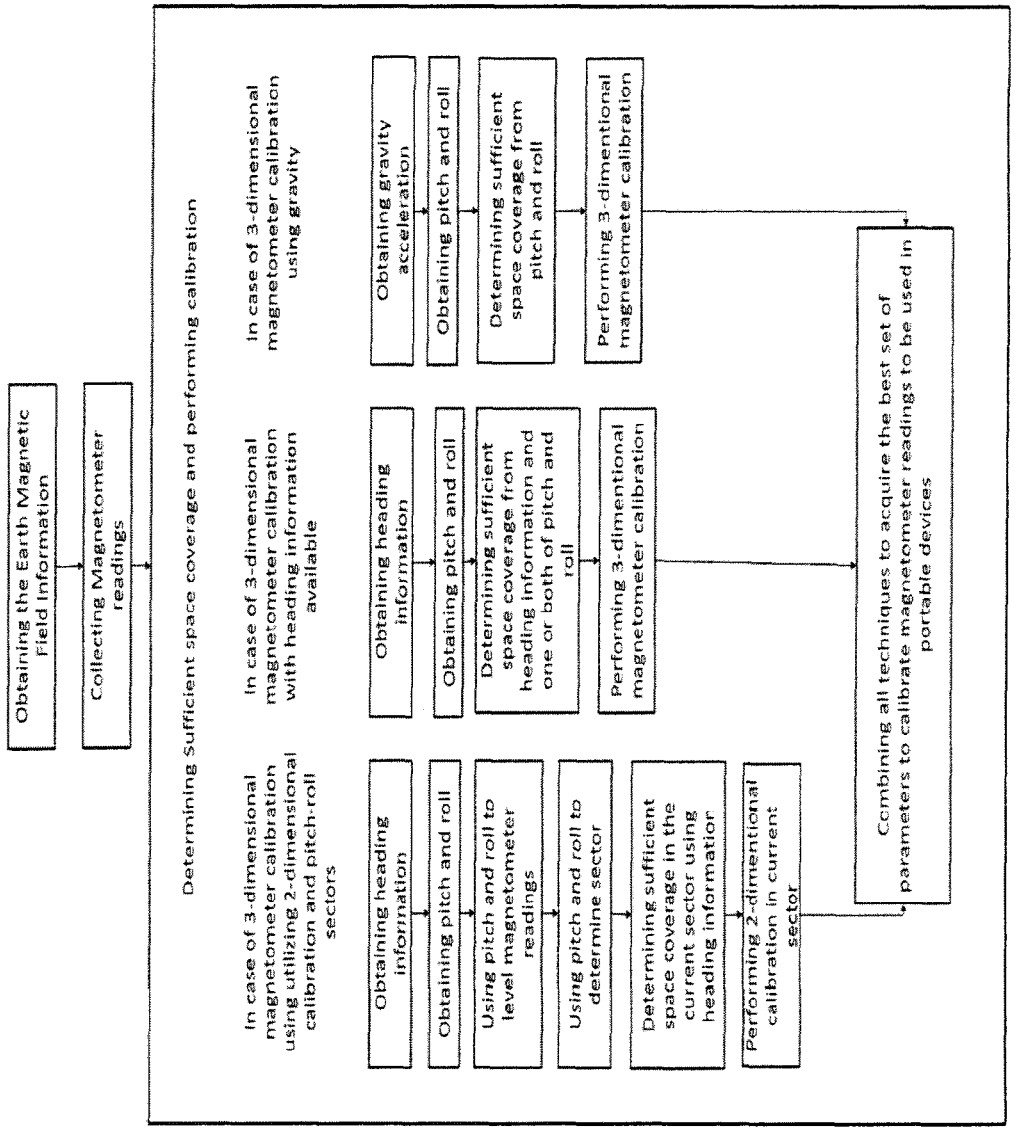
FIG. 3 is a flow chart showing another embodiment of the method according to the invention.

FIGS. 1, 2 and 3 are flow charts for some embodiments of the present method.

If some or all of the criteria required for performing 2D and/or 3D magnetometer calibration described in the previous embodiments were not available, any other calibration technique can be applied for magnetometer calibration, for example (among others) ellipse/ellipsoid fitting which can work solely or simultaneously with one or more of the embodiments herein based on a comparison that can be made between the ellipse/ellipsoid fitting and the other embodiment.

Optionally in some embodiments, the present method and apparatus may have an optional quality check routine that is called after calibration parameters are calculated. This post calibration check routine is optionally called directly after the calibration parameters are calculated to check whether the calibration parameters are valid or not, and if not a recalibration is required which may require new data collection.

Optionally in some embodiments, the present method and apparatus may have an optional quality check routine that is called periodically after the calibration is done. The time period that is used for calling the periodic checks routine depends on the calibration type, whether 2D or 3D or both, and on the application for which magnetometer calibration is required. This periodic check routine is optionally called to check whether the calibration parameters are valid or not every certain time period, and if they are not valid a recalibration is required which may require new data collection. This check can be useful in the case calibration parameters are calculated when the device was in certain environment and then the environment has changed such as for example if the user entered a steel elevator after he was walking in a different environment.

Optionally in some embodiments, the present method and apparatus may have both optional routines: post calibration check routine and periodic checks routine, in which case the post calibration check routine is called directly after the calibration parameters are calculated to check whether the calibration parameters are valid or not, while the periodic check routine is called to check whether the calibration parameters are valid or not every certain time period. If either the post calibration check routine or the periodic check routine return that the calibration parameters are not valid, a recalibration is required which may require new data collection.

Optionally, the post calibration check and/or the periodic checks routines include one or more quality checks such as (among others): (i) a scale factor check; in which the scale factors calculated can be checked according to upper and lower bound thresholds; (ii) device heading check, in which the heading calculated from the magnetometer is compared to the reference heading used in calibration if it is available; and (iii) reading check in which the horizontal earth magnetic field calculated from the calibrated magnetic readings is compared to the horizontal field acquired according the earth magnetic field model used and a threshold absolute difference value is used to determine whether the calibration parameters are better or not.

Optionally in some embodiments, the calibration parameters can be shelved and saved for future use even if a quality check routine is called and returns that the parameters are invalid. Some benefits of shelving the parameters for future use are when calibration parameters are calculated and they pass several periodic quality checks, then fail one check, discarding these parameters and recollecting data for a recalibration may not the best decision as the failure can be due a temporary change in the environment which when the change ends the shelved parameters can be applied directly after performing quality checks instead of waiting for a new data collection.

Any one or any combination from all the above embodiments and/or optional routines can be used.

In some embodiments the present method and apparatus performs magnetometer calibration in 2D space when 2D calibration parameters are calculated in horizontal plane. In the Examples section below a demonstrative example describing this embodiment is provided in Example 1. In this example the 2D magnetometer calibration uses at least two heading values from an external heading source; the two heading values are sufficiently unique and different to be able to solve the calibration equations used.

In an embodiment the present method and apparatus can perform magnetometer calibration in 3D space using 2D calibration equations together with pitch and roll angles where 2D calibration is performed within pitch-roll sectors. In the Examples section a demonstrative example describing this embodiment is provided in Example 2. In this example for each pitch-roll sector at least two heading values are collected when the device pitch falls between the pitch boundaries and the roll falls between the roll boundaries defined for a certain pitch-roll sector. The two headings in one pitch-roll sector are not required to be collected consecutively as heading values can be saved for each sector while moving the device, and when at least two heading values which are sufficiently unique are covered in one pitch-roll sector calibration can be done while heading values are still saved for other sectors.

In an embodiment the present method and apparatus can perform magnetometer calibration in 3D space using 3D calibration equations when an external heading is available during calibration. In the Examples section a demonstrative example describing this embodiment is provided in Example 3. In this example, small changes in pitch and roll with two unique heading values are sufficient to perform 3D calibration.

In an embodiment the present method and apparatus can perform magnetometer calibration in 3D space using 3D calibration equations when no external heading is available during calibration, or when a 3D magnetometer calibration is required without depending on external heading source. In the Examples section a demonstrative example describing this embodiment is provided in Example 4. In this example different pitch values and different roll values are required where the span in both pitch and roll angles is wide enough so that several unique pitch and roll values are required to perform 3D calibration accurately without depending on external heading during calibration.

In some embodiments, the present method and apparatus may optionally have one of or both of the following routines performing quality checks: (i) post calibration checks routine and (ii) periodic checks routine. In the Examples section, for sake of demonstration, example implementations for the two routines are provided in detail in Example 5, in which the post calibration check routine is called directly after the calibration parameters are calculated to check whether the calibration parameters are valid or not, while the periodic check routine can be called to check whether the calibration parameters are valid or not every certain time period.

In some embodiments, 3D space calibration can be performed using more than one approach at the same time. In the Examples section, for sake of demonstration, an implementation is provided for an example routine in Example 6. This example routine is able to perform magnetometer calibration in 3D space using both 3D magnetometer calibration equations and 2D magnetometer calibration equations that uses pitch-roll sectors simultaneously.

In some embodiments, magnetometer calibration in the present method and apparatus requires reference information for the earth magnetic field according to a model (such as for example IGRF model). In some of these embodiments, the earth magnetic field information acquired from the earth magnetic field model is not updated except if the device having the magnetometer moves a very long distance (for example the user travels to a different country) An example implementation for this case (among others) defines a threshold value for the distance traveled after performing calibration after which the information for the earth magnetic field is updated. In some other embodiments the earth magnetic field model used in calibration is accessed whenever there is an absolute navigational information update available (for example: GNSS, WiFi, or any other wireless technique).

In some other embodiments, the presented magnetometer calibration can run online in real time whether in the foreground or the background.

Figure 4:
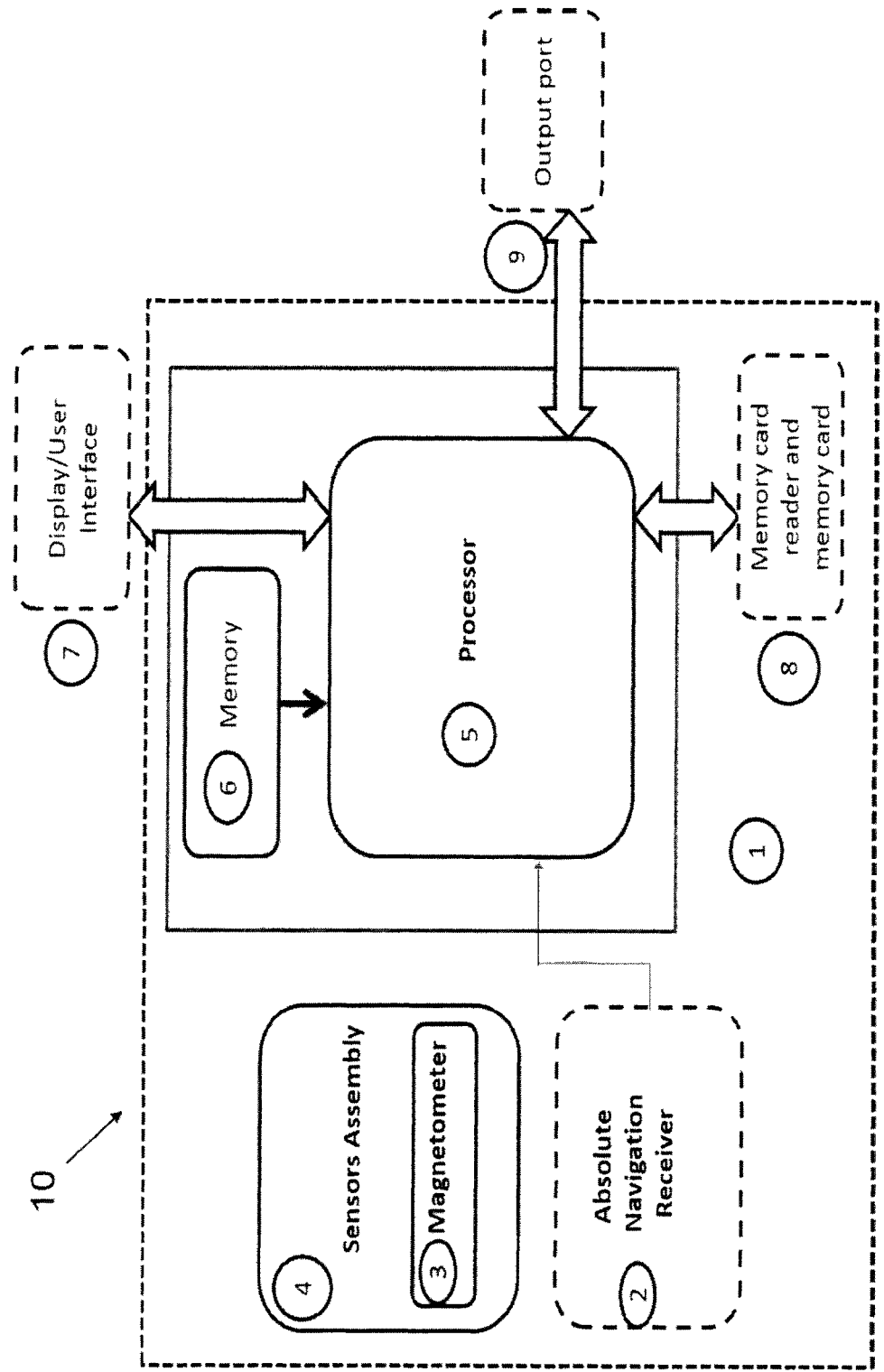
FIG. 4 is a block diagram showing an embodiment of an apparatus according to the invention.

Having regard to FIG. 4, the present device 10 includes a magnetometer 3, capable of measuring the magnetic field strength. The magnetometer can be either 2-dimensional (2D) (two-axial magnetometer) or 3-dimensional (3D) (tri-axial magnetometer).

The present device 10 may include a self-contained sensor assembly 4, capable of obtaining or generating "relative" or "non-reference based" readings relating to navigational information about the moving object, and producing an output indicative thereof. In some embodiments, the sensor assembly 4 may, for example, include other self-contained sensors such as, without limitation, accelerometer for measuring specific forces, gyroscope for measuring turning rates of the of the device, barometer for measuring pressure to establish altitude, or any other sources of "self-contained" navigational information.

The present device 10 may include a receiver 2 capable of receiving "absolute" or "reference-based" navigation information about the device from external sources, such as satellites, whereby the receiving means is capable of producing an output indicative of the navigation information. For example, the receiver means may be a GNSS receiver capable of receiving navigational information from GNSS satellites and converting the information into position and velocity information about the moving object. The GNSS receiver may also provide navigation information in the form of raw measurements such as pseudoranges and Doppler shifts. The GNSS receiver might operate in one of different modes, for example, single point, differential, RTK, PPP, or use wide area differential (WAD) corrections (e.g. WAAS).

In some embodiments, the present device 10 may include at least one processor 5 coupled to receive the sensor readings from the sensor assembly 4, and the absolute navigational information output from the receiver 2. In some embodiments, the present device 10 may include at least one memory 6. Optionally, the device 10 may include a display or user interface 7. It is contemplated that the display 7 may be part of the device 10, or separate therefrom (e.g., connected wired or wirelessly thereto). Optionally, the device 10 may include a memory device/card 8. It is contemplated that the memory device/card 8 may be part of the device 10, or separate therefrom (e.g., connected wired or wirelessly thereto). Optionally, the device 10 may include an output port 9.

In some other embodiments, the sensors and/or systems included in the apparatus may be contained in a separate device or module other than the device or module containing the processing means, the two devices or modules may communicate through a wired or a wireless mean of communication.

Some examples for the applications that magnetometer is used in and in which the present method and apparatus is capable to perform automatic magnetometer calibration are (among others) (i) heading determination in vehicle navigation (for example cars, air craft, ships, etc.), (ii) heading determination in pedestrian navigation using navigation devices mounted to the user body, and (iii) heading determination in hand held navigation devices (such as for example smart phones or personal navigators).

In some example applications the present method and apparatus can be used for magnetometer calibration in which the main application can be heading determination application, so that the magnetometer heading is the only heading source. In some other example applications the present method and apparatus can be used for calibrating magnetometers for heading determination so that the magnetometer heading is integrated with other sensors (such as gyroscopes) or systems that provide absolute navigational information or with any combination using any integration technique. Some possible examples for systems that the calibrated magnetometer heading can be integrated with are: inertial navigation system (INS), absolute navigational information systems (such as GNSS, WiFi, RFID, Zigbee, Cellular based localization among others), any other positioning system, combination of systems, or any integrated navigation system integrating any type of sensors or systems and using any type of integration technique. Some possible examples for integration techniques are Kalman filter, Particle filter or any other filter or estimation technique among other integration techniques.

In some example applications the present method and apparatus can be used with any navigation system, whether as the sole source of heading or one of the sources of heading as described above. The navigation system can be of any type. The navigation system may rely on a solution using any type of integration technique and integrating different sensors and/or systems for example some or all of the following: accelerometers, gyroscopes, magnetometers, barometer, odometer, or any navigational information updates (such as, for example, GNSS, WiFi, or any other wireless technique). Some possible examples for integration techniques are Kalman filter, Particle filter or any other filter or estimation technique among other integration techniques.

Contemplated Embodiments

It is contemplated that the present method and apparatus can be used with any definition of the device frame axes, one example definition for demonstration is x forward, y positive towards the right side of the device and z axis positive downwards.

It is contemplated that the present method and apparatus can be used for calibrating magnetometers used as a heading source for Pedestrian Dead Reckoning (PDR) applications together with any step detection technique and any step length estimation approach. This heading from a magnetometer may be the sole source of heading for PDR or it can be integrated with heading obtained using other sensors (such as gyroscopes) or other systems that provide absolute navigational information or with any combination using any integration technique. Some possible examples for systems to which the heading from calibrated magnetometer can be integrated include: inertial navigation system (INS), absolute navigational information systems (such as GNSS, WiFi, RFID, Zigbee, Cellular based localization among others), any other positioning system, combination of systems, or any integrated navigation system integrating any type of sensors or systems and using any type of integration technique. Some possible examples for integration techniques are Kalman filter, Particle filter or any other filter or estimation technique among other integration techniques.

It is contemplated that the method and apparatus presented herein can also be combined with a mode of conveyance technique or a mode detection technique to establish the mode of conveyance. This enables the detection of pedestrian mode or driving mode that can be used as an input to the present method and apparatus in case both 3D calibration and 2D calibration using pitch-roll sector are used simultaneously.

It is further contemplated that the method and apparatus presented above can be used with a navigation solution that may optionally utilize automatic zero velocity periods or static period detection with possible updates and inertial sensor bias recalculations, non-holonomic updates module, advanced modeling and/or calibration of inertial sensors errors, derivation of possible measurements updates for the inertial sensor errors from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the method and apparatus presented herein can also be used with a navigation solution that is further programmed to run, in the background, a routine to simulate artificial outages in the absolute navigational information system and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS), and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in the solution's future run (i.e. real-time run after the background routine has finished running), for example, by having improved values for the parameters of the forward state estimation technique used for navigation in the present module.

It is further contemplated that the method and apparatus presented herein can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used, for example, laser range finders, cameras and vision systems, or sonar systems. These systems can be used either as an extra aid to enhance the accuracy of the navigation solution during the absolute navigation information problems (degradation or absence), or they can totally replace the absolute navigation information in some applications.

It is further contemplated that the method and apparatus presented above can also be used with a navigation solution that, when working either in a tightly coupled scheme or a hybrid loosely/tightly coupled option, need not be bound to utilize pseudorange measurements (which are calculated from the code, not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudoranges and carrier-phase measurements; such enhancement is the carrier-smoothed pseudorange.

It is further contemplated that the method and apparatus presented herein can also be used with a navigation solution that relies on an ultra-tight integration scheme between a GNSS receiver and the other sensors' readings.

It is further contemplated that the method and apparatus presented herein can also be used with a navigation solution that uses various wireless communication systems that can also be used for positioning and navigation, either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be used for positioning or navigation, whereby the range might be estimated by different methods among which include calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes, but is not limited to, time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method and apparatus presented herein can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS is available and utilizes the methods described herein. The wireless communication system used for positioning may rely on different communication protocols, and it may rely on different methods, for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method and apparatus presented above, when possibly used with inertial sensors, can be used with various types of inertial sensors, not only Microelectromechanical systems (MEMS) based inertial sensors.

Without any limitation to the foregoing, the present method and apparatus are further described by way of the following examples.

EXAMPLES

In the following examples, for demonstration purposes a low-cost prototype unit including a six degrees of freedom inertial unit from Invensense (i.e. tri-axial gyroscopes and tri-axial accelerometer) (MPU-6050), tri-axial magnetometers from Honeywell (HMC5883L), barometer from Measurement Specialties (M55803), and a GPS receiver from u-blox (LEA-5T) was used.

Example 1: 2D Space Magnetometer Calibration Using 2D Magnetometer Calibration Equations for Heading Calculation in Vehicle Navigation when Heading Source is Available During Calibration The present example demonstrates the use of some embodiments of the present method and apparatus to perform magnetometer calibration in 2D space when 2D calibration parameters are calculated in horizontal plane. The present method and apparatus is capable of calculating all different calibration parameters for the different error sources, however for demonstration purposes in this example the calibration parameters are only 2D biases and scale factors in the 2D horizontal magnetometer readings in device frame.

In one of these embodiments, the device including the magnetometer may be mounted horizontally to the moving platform where the moving platform is regularly moving in horizontal plane. The magnetometer readings can be taken directly from the magnetic sensor and the 2D calibration can be performed. In another embodiment the device that contains the magnetometer is not mounted horizontally with the moving platform but tethered in a non-horizontal position. In this embodiment levelling the magnetometer readings is required before applying the 2D magnetometer calibration. The aforementioned two embodiments share the following required inputs for 2D calibration: (i) raw magnetometer readings, (ii) an external heading source, and (iii) reference horizontal magnetic field for a certain region in earth in which calibration is performed (the earth horizontal magnetic field can be acquired according to any earth magnetic model. (in this example the IGRF model: the eleventh generation is used)). In the second case of the aforementioned embodiments there are other inputs required which are the pitch and roll angles to be used for levelling. Knowing the different heading values and the horizontal magnetic field along with the magnetometer 2D readings in the X-Y plane, where X is the forward direction and Y is the lateral perpendicular direction aligned with the device axis, a mathematical calculation or estimation approaches can be used to get biases and scale factors.

Figure 5:
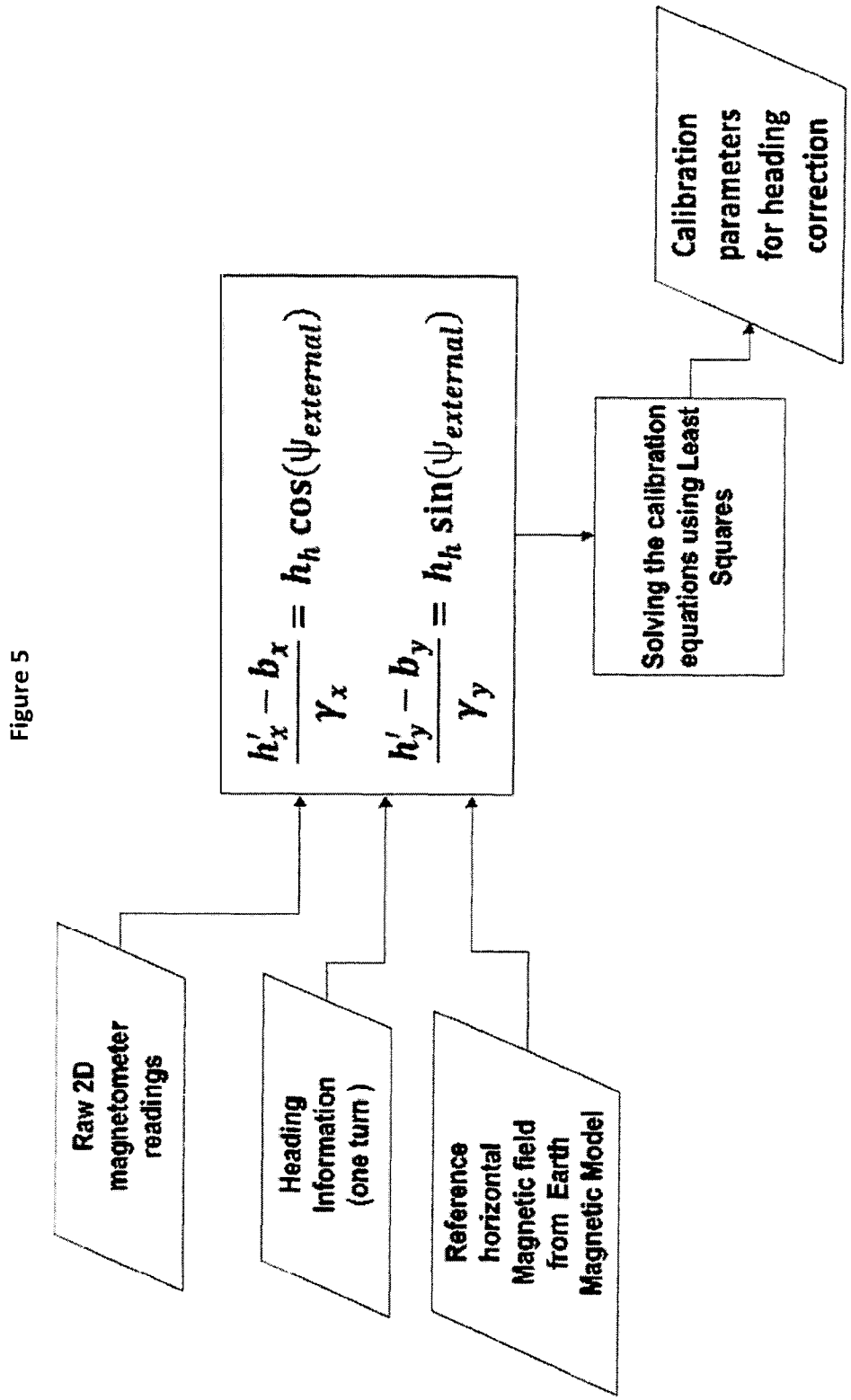
FIG. 5 is an example block diagram for performing 2D-space calibration using 2D calibration equations when external heading is available as used in an embodiment of the invention.

The present example demonstrates the use of the first embodiment of the above mentioned embodiments in which magnetometer calibration is done in 2D space when 2D calibration parameters are calculated in the horizontal plane without levelling the readings as the device (the previously mentioned prototype) is placed in horizontal plane tethered to a vehicle body. FIG. 5 shows a flow chart that shows the embodiment used in this example.

In this example external heading used during calibration is acquired from an integrated navigation solution that integrates accelerometers, gyroscopes, and barometers with GPS as the example herein demonstrates the application of 2D magnetometer calibration to calculate an accurate heading from a magnetometer after calibration.

In this example, for demonstration purposes GPS is used to calculate the position of the device to be able to get the earth magnetic field components from the IGRF model in which only the initial position is used to access the model for a certain region on earth. In this example the IGRF model is stored in the device memory and accessed once when the initial position is known. The initial position is calculated using GPS in this example.

In this example the present method and apparatus is used for 2D magnetometer calibration, in the case the apparatus is tethered to a vehicle body. The apparatus is assumed to be aligned to the vehicle body, having zero heading misalignment, where X-axis represents the forward direction for both the vehicle and device while Y-axis is perpendicular on X-axis pointing to the right and Z-axis pointing down.

For demonstration purposes the following equations are given to describe how the present method and apparatus makes use of an external heading to calibrate the magnetometer by calculating 2D biases and scale factors.

In the following equations bold capital letters represent vector or matrix quantities while normal font letters represent scalar quantities.

$$h_x = h_h \cos(\varphi_{Reference}) \quad (2)$$

$$h_y = -h_h \sin(\varphi_{Reference}) \quad (3)$$

where $h_x$ and $h_y$ are the two horizontal earth magnetic field components in the device frame, where $h_x$ is the horizontal magnetic field component in the device frame pointing to the forward direction, and $h_y$ is the horizontal magnetic field component in the device frame pointing to the right perpendicular to $h_x$. Theoretically $h_x$ and $h_y$ are the two readings sensed by a magnetometer when placed horizontally, but due to external magnetic fields and other perturbation sources mentioned earlier the magnetometer readings are perturbed and they do not represent the true earth magnetic field components. The angle $\varphi_{Reference}$ represents the heading angle after subtracting the declination angle from the reference solution, which can be GPS or an integrated navigation solution Assuming that the true magnetometer readings are modeled as follows:

$$h_x = \frac{h'_x - b_x}{\gamma_x} \quad (4)$$

$$h_y = \frac{h'_y - b_y}{\gamma_y} \quad (5)$$

In equations (4) and (5) $b_x$ and $b_y$ represent the biases in the horizontal axes X and Y respectively, while $\gamma_x$ and $\gamma_y$ represent the scale factor errors, $h'_x$ and $h'_y$, and by are the magnetometer raw 2D readings sensed in horizontal plane.

By substituting equations (4) and (5) in equations (2) and (3)

$$\frac{h'_x - b_x}{\gamma_x} = h_h \cos(\varphi_{GPS}), \frac{h'_y - b_y}{\gamma_y} = -h_h \sin(\varphi_{GPS}) \quad (6)$$

$$\frac{h'_x}{h_h}\left(\frac{1}{\gamma_x}\right) - \frac{1}{h_h}\left(\frac{b_x}{\gamma_x}\right) = \cos(\varphi_{GPS}), -\frac{h'_y}{h_h}\left(\frac{1}{\gamma_y}\right) + \frac{1}{h_h}\left(\frac{b_y}{\gamma_y}\right) = \sin(\varphi_{GPS}) \quad (7)$$

The unknowns can be represented as follows:

$$A = \left(\frac{1}{\gamma_x}\right), B = \left(\frac{b_x}{\gamma_x}\right), C = \left(\frac{1}{\gamma_y}\right), D = \left(\frac{b_y}{\gamma_y}\right) \quad (8)$$

Using Least Square (LS) approach for solving the previous equations using N readings in which the heading values are unique enough to solve the system $$X_1 = \begin{pmatrix} A \\ B \end{pmatrix}, X_2 = \begin{pmatrix} C \\ D \end{pmatrix} \quad (9)$$

$$H_1 = \frac{1}{h_h}\begin{bmatrix} h'_{x_1} & -1 \\ h'_{x_2} & -1 \\ \vdots & \vdots \\ h'_{x_N} & -1 \end{bmatrix}, H_2 = \frac{-1}{h_h}\begin{bmatrix} h'_{y_1} & -1 \\ h'_{y_2} & -1 \\ \vdots & \vdots \\ h'_{y_N} & -1 \end{bmatrix} \quad (10)$$

$$Y_1 = \begin{pmatrix} \cos(\varphi_{GPS_1}) \\ \cos(\varphi_{GPS_2}) \\ \vdots \\ \cos(\varphi_{GPS_n}) \end{pmatrix}, Y_2 = \begin{pmatrix} \sin(\varphi_{GPS_1}) \\ \sin(\varphi_{GPS_2}) \\ \vdots \\ \sin(\varphi_{GPS_n}) \end{pmatrix} \quad (11)$$

The subscript n represents the number of readings; multiple readings are collected for each heading direction.

$$H_1 * X_1 = Y_1, H_2 * X_2 = Y_2 \quad (12)$$

$$[H_1^T * H_1] X_1 = H_1^T * Y_1, [H_2^T * H_2] X_2 = H_2^T * Y_2 \quad (13)$$

$$X_1 = [H_1^T * H_1]^{-1} * H_1^T * Y_1, X_2 = [H_2^T * H_2]^{-1} * H_2^T * Y_2 \quad (14)$$

From the equations (8), (9) and (14) the unknown values representing biases and scale factors can be calculated as in equation (15)

$$\gamma_x = \frac{1}{A}, b_x = \frac{B}{A}, \gamma_y = \frac{1}{C}, b_y = \frac{D}{C} \quad (16)$$

According to these equations the biases and scale factors can be calculated using the LS approach with two different readings or more from a provided heading source during calibration to fill the measurement matrices $Y_1$ and $Y_2$.

In the present example, 2D magnetometer calibration for biases and scale factors can be performed on a magnetic sensor (magnetometer) which can be either a biaxial magnetometer (for example: magnetometer in a 2D electronic compass) having two orthogonally mounted magnetometers, one in the X direction and one in the Y direction, or a tri-axial magnetometer (for example a magnetometer in a 3D electronic compass) having a magnetometer triad of three magnetometers mounted orthogonally, one is pointing in the X-direction and one in the Y-direction and the third is pointing in the Z-direction. In both cases the present 2D calibration aims to calibrate the two components of the sensed earth magnetic field which are in the horizontal level from which the device heading can be derived, which is the main application in this example.

In case a biaxial magnetometer is used it should be mounted horizontally to the vehicle body, while in the case of using a tri-axial magnetometer, if the magnetometer is not mounted horizontally to the vehicle body levelling should be applied to the 3D magnetometer readings to get the two horizontal components that are used for heading determination. The ways levelling can be performed are discussed earlier using pitch and roll.

Data Collection and Results

In this example the apparatus used involves a 3D magnetometer; therefore data collected is as follows: the three magnetometer readings in the device frame and heading of the device. Data is collected at each epoch according to the frequency the sensors are working with.

In this example a 2D magnetometer calibration embodiment is demonstrated for calculating 2D biases and scale factors and correcting magnetometer horizontal readings to calculate heading in vehicles; the mathematical approach used in solving calibration equations in this example is Least Square (LS), since LS is able to solve an over determined system when given large number of readings. In this embodiment the sufficient coverage that this embodiment requires is exactly two heading values from two different directions separated by 70 to 80 degrees to perform accurate calibration and calculate biases and scale factors. This is considered little space coverage. Therefore, to collect sufficient data for this embodiment to perform 2D calibration for biases and scale factors, the vehicle is required to make one turn which is very common and therefore easy to achieve during driving so the method can perform 2D calibration for biases and scale factor.

For each heading direction multiple samples can be collected to give a smoother solution and to avoid taking a reading affected by noise due to the use of a low cost MEMS grade sensor. The, LS approach is able to solve the calibration equation when extra readings are collected.

Figure 6:
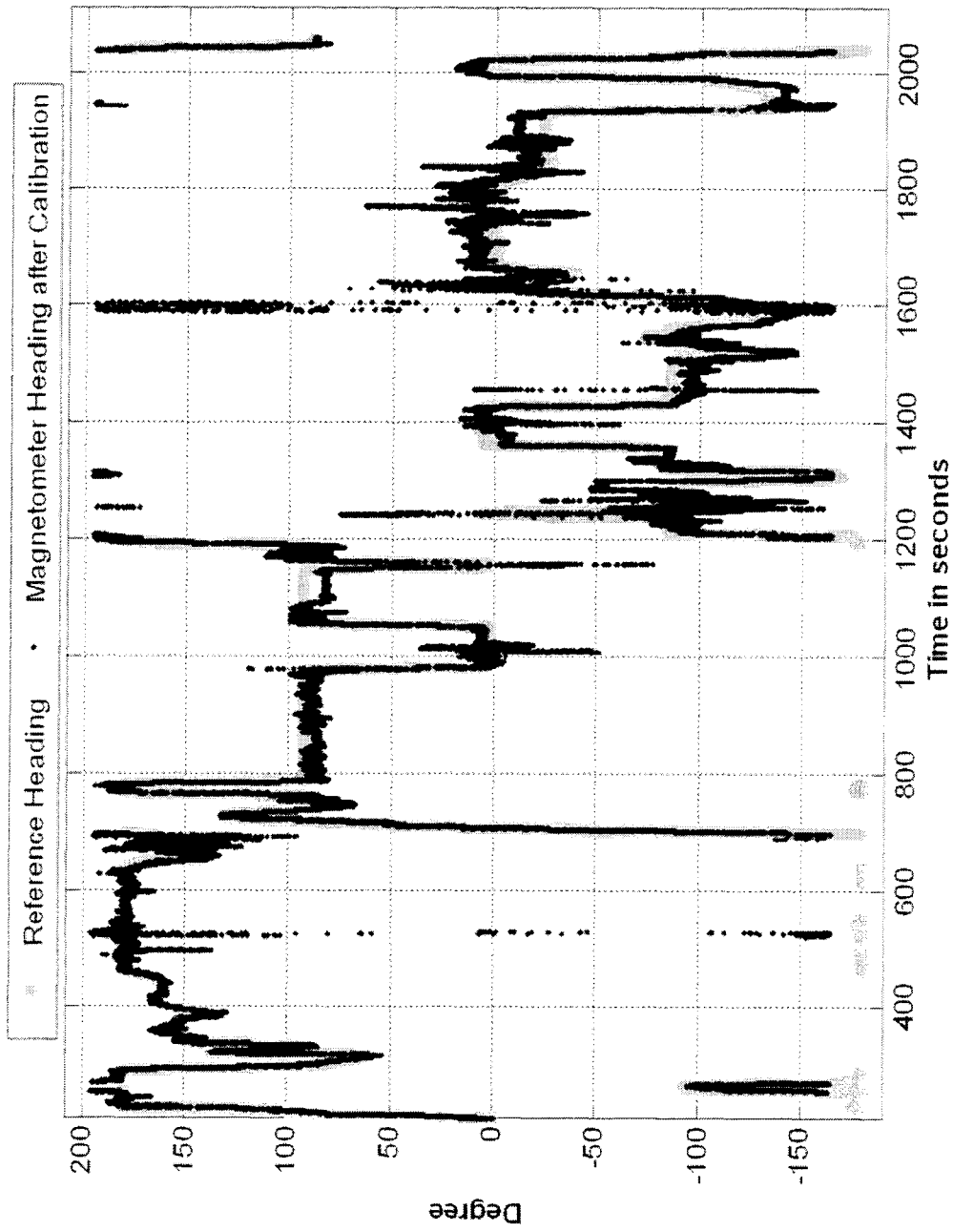
FIG. 6 shows a vehicle heading calculated using a magnetometer after performing 2D calibration according to an embodiment of the invention.

For demonstration purposes a driving trajectory is made in which heading is calculated from a magnetometer after 2D calibration using the present method and apparatus is performed. FIG. 6 shows the vehicle heading obtained using the magnetometer after 2D calibration compared to a reference heading obtained from an integrated navigation solution that integrates accelerometers, gyroscopes, barometer with GPS in open sky.

Figure 7:
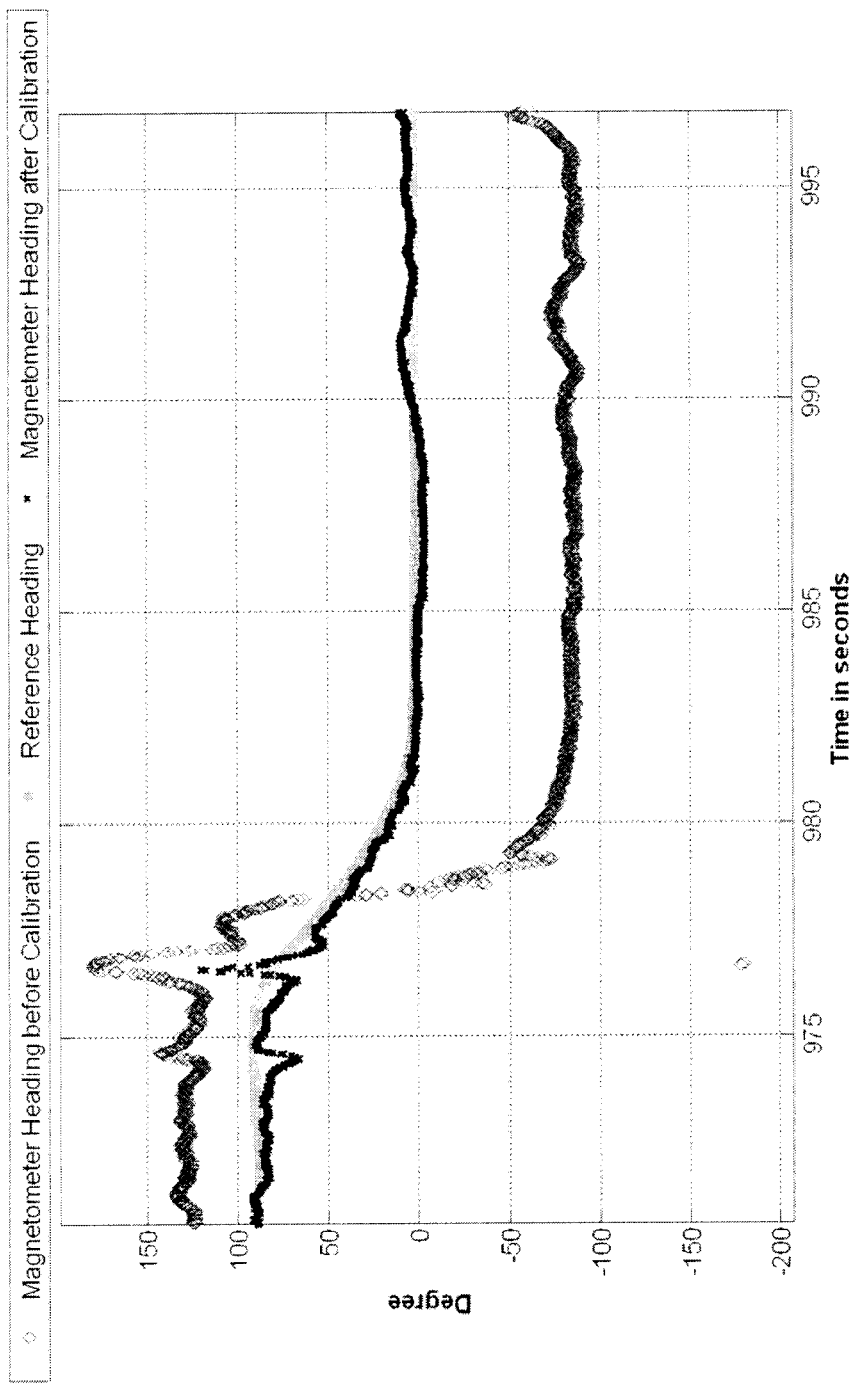
FIG. 7 shows a zoomed section of a vehicle heading calculated using a magnetometer after performing 2D calibration according to an embodiment of the invention.

For more demonstration a zoomed section of the heading plot are shown in FIG. 7 in which the un-calibrated magnetometer heading is plotted to show the effect of the 2D calibration demonstrated in this example and how the calibrated magnetometer heading is close to the reference.

The discontinuity of the drawn curves in the figures is due to the cyclicity of the heading where its range is from −180 degrees to 180 degrees.

The resulted heading calculated after magnetometer calibration shows how magnetometer can be used as a reliable heading source in vehicle navigation after 2D calibration performed by the embodiment demonstrated in this example. The Mean error is used as a measure to assess the calibration quality in the following experiments. The Mean error after calibration is compared to the Mean error before calibration. Mean error is only calculated when the magnetometer heading is used, i.e. after data collection is done. The mean error represents the mean of the absolute difference the magnetometer heading and the reference heading. The Mean error before calibration in this trajectory was 40 degrees and it became 2.9 degrees after calibration was done.

Example 2: 3D Space Magnetometer Calibration Using 2D Magnetometer Calibration Equations with Pitch-Roll Sectors for Heading Calculation when Heading Source is Available During Calibration The present example demonstrates the use of an embodiment of the present method and apparatus in which 2D magnetometer calibration using pitch-roll sectors is used to calibrate magnetometer in 3D space. 2D calibration parameters are calculated in each pitch-roll sector after levelling magnetometer readings, so that a 3D space calibration is performed.

Figure 8:
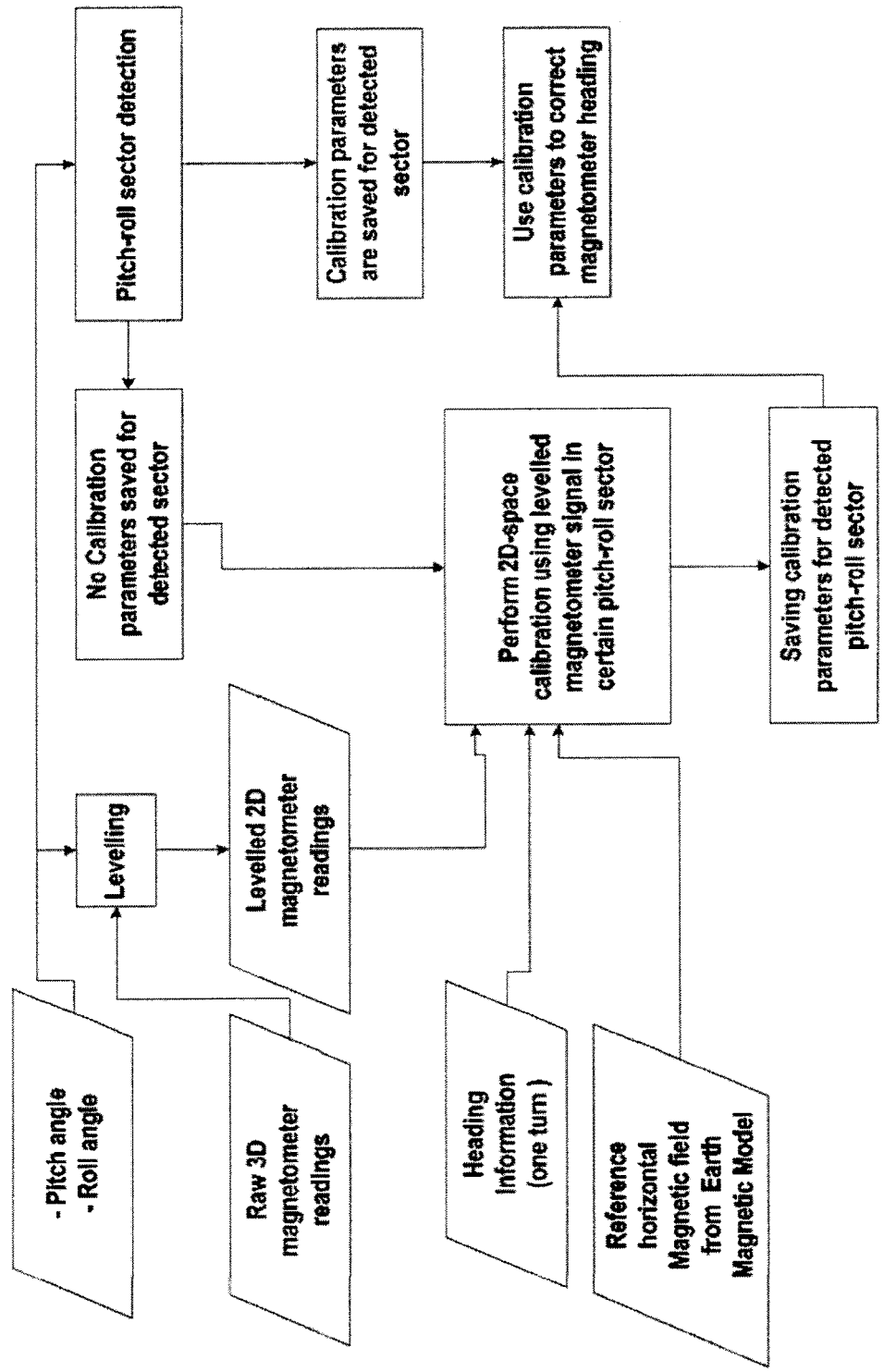
FIG. 8 is a flow chart showing an example of performing 3D-space calibration using 2D calibration equations with pitch-roll sectors when external heading is available according to an embodiment of the invention.

The present method and apparatus is capable of calculating all the calibration parameters for the different error sources, however for demonstration purposes in this example the calibration parameters are only 2D biases and scale factors in the 2D levelled magnetometer readings in device frame. Some inputs are required to calculate biases and scale factors in this embodiment, these inputs are: (i) raw magnetometer readings, (ii) an external heading source, (iii) reference horizontal magnetic field for a certain region in earth in which calibration is performed (the earth horizontal magnetic field can be acquired according to any earth magnetic model (in this example the IGRF: the eleventh generation is used)), and (iv) pitch and roll values for levelling magnetometer readings and for detecting pitch-roll sectors. Knowing different heading values and the horizontal magnetic field along with levelled magnetometer 2D readings in the X-Y plane in each pitch-roll sector, in which X is the forward direction and Y is the lateral perpendicular direction aligned with the device axis, a mathematical calculation or an estimation approach can be used to get biases and scale factors for each pitch-roll sector. FIG. 8 shows a flow chart that shows the embodiment used in this example.

In this example the external heading used during calibration is acquired from an integrated navigation solution that integrates accelerometers, gyroscopes, and barometers with GPS; as the example herein demonstrates the application of 3D space magnetometer calibration using 2D calibration equations and pitch-roll sectors is used to calculate an accurate heading from magnetometer after calibration.

In this example GPS is used to calculate the position of the device to be able to get the earth magnetic field components from the IGRF model where only the initial position is used to access the model for certain region on earth. In this example the model is stored in the device memory and accessed once the initial position is known using GPS.

In this example, an embodiment of the present method and apparatus is used for 3D space magnetometer calibration using 2D magnetometer calibration equations with pitch-roll sectors, in which the device (the prototype in this example) can be either tethered or untethered to a human body or to a vehicle body. Although the embodiment in this example can be used to calibrate magnetometer readings to calculate heading for vehicle navigation using untethered vehicle navigation devices, for demonstration purposes the embodiment in this example is used to calibrate the magnetometer for heading determination in a portable device to determine heading for a PDR solution where the device used is untethered and free to move by a pedestrian.

In this example the calibration equations used for performing 2D calibration for biases and scale factors in each pitch-roll sector in which the device is placed or held, are the same equations that are used in EXAMPLE 1 for 2D calibration when the apparatus is horizontal. The main difference is that these equations are performed in each pitch-roll sector detected and the magnetometer readings are levelled using pitch and roll given as input to the calibration equations to perform levelling. Sufficient data is collected in each sector before 2D calibration is performed, calibration parameters are saved for the each sector after being calculated so that if the device is placed or held in a sector in which 2D biases and scale factors were already calculated, calibration can be performed directly.

Data Collection and Results

In this example the prototype used involves a 3D magnetometer; therefore data collected is as follows: the three magnetometer readings in the device frame, and pitch, roll and heading of the device. Data is collected at each epoch according to the frequency the sensors are working with.

In this example 2D magnetometer calibration using pitch-roll sectors embodiment is demonstrated for calculating 2D biases and scale factors and correcting magnetometer horizontal readings to calculate heading of a portable device which can be used in pedestrian navigation. A mathematical approach used in solving calibration equations in this example is Least Square (LS) approach, since LS is able to solve an over determined system when given large number of readings. In this embodiment, in each pitch-roll sector, the sufficient coverage that this embodiment requires and determines is exactly two heading values from two different directions separated by 70 to 80 degrees to perform accurate calibration and calculate biases and scale factors. This is considered little space coverage. To collect sufficient data for this embodiment to perform 2D calibration for biases and scale factors, the device is required to be moved in any pitch-roll sector covering one heading turn which is very common and easy to achieve during walking.

For each heading direction multiple samples can be collected to give a smoother solution and to avoid taking a reading affected by noise due to the use of a low cost MEMS grade sensor. A LS approach is able to solve the calibration equation even when extra readings are collected.

In this example, the definition of pitch-roll sector boundaries is done in real time, where the sectors are defined according to the attitude of the device. Whenever the device moves in the 3D space, new pitch-roll sectors are created and their boundaries are defined. In this example, sectors can be overlapping; when the device moves so that its pitch and/or roll falls out of the current pitch-roll sector, a new sector is created. The new sector's median pitch angle can be the first pitch angle detected after the device moved outside the current pitch-roll sector, and its median roll angle can be the first roll angle detected after the device moved outside the current pitch-roll sector. The new sector's pitch boundaries can be the pitch median plus or minus half the sector's pitch size, and the new sector's roll boundaries can be the roll median plus or minus half the sector's roll size. The pitch and roll sizes of a pitch-roll sector can be initially defined according to the best practice.

The technique presented herein can work with any misalignment between the device containing the magnetometer and the platform (person or vehicle). However, in this example, for demonstration purposes, the prototype having the magnetometer is assumed to be aligned to the human body having zero heading misalignment, where the X-axis represents the forward direction for both the platform (the person) and device while the Y-axis is perpendicular on the X-axis pointing to the right and the Z-axis pointing down for both the platform and device.

For demonstration purposes two trajectories are conducted, a walking pedestrian trajectory and a driving trajectory in which the device can change its pitch and roll orientations throughout the trajectory.

In the pedestrian trajectory heading is calculated from the magnetometer after 3D-space calibration using 2D calibration equations in pitch-roll sectors is performed.

The demonstrating pedestrian trajectory is collected when the pedestrian moves in rectangular loops, in each two consecutive rectangular loops the pedestrian holds the device in a certain pitch-roll sector, then he or she changes the devices pitch and/or roll in the next two rectangular loops.

Figure 9:
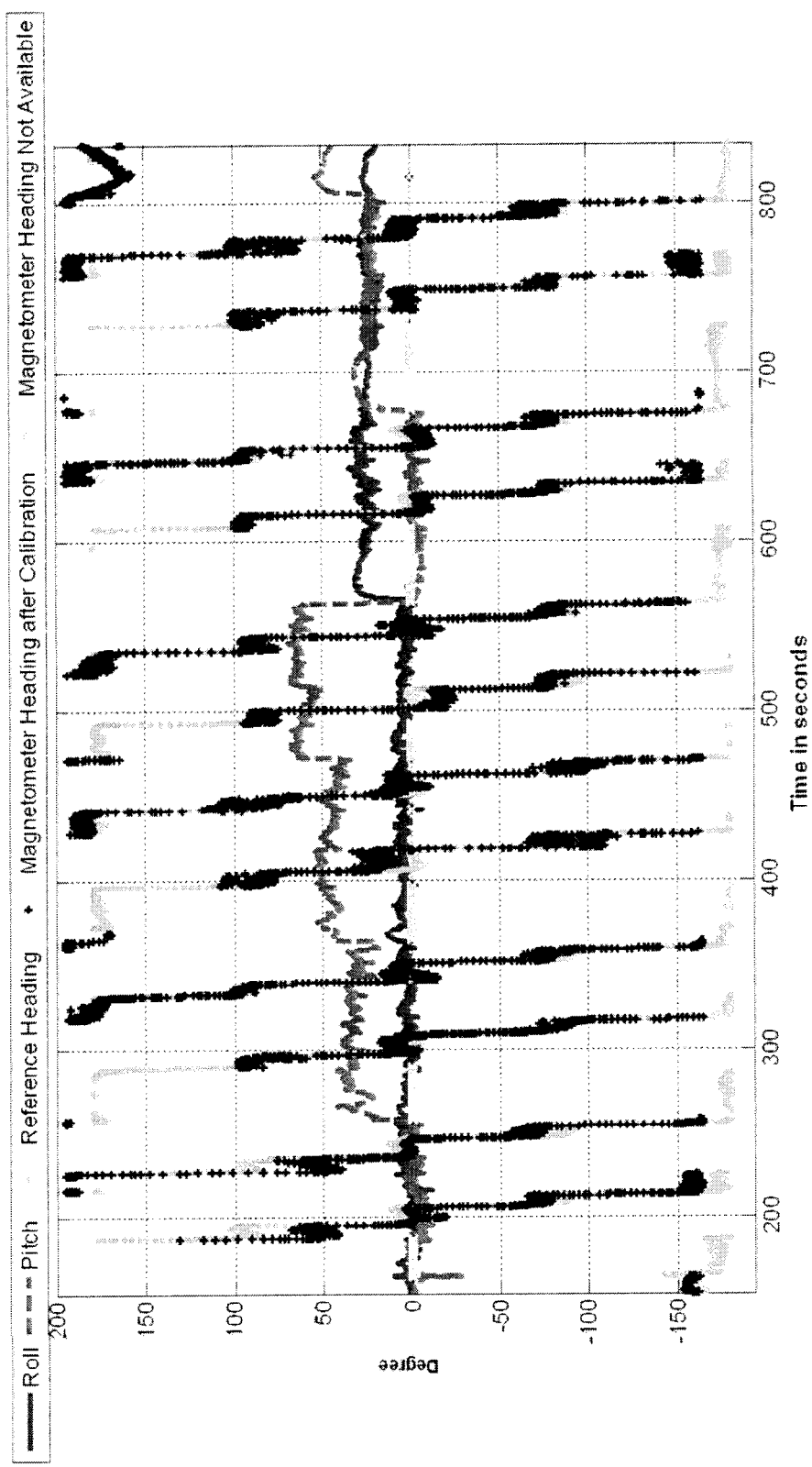
FIG. 9 shows a pedestrian heading calculated using a magnetometer after performing 3D-space calibration using 2D calibration equations with pitch-roll sectors and using external heading during calibration according to an embodiment of the invention.

FIG. 9 demonstrates how switching between pitch-roll sectors is made; both data collection and heading after magnetometer calibration are shown in each pitch-roll sector, i.e. whenever the pitch or the roll are changed a new pitch-roll sector is detected and the magnetometer heading is not used until sufficient data is collected in the new pitch-roll sector detected, as demonstrated earlier in this example. The pedestrian heading obtained using magnetometer after 2D calibration in each pitch-roll sector is compared to a reference heading obtained from an integrated navigation solution that integrates accelerometers, gyroscopes, and barometers with GPS in open sky.

Figure 10:
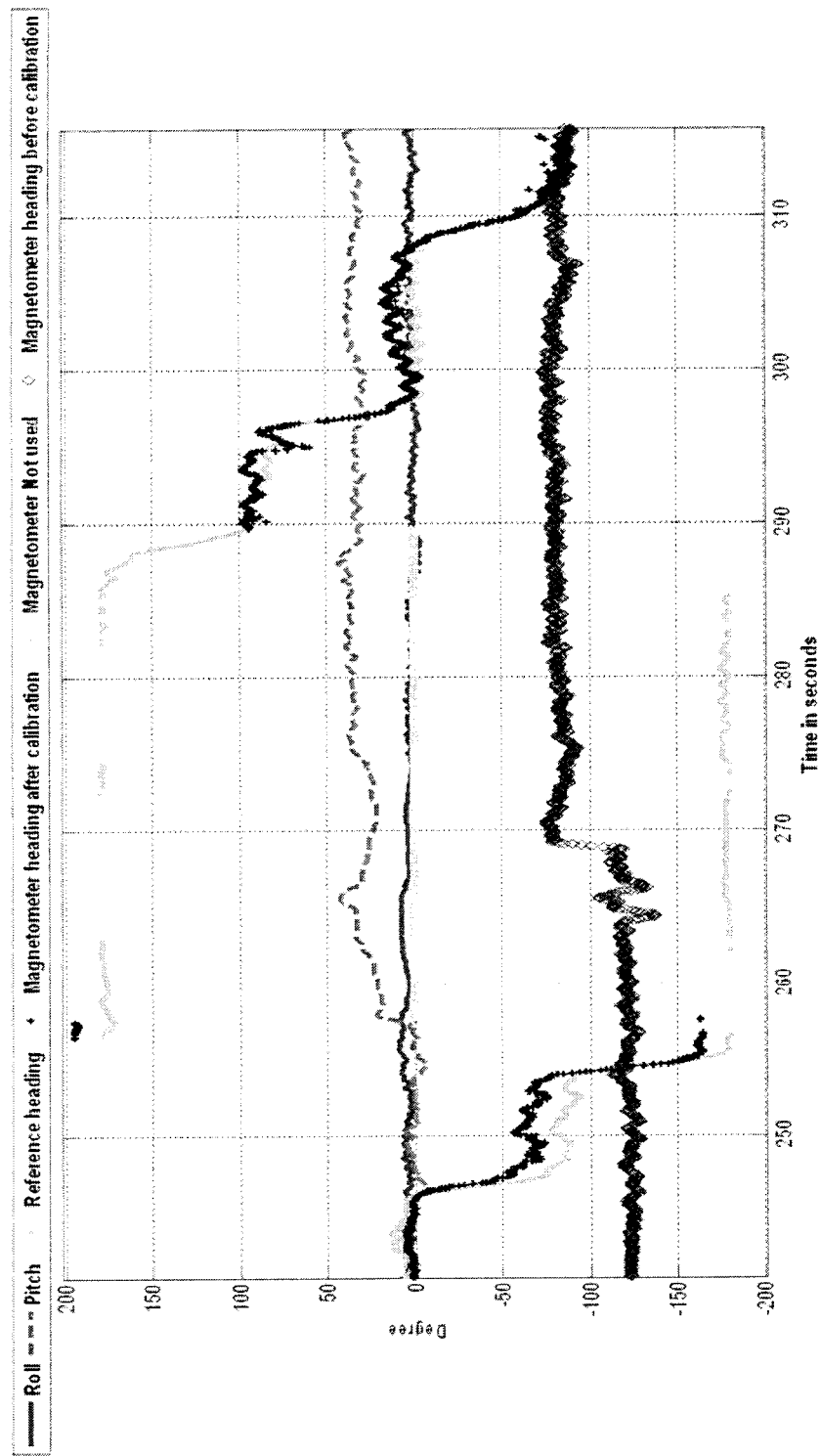
FIG. 10 shows a zoomed section of a pedestrian heading calculated using a magnetometer after performing 3D-space calibration using 2D calibration equations with pitch-roll sectors and using external heading during calibration according to an embodiment of the invention.

For more demonstration a zoomed section of the heading plot is shown in FIG. 10; the figure shows in the beginning that both the pitch and roll where about 0 degrees then the pitch angle changed to be about 30 degrees. At this moment another pitch-roll sector is detected, so the old parameters used in the earlier pitch-roll sector when both pitch and roll were about 0 degrees cannot be used further in the new sector, and they are saved for future use, while data collection starts again to collect new data in the newly detected sector. During this time heading from the magnetometer is not used until sufficient data is collected. When sufficient data is collected (one heading turn) the heading from magnetometer can be used in this sector.

Figure 11:
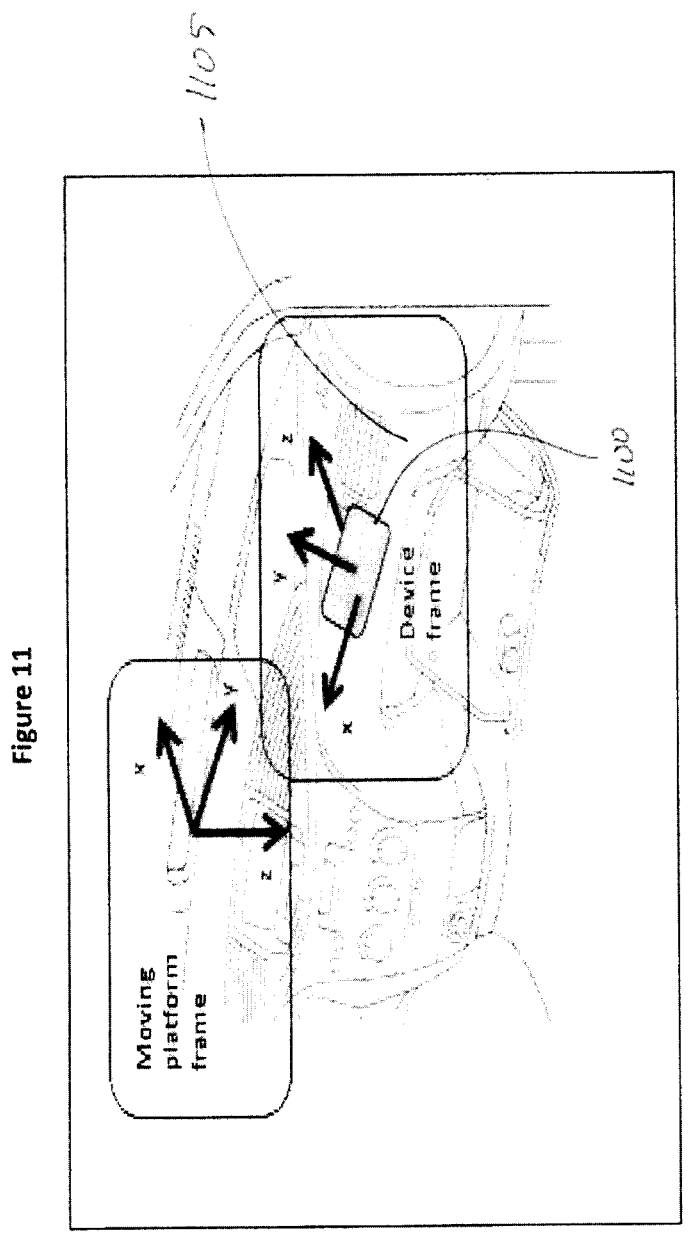
FIG. 11 shows an embodiment of a portable device on a vehicle dashboard.

In the demonstrating driving trajectory, the portable device 1100 is attached to a cradle on a vehicle's dashboard 1105 as shown in FIG. 11. The device pitch and roll are changing by the user during driving. The embodiment herein is able to detect pitch-roll sectors automatically and perform a new calibration when needed.

Figure 12:
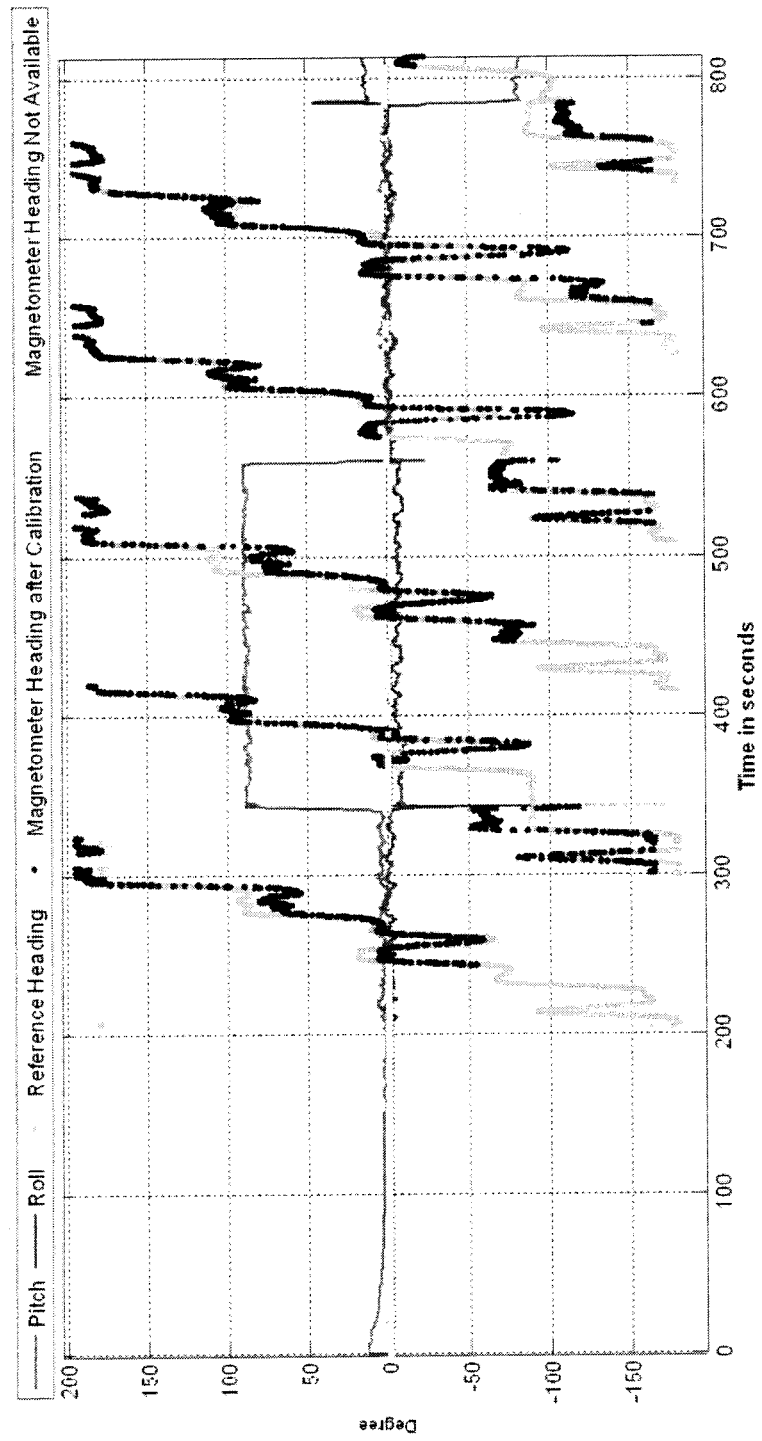
FIG. 12 shows a portable device heading in a driving trajectory calculated using a magnetometer after performing 3D-space calibration using 2D calibration equations using external heading during calibration according to an embodiment of the invention.

FIG. 12 shows the heading of the conducted driving trajectory and demonstrates how switching between pitch-roll sectors is made; both data collection and heading after magnetometer calibration are shown in each pitch-roll sector, i.e. whenever pitch and/or roll are changed a new pitch-roll sector is detected and the magnetometer heading is not used until sufficient data is collected in the new pitch-roll sector detected.

Figure 13:
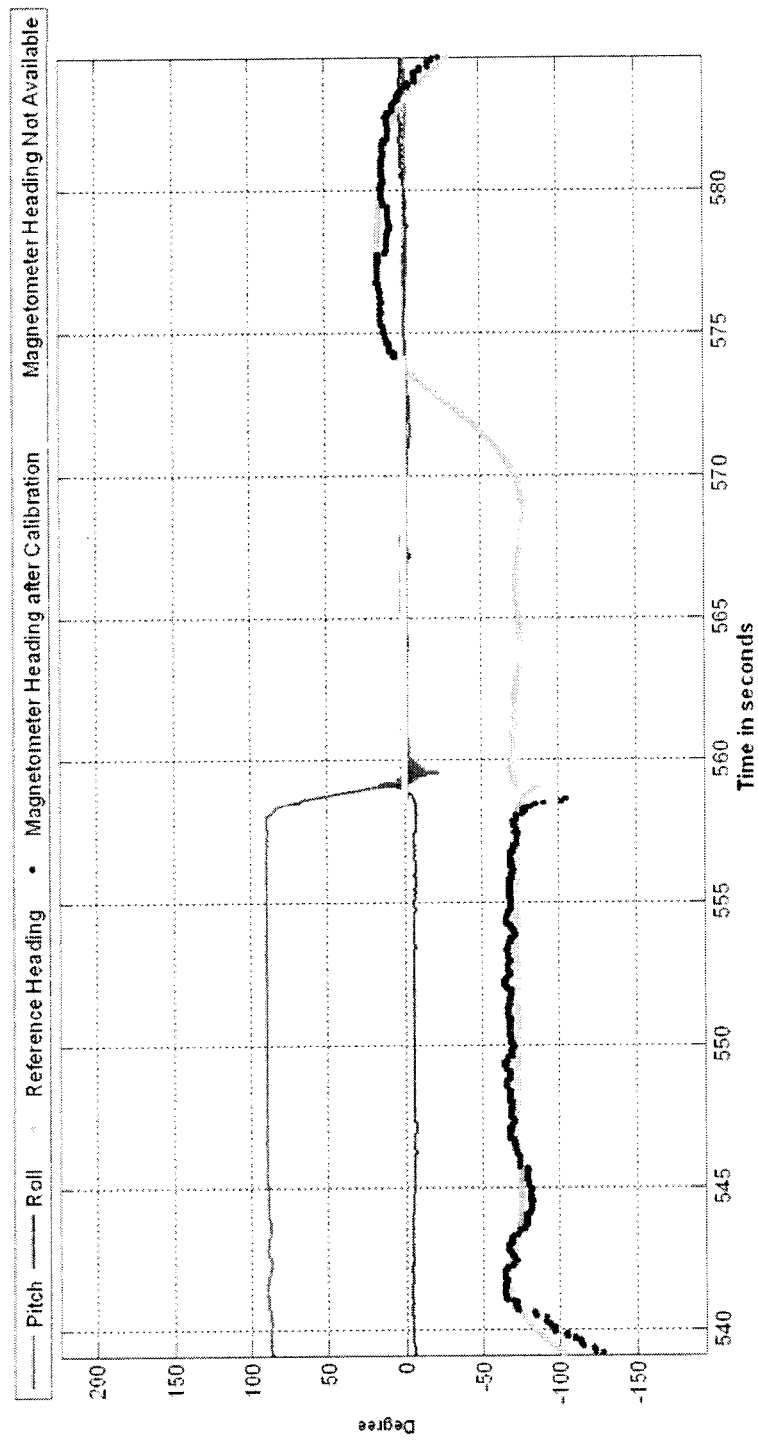
FIG. 13 shows a zoomed section of a portable device heading in a driving trajectory calculated using a magnetometer after performing 3D-space calibration using 2D calibration equations using external heading during calibration according to an embodiment of the invention.

For more demonstration, a zoomed section of the heading plot is shown in FIG. 13 Both the data collection stage and magnetometer usage for heading calculation are shown. At the beginning of each pitch-roll sector detected, the magnetometer is not used for heading calculation (at the data collection stage). Once the vehicle makes one turn covering about 90 degrees in heading when the device is placed in the same pitch-roll sector, calibration is performed and heading is calculated from calibrated magnetometer and plotted. 1.

The discontinuity of the drawn curves in the figures is due to the cyclicity of the heading and roll values where their range is from −180 degrees to 180 degrees.

The resulting heading calculated after magnetometer calibration shows how the magnetometer can be used as a reliable heading source in pedestrian navigation after 2D calibration using pitch-roll sectors is performed by the embodiment demonstrated in this example.

The Mean error is used as a measure to assess the calibration quality in the following experiments. The Mean error after calibration is compared to the Mean error before calibration. Mean error is only calculated when magnetometer heading is used, i.e. after data collection is done. The mean error represents the mean of the absolute difference the magnetometer heading and the reference heading. The Mean error before calibration in the pedestrian trajectory was 67 degrees and it became 5.2 degrees after calibration was done, while in driving trajectory it was 44 degrees and became 6 degrees after calibration.

Example 3: 3D Space Magnetometer Calibration Using 3D Magnetometer Calibration Equations for Heading Calculation when Heading Source is Available During Calibration The present example demonstrates the use of an embodiment of the present method and apparatus in which 3D magnetometer calibration is used to calculate 3D calibration parameters in the device frame.

Figure 14:
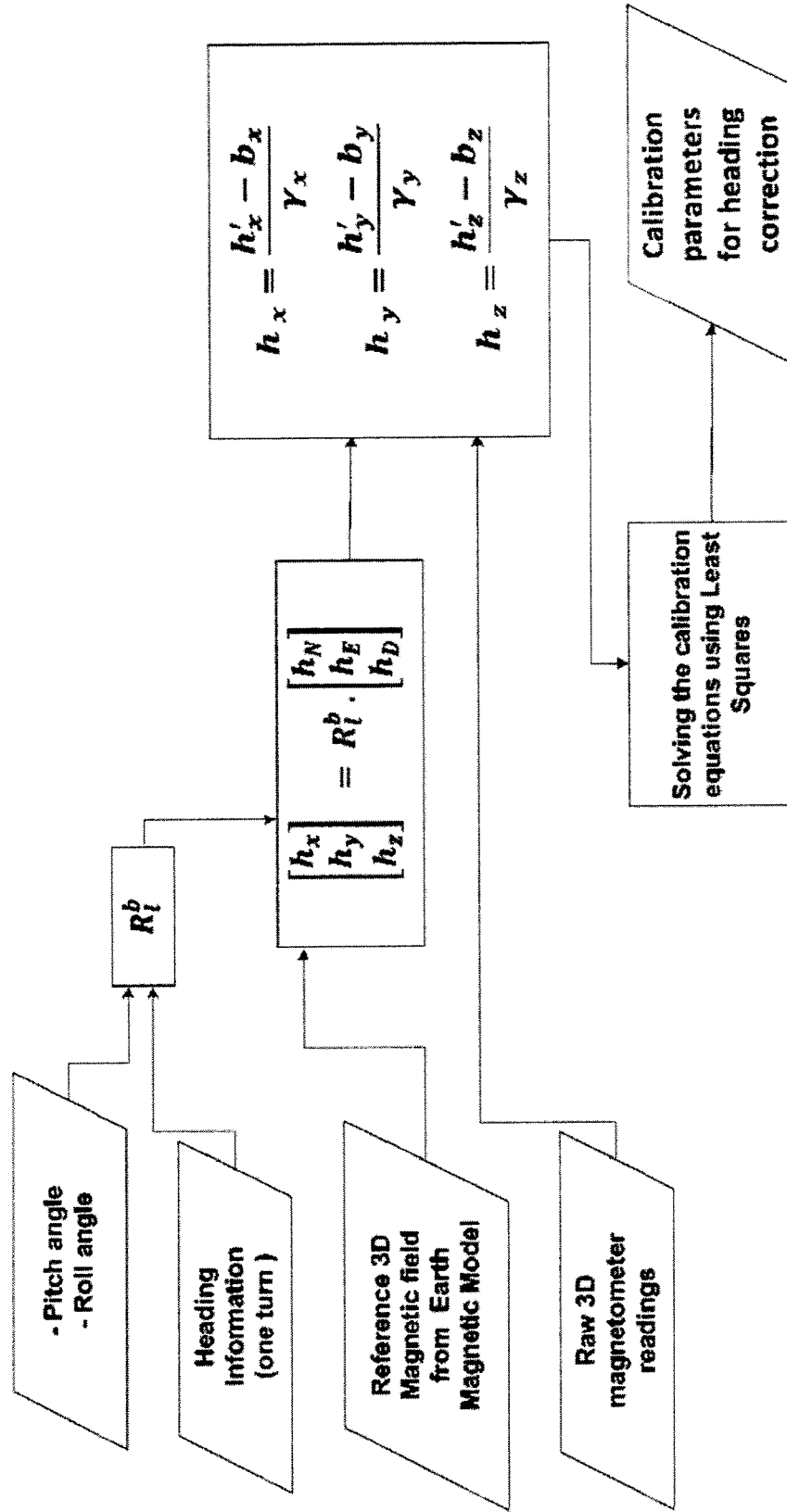
FIG. 14 shows a flow chart showing a method of performing 3D-space calibration using 3D calibration equations when external heading is available according to an embodiment of the invention.

The present method and apparatus is capable of calculating all the calibration parameters for the different error sources, however for demonstration purposes in this example the calibration parameters are only 3D biases and scale factors in the 3D magnetometer readings in device frame. The following inputs are required: (i) raw magnetometer readings, (ii) an external heading source, (iii) reference 3D earth magnetic field components for a certain region in earth at which calibration is performed (the earth horizontal magnetic field can be acquired according to any earth magnetic model (in this example the IGRF: the eleventh generation is used)), and (iv) pitch and roll values. FIG. 14 is a flow chart that shows the embodiment used in this example.

In this example external heading used during calibration is acquired from an integrated navigation solution that integrates accelerometers, gyroscopes, and barometers with GPS; the example herein demonstrates the application of 3D magnetometer calibration to calculate an accurate heading from magnetometer after calibration.

In this example GPS is used to calculate the position of the device to get the earth magnetic field components from the IGRF model in which only the initial position is used to access the model for a certain region on earth. In this example the IGRF model is stored in the device memory and accessed once the initial position is known using GPS.

Using heading value with corresponding pitch and roll values can be used for transforming the reference earth magnetic field components which are North-East-Down (N-E-D) frame to be in device frame (X-Y-Z).

X-Y-Z represents the three axes of the device having the magnetometer triad wherein X is the forward direction and Y is the lateral perpendicular direction and Z points downwards perpendicular on the plane having the X and Y axes. Different sets of heading, pitch, and roll values should be different enough to be able to solve calibration equation for calculating 3D biases and scale factors. The raw 3D magnetometer readings are represented as functions of biases and scale factors together with earth magnetic field components acquired according to the IGRF model. Mathematical or estimation approaches for example Least Square (LS) can be used to solve for 3D biases and scale factors using different sets of values including heading, pitch, and roll.

In this embodiment, 3D online magnetometer calibration is always used when the device is untethered so that the pitch and roll angles are changing with normal usage like holding the mobile in hand while the hand is dangling during walking, putting the mobile device in a pocket or using the mobile for voice calls and placing it close to the ear. The method does not require the user to perform certain movements with the mobile to perform the calibration; therefore the method is completely automatic.

For demonstration purposes the following equations are provided to describe how the present method and apparatus makes use of an external heading to calibrate magnetometer by calculating 3D biases and scale factors.

In the following equations bold capital letters represent vector or matrix quantities while normal font letters represent scalar quantities.

$$H_b = \begin{bmatrix} h_x \\ h_y \\ h_z \end{bmatrix} = R_l^b \cdot \begin{bmatrix} h_N \\ h_E \\ h_D \end{bmatrix} \quad (17)$$

wherein $h_N$, $h_E$, $h_D$ are the three magnetic field components taken from IGRF model in the local level frame, in which N represents North, E represents East and D represents Down.

$R_l^b$ is a 3×3 matrix, its terms are functions in heading, pitch and roll provided during calibration when the attitude of the device is known. It converts the magnetic field vector from the local level frame to the device frame.

$$R_l^b = \begin{bmatrix} \cos(p)\cos(h) & \cos(p)\sin(h) & -\sin(p) \\ -\cos(r)\sin(h) + \sin(r)\sin(p)\cos(h) & \cos(r)\cos(h) + \sin(r)\sin(p)\sin(h) & \sin(r)\cos(p) \\ \sin(r)\sin(h) + \cos(r)\sin(p)\cos(h) & -\sin(r)\cos(h) + \cos(r)\sin(p)\sin(h) & \cos(r)\cos(p) \end{bmatrix} \quad (18)$$

In the $R_l^b$ matrix the letter h refers to heading angle after subtracting declination angle, p refers to pitch angle while r refers to roll angle.

Therefore the left hand side of equation (17) is the three earth magnetic field components in the device frame which are represented as $h_x$, $h_y$ and $h_z$ forming the vector $H_b$.

From equations (17) and (18) the left hand side for the three following equations becomes known and can be used to calibrate the magnetometer readings and calculate the biases and scale factors for the three components in device frame.

Assume the magnetic field components are modeled as follows:

$$h_x = \frac{h'_x - b_x}{\gamma_x} \quad (19)$$

$$h_y = \frac{h'_y - b_y}{\gamma_y} \quad (20)$$

$$h_z = \frac{h'_z - b_z}{\gamma_z} \quad (21)$$

In equations (19), (20) and (21) $b_x$, $b_y$ and $b_z$ represent the biases in the device frame axes X, Y and Z respectively, while $\gamma_x$, $\gamma_y$ and $\gamma_z$ represent the scale factor error, $h'_x$, $h'_y$ and $h'_z$ represent the raw 3D magnetometer readings. The previous equations can be written as follows:

$$h_x = h'_x \cdot \left(\frac{1}{\gamma_x}\right) - \left(\frac{b_x}{\gamma_x}\right), h_y = h'_y \cdot \left(\frac{1}{\gamma_y}\right) - \left(\frac{b_y}{\gamma_y}\right), h_z = h'_z \cdot \left(\frac{1}{\gamma_z}\right) - \left(\frac{b_z}{\gamma_z}\right) \quad (22)$$

The unknowns are represented as follows:

$$A = \left(\frac{1}{\gamma_x}\right), B = \left(\frac{b_x}{\gamma_x}\right), C = \left(\frac{1}{\gamma_y}\right), D = \left(\frac{b_y}{\gamma_y}\right), E = \left(\frac{b_z}{\gamma_z}\right) \quad (23)$$

Using least square approach to for solving the previous equations using N readings in which the heading, pitch and roll values are unique enough to solve the system:

$$X_1 = \begin{pmatrix} A \\ B \end{pmatrix}, X_2 = \begin{pmatrix} C \\ D \end{pmatrix}, X_3 = \begin{pmatrix} E \\ F \end{pmatrix} \quad (24)$$

$$H_1 = \begin{bmatrix} h'_{x_1} & -1 \\ h'_{x_2} & -1 \\ \vdots & \vdots \\ h'_{x_N} & -1 \end{bmatrix}, H_2 = \begin{bmatrix} h'_{y_1} & -1 \\ h'_{y_2} & -1 \\ \vdots & \vdots \\ h'_{y_N} & -1 \end{bmatrix}, H_3 = \begin{bmatrix} h'_{z_1} & -1 \\ h'_{z_2} & -1 \\ \vdots & \vdots \\ h'_{z_N} & -1 \end{bmatrix} \quad (25)$$

$$Y_1 = \begin{pmatrix} h_{x_1} \\ h_{x_2} \\ \vdots \\ h_{x_N} \end{pmatrix}, Y_2 = \begin{pmatrix} h_{y_1} \\ h_{y_2} \\ \vdots \\ h_{y_N} \end{pmatrix}, Y_3 = \begin{pmatrix} h_{z_1} \\ h_{z_2} \\ \vdots \\ h_{z_N} \end{pmatrix} \quad (26)$$

The subscript N represents the number of readings; multiple readings can be collected for each device attitude (heading, pitch and roll).

$$H_1 * X_1 = Y_1, H_2 * X_2 = Y_2, H_3 * X_3 = Y_3 \quad (27)$$

$$[H_1^T * H_1]X_1 = H_1^T * Y_1, [H_2^T * H_2]X_2 = H_2^T * Y_2, [H_3^T * H_3]X_3 = H_3^T * Y_3 \quad (28)$$

$$X_1 = [H_1^T * H_1]^{-1} * H_1^T * Y_1, X_2 = [H_2^T * H_2]^{-1} * H_2^T * Y_2, X_3 = [H_3^T * H_3]^{-1} * H_3^T * Y_3 \quad (29)$$

From the equation (29) the unknown values representing biases and scale factors can be calculated as follows $$\gamma_x = \frac{1}{A}, b_x = \frac{B}{A}, \gamma_y = \frac{1}{C}, b_y = \frac{D}{C}, \gamma_z = \frac{1}{C}, b_z = \frac{D}{C} \quad (30)$$

According to previous equations the biases and scale factors can be calculated for the 3D magnetometer readings using LS approach with different device attitudes.

The technique presented herein can work with any misalignment between the device containing the magnetometer and the platform (person or vehicle). However, in this example the apparatus is assumed to be perfectly aligned to the human body during calibration in which the X-axis represents the forward direction for both the platform (the person) and device while the Y-axis is perpendicular to the X-axis and points to the right, and the Z-axis pointing down for both the platform and device. For demonstration purposes the embodiment is used to calibrate a magnetometer for heading determination in a PDR solution where the device used is untethered and free to move by a pedestrian (portable device) after being calibrated when the device was perfectly aligned during calibration.

Data Collection and Results

In this example the apparatus used involves a 3D magnetometer; therefore data collected is as follows: the three magnetometer readings in the device frame, pitch, roll and heading of the device. Data is collected at each epoch according to the frequency the sensors are working with.

In this example a 3D magnetometer calibration embodiment is demonstrated for calculating 3D biases and scale factors and to calculate heading of a portable device which can be used in pedestrian navigation. A mathematical approach used in solving calibration equations in this example is Least Square (LS) approach, since LS is able to solve an over determined system when given large number of readings. In this example, for 3D calibration to be achieved using an external heading source sufficient data must be collected during calibration: the sufficient coverage that that this embodiment requires is exactly two heading values from two different directions separated by 70 to 80 degrees, exactly two different pitch values separated by 15 to 20 degrees, and exactly two roll values separated by 15 to 20 degrees. This is considered little space coverage. Therefore, to collect sufficient data for this embodiment to perform 3D calibration for biases and scale factors, the device is required to be moved for one heading turn which is very common and easy to achieve during walking, and to change its pitch and roll by 20 degrees which provides the opportunity to perform 3D magnetometer calibration while hand dangling or when the mobile is in the pants pocket while the pedestrian turns 90 degrees.

For each heading direction multiple samples can be collected to provide a smoother solution and to avoid taking a reading affected by noise due to the use of a low cost MEMS grade sensor. LS approach is able to solve the calibration equation when extra readings are collected.

The technique presented herein can work with any misalignment between the device containing the magnetometer and the platform (person or vehicle). However, in this example, for demonstration purposes, the prototype having the magnetometer is assumed to be aligned to the human body having zero heading misalignment, where the X-axis represents the forward direction for both the platform (the person) and device while the Y-axis is perpendicular to the X-axis and points to the right, and the Z-axis points down relative to both the platform and device.

Figure 17:
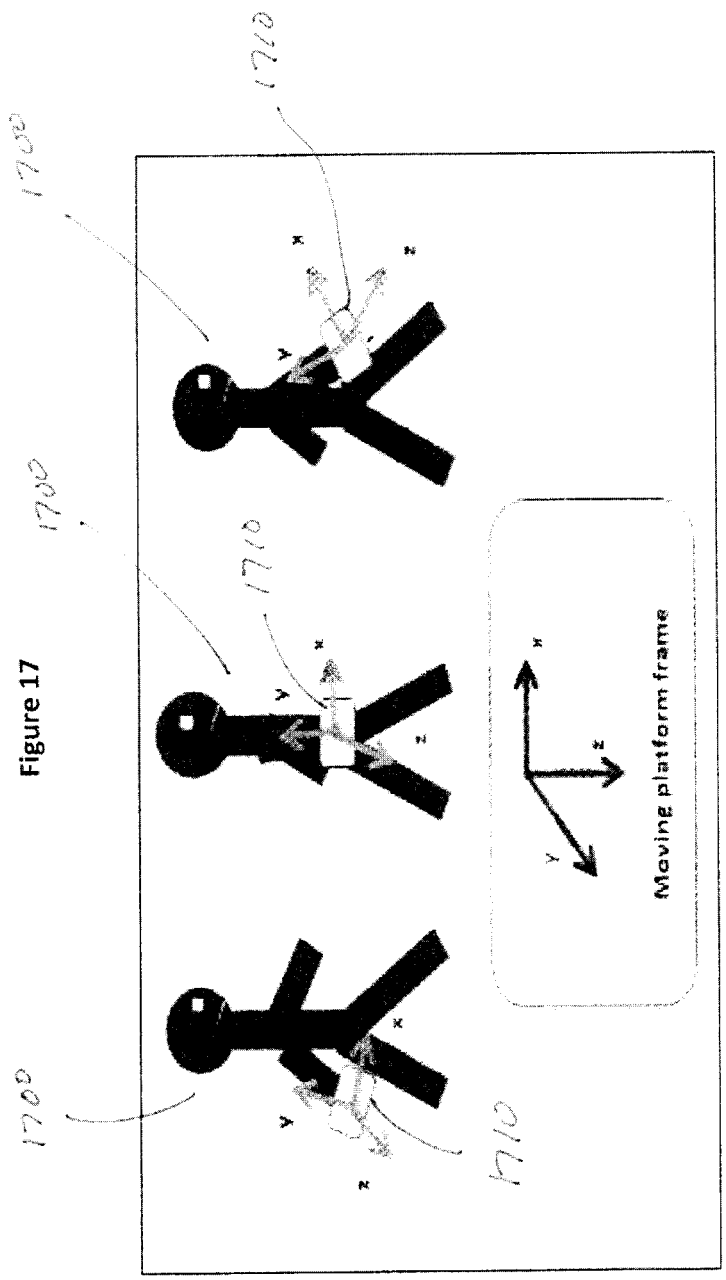
FIG. 17 shows an example of a "hand-dangling" device usage use-case

For demonstration purposes three PDR trajectories are conducted in which heading is calculated from the magnetometer after 3D calibration is performed. The first demonstrating trajectory is done where the pedestrian 1700 moves in rectangular loops, this device usage scenario is called "hand held" use-case, in each two consecutive rectangular loops he holds the device 1710 with a different pitch and/or roll, then changes the devices pitch and/or roll in the next two rectangular loops. The second demonstrating trajectory is conducted when the pedestrian 1700 moves in rectangular loops while hand dangling the phone; this device usage scenario is called hand-dangling use-case, and is demonstrated in FIG. 17. The third demonstrating trajectory is conducted where the pedestrian places the device in his or hers trouser pocket, this device usage scenario is called "trousers pocket" use-case.

Figure 15:
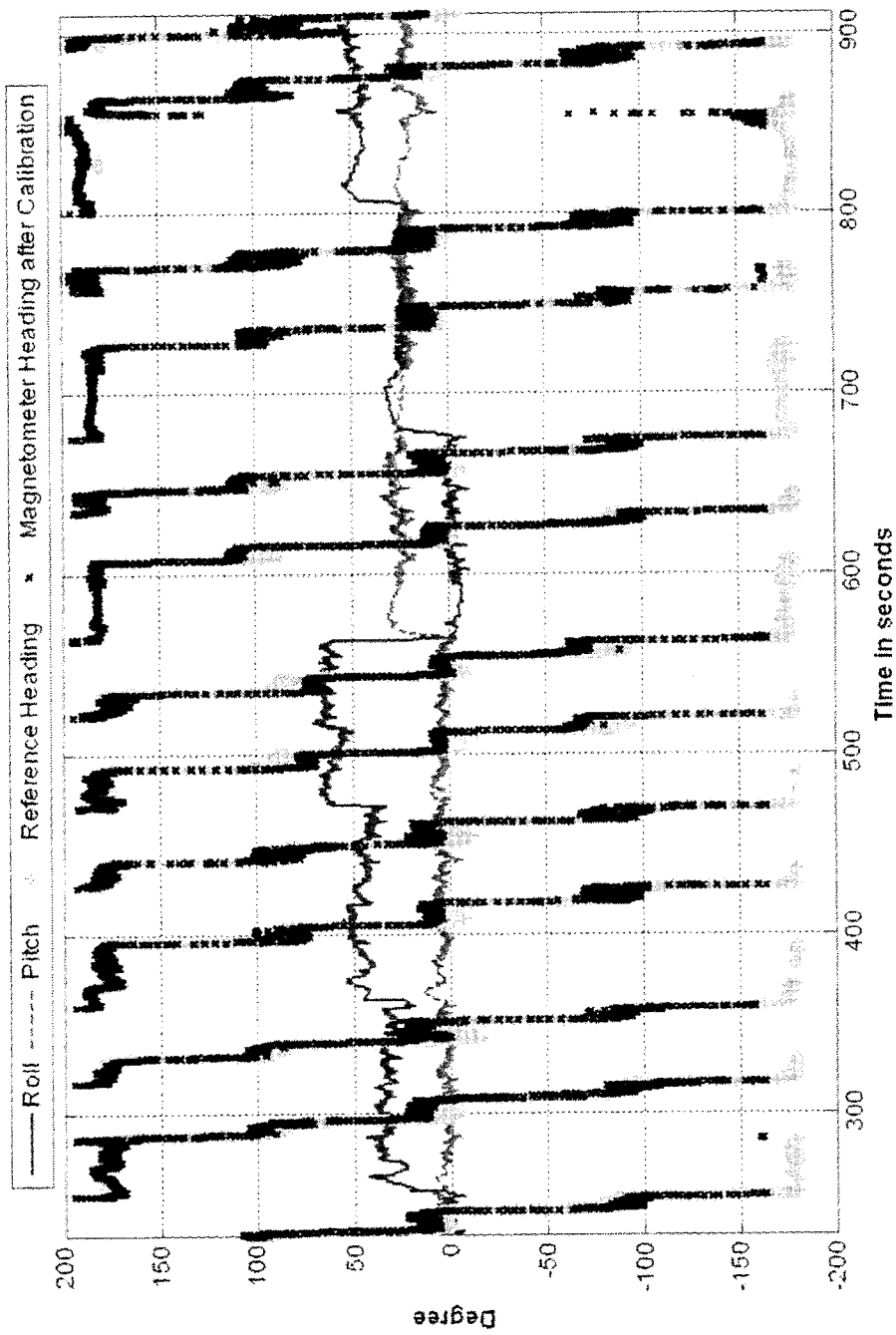
FIG. 15 shows a pedestrian heading calculated using a magnetometer after performing 3D-space calibration using 3D calibration equations using external heading during calibration in a hand-held use-case according to an embodiment of the invention.
Figure 18:
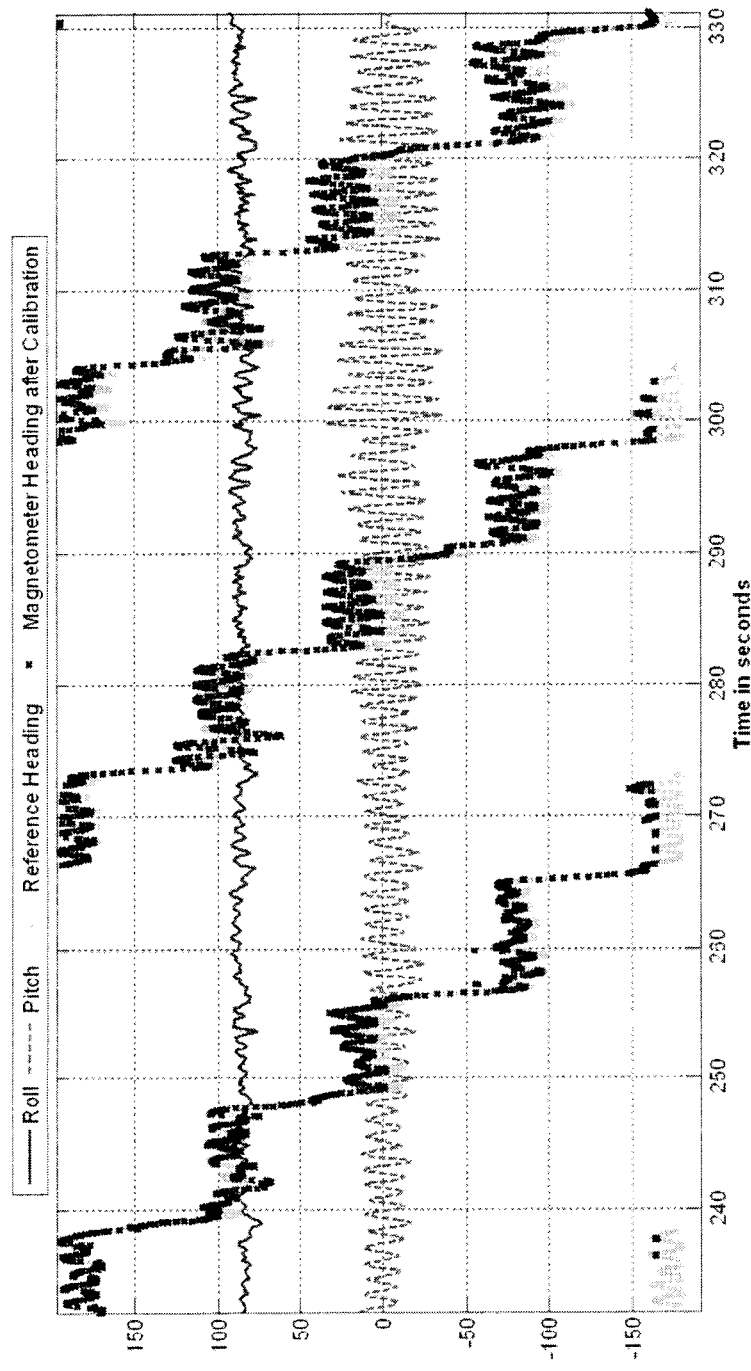
FIG. 18 shows a pedestrian heading calculated using a magnetometer after performing 3D-space calibration using 3D calibration equations using external heading during calibration in a hand-dangling use-case according to an embodiment of the invention.
Figure 20:
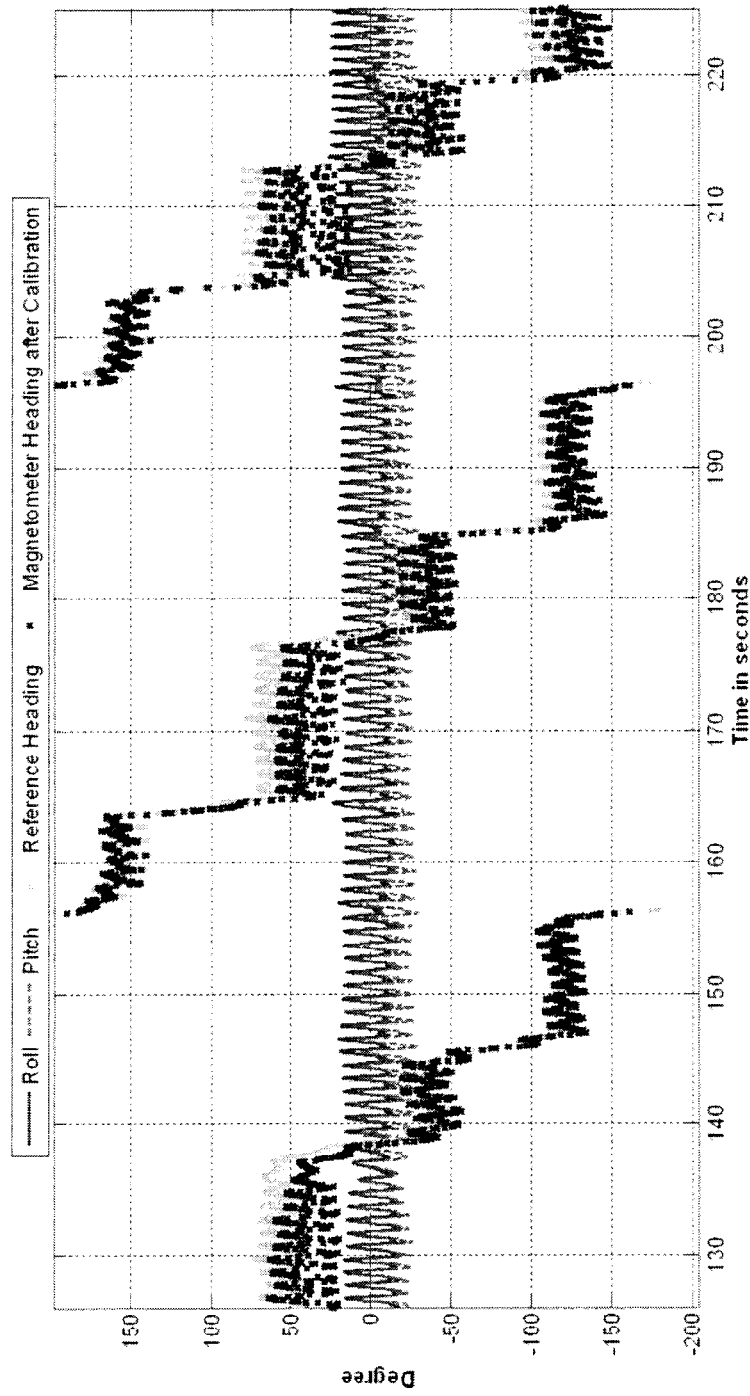
FIG. 20 shows a pedestrian heading calculated using a magnetometer after performing 3D-space calibration using 3D calibration equations using external heading during calibration in a trousers-pocket use-case according to an embodiment of the invention.

FIGS. 15, 18, and 20 show the heading calculated using a magnetometer after calibration is performed in hand-held trajectory, hand-dangling trajectory, and Trousers-pocket trajectory respectively.

The heading is shown in the figures after calibration is performed. The calibrated magnetometer heading is compared to a reference heading obtained from an integrated navigation solution that integrates accelerometers, gyroscopes, and barometers with GPS in open sky, assuming zero heading misalignment between the device and the platform.

Figure 16:
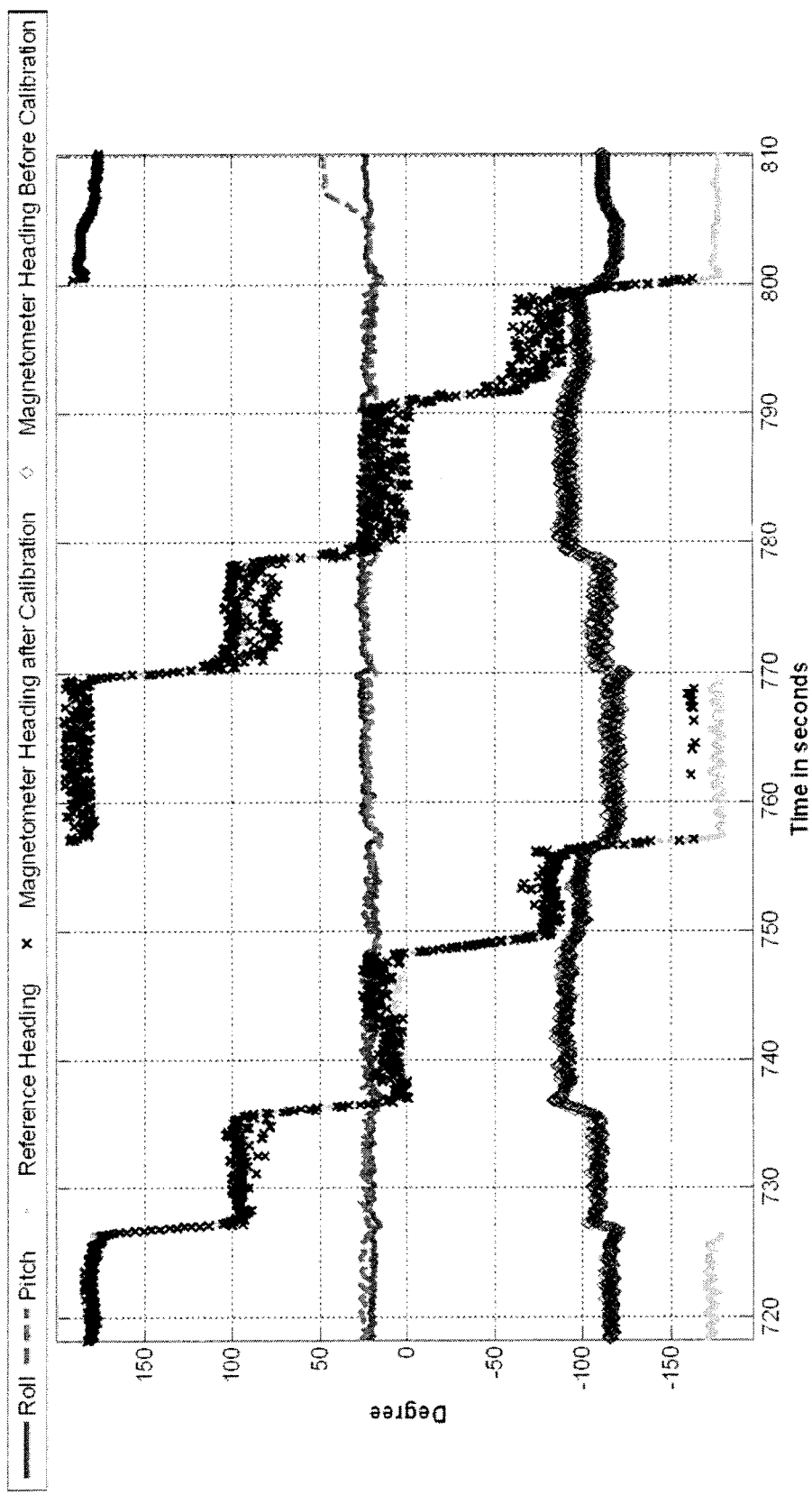
FIG. 16 shows a zoomed section of a pedestrian heading calculated using a magnetometer after performing 3D-space calibration using 3D calibration equations using external heading during calibration in a hand-held use-case according to an embodiment of the invention.
Figure 19:
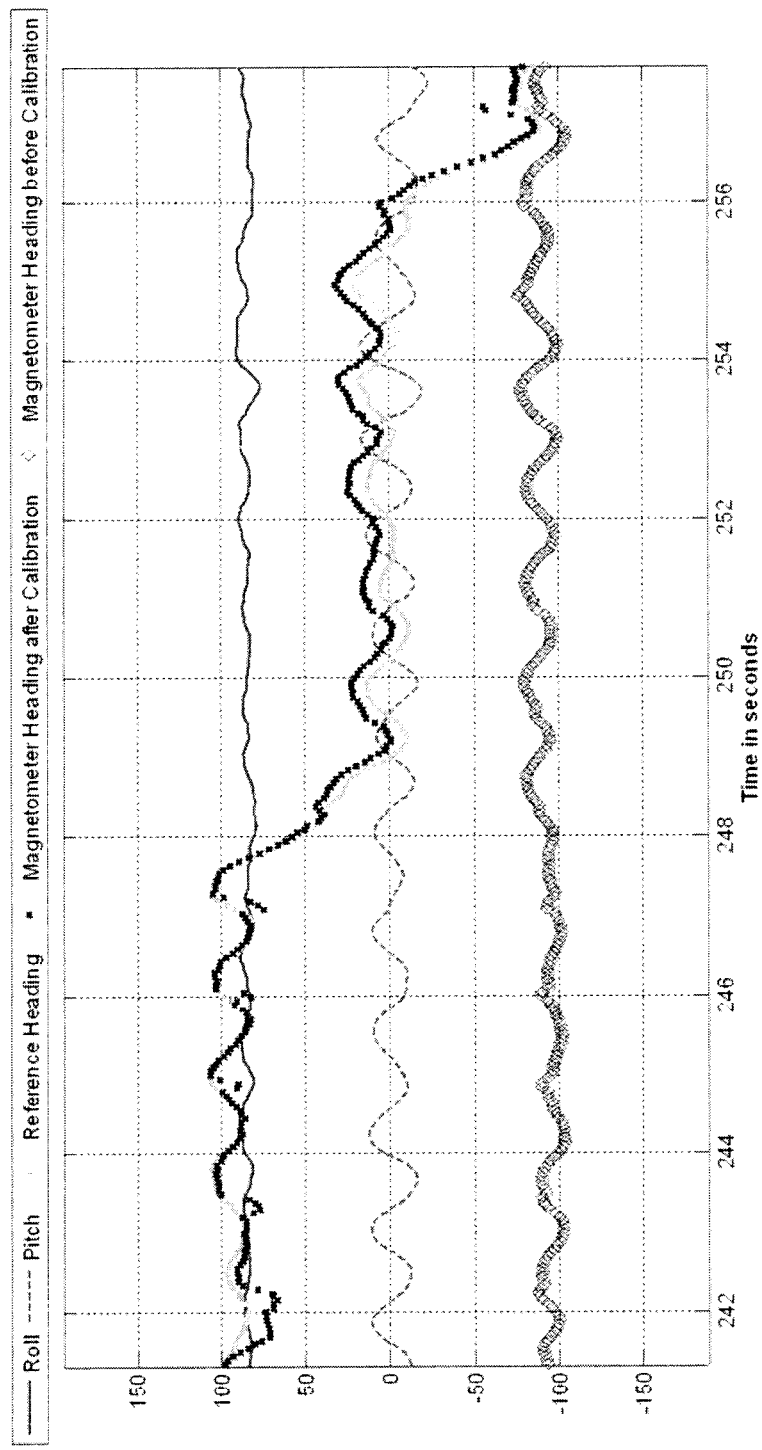
FIG. 19 shows a zoomed section of a pedestrian heading calculated using a magnetometer after performing 3D-space calibration using 3D calibration equations using external heading during calibration in a hand-dangling use-case according to an embodiment of the invention.
Figure 21:
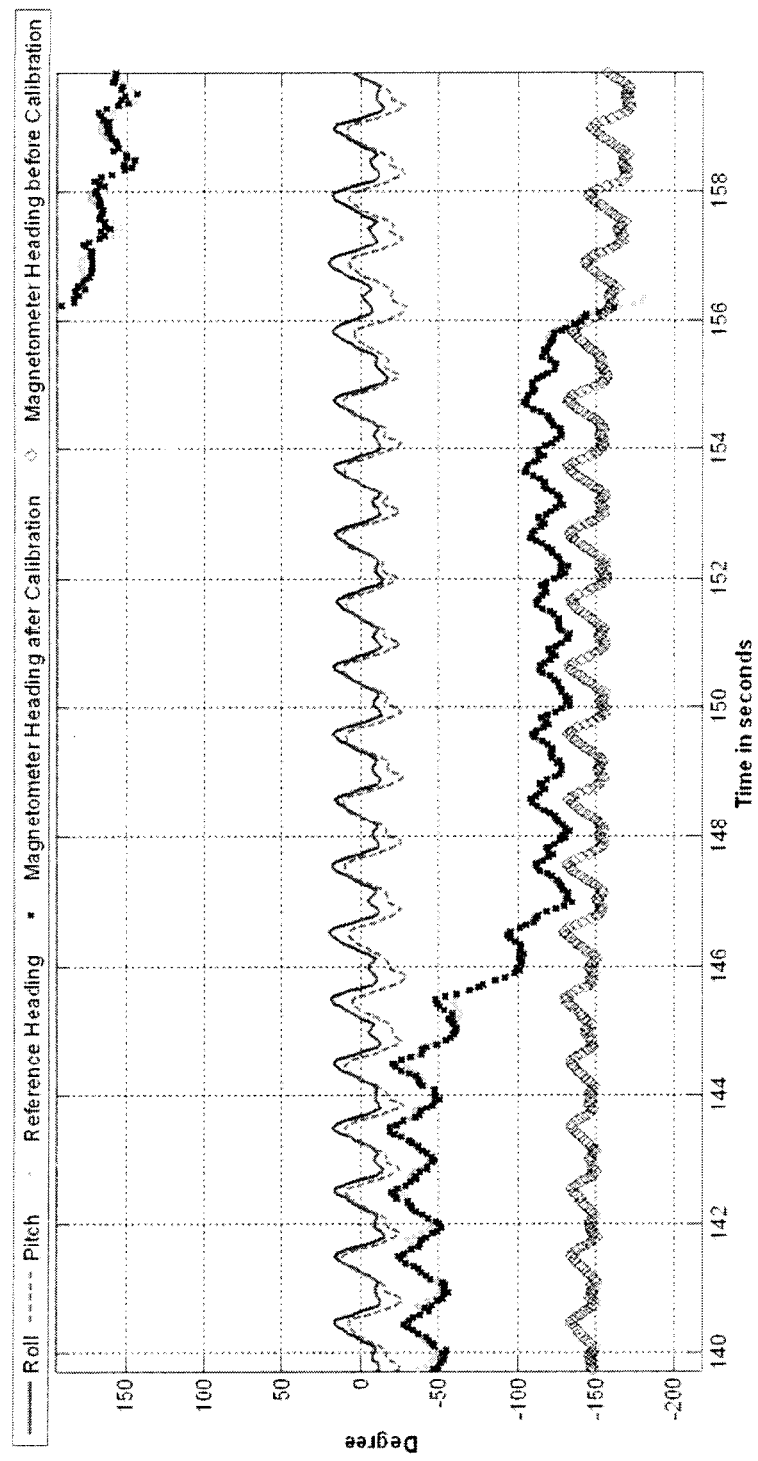
FIG. 21 shows a zoomed section of a pedestrian heading calculated using a magnetometer after performing 3D-space calibration using 3D calibration equations using external heading during calibration in a trousers-pocket use-case according to an embodiment of the invention.

FIG. 16, FIG. 19. and FIG. 21 are zoomed sections for the hand-held, hand-dangling, and the trousers-pocket trajectories respectively.

The discontinuity of the drawn curves in the figures is due to the cyclicity of the heading and roll values where their range is from −180 degrees to 180 degrees.

In order to prove the robustness of the proposed 3D calibration technique, the calibration parameters (biases and scale factors in magnetometer readings) calculated in one trajectory will be used to calibrate magnetometer readings in the other two trajectories.

The resulting heading calculated after magnetometer calibration shows how the magnetometer can be used as a reliable heading source in pedestrian navigation after 3D calibration is performed in the embodiment demonstrated in this example.

The Mean error is used as a measure to assess the calibration quality in the following experiments. The Mean error after calibration is compared to the Mean error before calibration. Mean error is only calculated when magnetometer heading is used, i.e. after data collection is done. The Mean error represents the mean of the absolute difference the magnetometer heading and the reference heading. Table 1 shows the Mean error before and after calibration is done. Moreover, it shows the effect of using calibration parameters calculated using certain device usage use-case and then applied in another device usage use-case.

TABLE 1

| Trajectory | Mean Error before calibration (degrees) | Mean Error after calibration (degrees) |
|---|---|---|
| Handheld (calibration parameters calculated in the same Trajectory) | 144 | 4.8 |
| Handheld (calibration parameters calculated from Hand-dangling trajectory) | 144 | 5.3 |

TABLE 1-continued

| Trajectory | Mean Error before calibration (degrees) | Mean Error after calibration (degrees) |
|---|---|---|
| Handheld (calibration parameters calculated from Trousers-pocket trajectory) | 144 | 7.1 |
| Trousers-pocket (calibration parameters calculated from the same trajectory) | −120 | 8 |
| Trousers-pocket (calibration parameters calculated from Handheld trajectory) | −120 | 6.4 |
| Trousers-pocket (calibration parameters calculated from Hand-dangling trajectory) | −120 | −7.5 |
| Hand-dangling (calibration parameters calculated from the same trajectory) | 70 | 1.9 |
| Hand-dangling (calibration parameters calculated from Handheld trajectory) | 70 | 3 |
| Hand-dangling (using calibration parameters calculated from Trousers-pocket trajectory) | 70 | 9.5 |

Example 4: 3D Space Magnetometer Calibration Using 3D Magnetometer Calibration Equations for Heading Determination when No Heading Source is Available During Calibration The present example demonstrates the use of one embodiment of the present method and apparatus in which 3D magnetometer calibration is used to calculate 3D calibration parameters in a device frame when no external source is available or when a 3D magnetometer calibration is required without depending on external heading sources.

The present method and apparatus is capable of calculating all the calibration parameters for the different error sources, however for demonstration purposes in this example the calibration parameters are only 3D biases and scale factors in the 3D magnetometer readings in device frame. The following inputs are required: (i) raw magnetometer readings, (ii) reference 3D earth magnetic field components for a certain region in earth at which calibration is performed (the earth horizontal magnetic field can be acquired according to any earth magnetic model (in this example the IGRF: the eleventh generation is used)), (iii) a model for gravity that is able to calculate the free fall acceleration value in certain region on earth given latitude and altitude, and (iv) pitch and roll values.

In the embodiment used in this example the heading is not required for calculating 3D biases and scale factors; what is needed is several pitch and roll values in which the absolute difference between the maximum and the minimum is sufficient to solve the calibration equations. The gravity model used to calculate the earth's gravity at a certain region of earth can be given latitude and altitude values which can be calculated using any absolute navigational information (such as, for example, GNSS, WiFi, or any other wireless technique), or an integrated navigation system integrating any absolute navigation system with any sensor or sensors (such as gyroscopes, accelerometers, barometers, odometers). For altitude, the information can also be acquired using barometer only.

In this example the gravity model used is stored in the device memory and accessed once the initial position is known using GPS given the latitude and altitude values calculated by GPS.

In this example GPS is used to calculate the position of the device to be able to get the earth magnetic field components from the IGRF model when only the initial position is used to access the model for certain region on earth.

In this example the IGRF model is stored in the device memory and accessed once the initial position is known using GPS.

Figure 22:
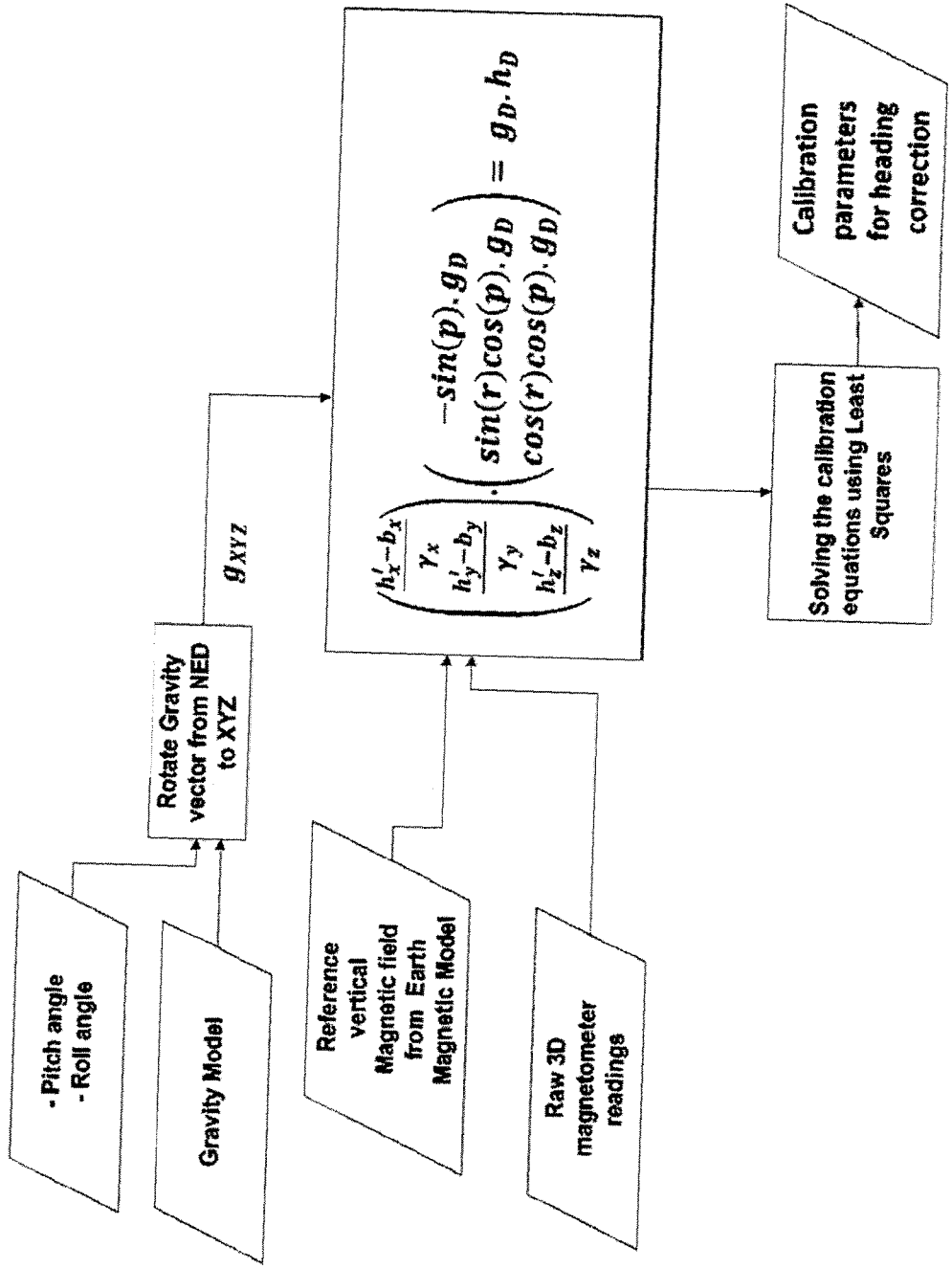
FIG. 22 is a flow chart showing the performance of 3D-space calibration using 3D calibration equations without external heading according to an embodiment of the invention.

FIG. 22 is a flow chart showing the embodiment used in this example.

The way the 3D biases and scale factors are calculated starts after collecting sufficient data of pitch and roll values; the gravity value is acquired from the gravity model. The gravity vector in local level frame has zero components in north and east directions, while the only nonzero component is the component in the down direction, which value is the one acquired from the gravity model. This vector is rotated using pitch and roll according to the device motion, and after rotation using pitch and roll the vector will represent the gravity vector in the device frame. The 3D earth's magnetic field vector in the local level frame is represented in three components; one pointing to the earth's north, one to the east and one pointing down and they are taken from the IGRF model directly when the region on earth is known. The same 3D earth's magnetic field vector can be represented in the device frame as a function of the 3D magnetometer readings with biases added as unknowns and then multiplied by scale factors also as unknowns. As the angle between the gravity vector and the 3D magnetic field vector is constant (90 degrees—Inclination angle) then the dot product between the gravity vector and the earth magnetic field vector in the local level frame is equal to the dot product between the gravity vector and the earth magnetic field vector in the device frame. Depending on this relation, mathematical or estimation approaches for example Least Square (LS) can be used to get biases and scale.

For demonstration purposes the following equations are given to describe how the present method and apparatus makes use of an external heading to calibrate a magnetometer by calculating 3D biases and scale factors.

In the following equations bold capital letters represent vector or matrix quantities while normal font letters represent scalar quantities.

The gravity vector used is as follows:

$$\vec{g_{NED}} = \begin{pmatrix} 0 \\ 0 \\ g_D \end{pmatrix} \quad (31)$$

The subscript D in $g_D$ stands for the Down direction and can be calculated from the formula given in equation (32) as follows:

$$g_D = \quad (32)$$
$$a_1(1 + a_2\sin(Lat^2)) + a_3\sin(Lat^4) + Alt \times (a_4 + a_5\sin(Lat^2)) + a_6 Alt^2$$

The symbol Lat stands for Latitude while Alt stands for Altitude both in local level frame which can be calculated when GPS is available or the Altitude can be calculated using a barometer, and the latitude is given initially to the calibration method using any navigation technique to provide accurate latitude.

In the device frame the gravity vector can be read directly from a 3D accelerometer, but this will only be true when the device is completely static or moving with a uniform speed, which is not typically applicable to pedestrian applications. Therefore the gravity vector is rotated from the local level frame using a rotation matrix R which is formed of only pitch and roll values that can be collected while moving with any speed. This matrix needs the pitch and roll values to be calculated accurately before applying the calibration. The gravity vector in device frame is given as follows:

$$\vec{g_{XYZ}} = R \begin{pmatrix} 0 \\ 0 \\ g_D \end{pmatrix} \quad (33)$$

while the matrix R is as follows $$R = \begin{pmatrix} \cos(\text{pitch}) & 0 & -\sin(\text{pitch}) \\ \sin(\text{roll})\sin(\text{pitch}) & \cos(\text{roll}) & \sin(\text{roll})\cos(\text{pitch}) \\ 0 & -\sin(\text{roll}) & \cos(\text{roll})\cos(\text{pitch}) \end{pmatrix} \quad (33)$$

Substituting equation (34) in equation (33):

$$\vec{g_{XYZ}} = R \cdot \begin{pmatrix} 0 \\ 0 \\ g_D \end{pmatrix} = \begin{pmatrix} -\sin(p) \cdot g_D \\ \sin(r)\cos(p) \cdot g_D \\ \cos(r)\cos(p) \cdot g_D \end{pmatrix} \quad (35)$$

The magnetic field readings are assumed to be modeled as follows:

$$\begin{pmatrix} h_x \\ h_y \\ h_z \end{pmatrix} = \begin{pmatrix} \dfrac{hx' - bx}{\delta_x} \\ \dfrac{hy' - by}{\gamma_y} \\ \dfrac{hz' - bz}{\gamma_z} \end{pmatrix} \quad (36)$$

In equation (36), $b_x$, $b_y$ and $b_z$ represent the biases in the device frame axes X, Y and Z respectively while $\gamma_x$, $\gamma_y$ and $\gamma_z$ represent the scale factor error. $h'_x$, $h'_y$ and $h'_z$ represent the raw 3D magnetometer readings.

The relation acquired from knowing that the dot product is constant in device frame and in local level frame is as follows:

$$\begin{pmatrix} h_x \\ h_y \\ h_z \end{pmatrix} \cdot \vec{g_{XYZ}} = \begin{pmatrix} h_N \\ h_E \\ h_D \end{pmatrix} \cdot \vec{g_{NED}} \quad (37)$$

By substituting for $\vec{g_{NED}}$ form equation (31), substituting for the vector representing the earth magnetic field components from equation (36) and substituting for $\vec{g_{XYZ}}$ from equation (35) in equation 37 and solving right hand side $$\begin{pmatrix} \dfrac{hx' - bx}{\delta_x} \\ \dfrac{hy' - by}{\gamma_y} \\ \dfrac{hz' - bz}{\gamma_z} \end{pmatrix} \cdot \begin{pmatrix} -\sin(p) \cdot g_D \\ \sin(r)\cos(p) \cdot g_D \\ \cos(r)\cos(p) \cdot g_D \end{pmatrix} = g_D \cdot h_D \quad (38)$$

Solving equation (38):

$$-\sin(\text{pitch})g_D h'_x\left(\frac{1}{\gamma_x}\right) + \sin(\text{pitch})g_D\left(\frac{b_x}{\gamma_x}\right) + \qquad (39)$$
$$\sin(\text{roll})\cos(\text{pitch})g_D h'_y\left(\frac{1}{\gamma_y}\right) - \sin(\text{roll})\cos(\text{pitch})g_D\left(\frac{b_y}{\gamma_y}\right) +$$
$$\cos(\text{roll})\cos(\text{pitch})g_D h'_z\left(\frac{1}{\gamma_z}\right) - \cos(\text{roll})\cos(\text{pitch})g_D\left(\frac{b_z}{\gamma_z}\right) = g_D h_D$$

Assuming $$M = -\sin(\text{pitch})g_D h'_x \qquad (40)$$
$$N = \sin(\text{pitch})g_D \qquad (41)$$
$$P = \sin(\text{roll})\cos(\text{pitch})g_D h'_y \qquad (42)$$
$$Q = -\sin(\text{roll})\cos(\text{pitch})g_D \qquad (43)$$
$$R = \cos(\text{roll})\cos(\text{pitch})g_D h'_z \qquad (44)$$
$$S = -\cos(\text{roll})\cos(\text{pitch})g_D \qquad (45)$$

The unknowns are represented as follows:

$$A = \left(\frac{1}{\gamma_x}\right), B = \left(\frac{b_x}{\gamma_x}\right), C = \left(\frac{1}{\gamma_y}\right), D = \left(\frac{b_y}{\gamma_y}\right), E = \left(\frac{b_z}{\gamma_z}\right) \qquad (46)$$

Using least square approach to solving the previous equations using N readings in which the pitch and roll values are unique enough to solve the system $$\begin{pmatrix} M_1 & N_1 & P_1 & Q_1 & R_1 & S_1 \\ M_2 & N_2 & P_2 & Q_2 & R_2 & S_2 \\ \vdots & \vdots & \vdots & \vdots & \vdots & \vdots \\ M_N & N_N & P_N & Q_N & R_N & S_N \end{pmatrix} \begin{pmatrix} A \\ B \\ C \\ D \\ E \\ F \end{pmatrix} = \begin{pmatrix} g_{D_1}h_{D_1} \\ g_{D_2}h_{D_2} \\ \vdots \\ g_{D_N}h_{D_N} \end{pmatrix} \qquad (47)$$

Assuming that $$X = \begin{pmatrix} A \\ B \\ C \\ D \\ E \\ F \end{pmatrix} \qquad (48)$$

$$H = \begin{pmatrix} M_1 & N_1 & P_1 & Q_1 & R_1 & S_1 \\ M_2 & N_2 & P_2 & Q_2 & R_2 & S_2 \\ \vdots & \vdots & \vdots & \vdots & \vdots & \vdots \\ M_N & N_N & P_N & Q_N & R_N & S_N \end{pmatrix} \qquad (49)$$

$$Y_1 = \begin{pmatrix} g_{D_1}h_{D_1} \\ g_{D_2}h_{D_2} \\ \vdots \\ g_{D_N}h_{D_N} \end{pmatrix} \qquad (50)$$

The subscript N represents the number of readings; multiple readings can be collected for each device attitude (heading, pitch and roll).

$$H*X = Y \qquad (51)$$
$$[H^T*H]X = H^T*Y \qquad (52)$$
$$X = [H^T*H]^{-1}*H^T*Y \qquad (53)$$

From equation (53) the unknown values representing biases and scale factors can be calculated as follows:

$$\gamma_x = \frac{1}{A}, b_x = \frac{B}{A}, \gamma_y = \frac{1}{C}, b_y = \frac{D}{C}, \gamma_z = \frac{1}{C}, b_z = \frac{D}{C} \qquad (54)$$

According to previous equations the biases and scale factors can be calculated for the 3D magnetometer readings using LS approach with different device attitudes.

For each device attitude of certain heading, roll and pitch multiple samples can be collected to give a smoother solution and to avoid taking a reading affected by noise due to the use of a low cost MEMS grade sensor. The previous method can be applied online during normal device usage.

Data Collection and Results

In this example the apparatus used involves a 3D magnetometer; therefore data collected is as follows: the three magnetometer readings in the device frame, and device pitch and device roll. Data is collected at each epoch according to the frequency the sensors are working with.

In this example 3D magnetometer calibration embodiment is demonstrated for calculating 3D biases and scale factors to calculate heading of a portable device which can be used in pedestrian navigation. A mathematical approach used in solving calibration equations in this example is Least Square (LS) approach, since LS is able to solve an over determined system when given large number of readings. In this example, for 3D calibration to be achieved without using an external heading source, sufficient data must be collected during calibration. The sufficient coverage that that this embodiment requires is several (at least 3 unique) pitches and several (at least 3 unique) rolls in which the absolute difference between each pitch angle is at least 15 to 20, and the same difference is required for roll angles. This is considered little space coverage.

For each pitch or roll orientation, multiple samples can be collected to give a smoother solution and to avoid taking a reading affected by noise due to the use of a low cost MEMS grade sensor. The LS approach is able to solve the calibration equation when extra readings are collected.

The technique presented herein can work with any misalignment between the device containing the magnetometer and the platform (person or vehicle). However, in this example, for demonstration purposes, the prototype having the magnetometer is assumed to be aligned to the human body having zero heading misalignment, wherein the X-axis represents the forward direction for both the platform (the person) and device while the Y-axis is perpendicular to the X-axis and points to the right and the Z-axis points down relative to both the platform and device.

For demonstration purposes a PDR trajectory is made in which heading is calculated from the magnetometer after 3D calibration is performed as discussed in this example. In this example a demonstrating trajectory is made in which the pedestrian moves in rectangular loops; in each two consecutive rectangular loops he or she holds the device with a different pitch and/or roll, then changes the devices pitch and/or roll in the next two rectangular loops.

Figure 23:
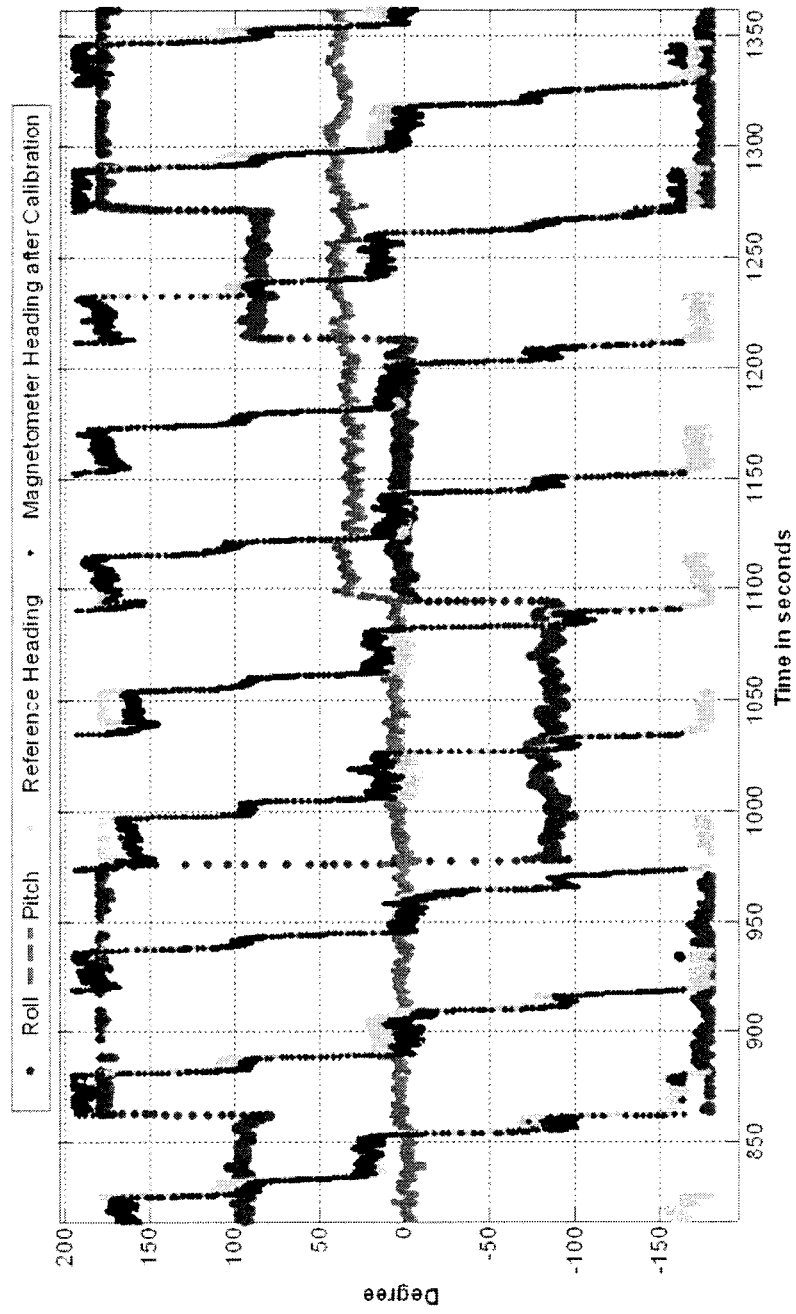
FIG. 23 shows a pedestrian heading calculated using a magnetometer after performing 3D-space calibration using 3D calibration equations without using external heading during calibration in a hand-held use-case according to the invention.

FIG. 23 shows the heading calculated using a magnetometer after calibration is performed for biases and scale factors. Data collection is not shown in FIG. 23; the calibrated magnetometer heading is compared to a reference heading obtained from an integrated navigation solution that integrates accelerometers, gyroscopes, barometers with GPS in open sky.

Figure 24:
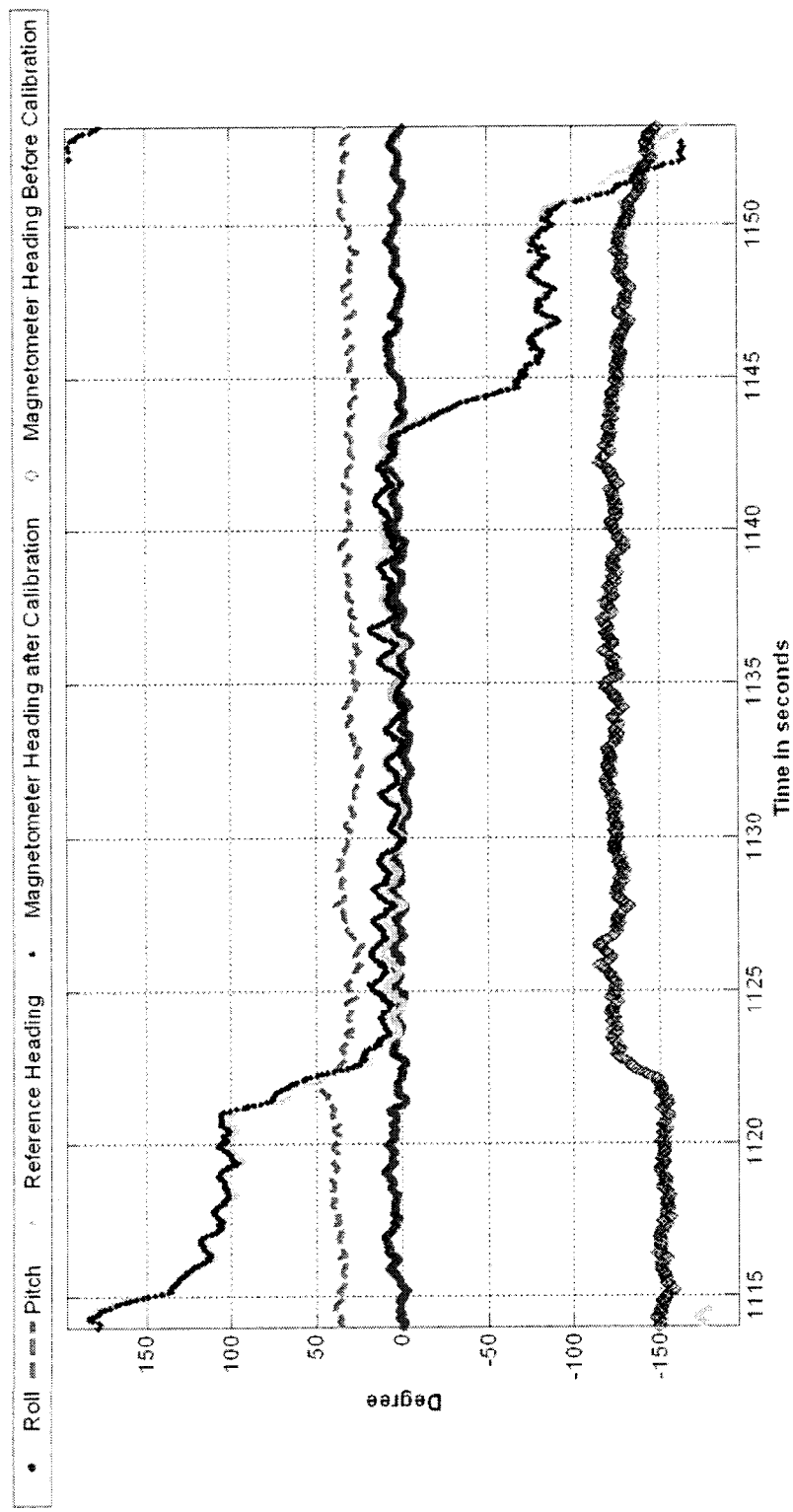
FIG. 24 shows a zoomed section of a pedestrian heading calculated using a magnetometer after performing 3D-space calibration using 3D calibration equations without using external heading during calibration in a hand-held use-case according to the invention.

For more demonstration, a zoomed section of the heading plot is shown in FIG. 24.

The discontinuity of the drawn curves in the figures is due to the cyclicity of the heading and roll values where their range is from −180 degrees to 180 degrees.

The resulted heading calculated after magnetometer calibration shows how the magnetometer can be used as a reliable heading source in pedestrian navigation after 3D calibration is performed in the embodiment demonstrated in this example.

The Mean error is used as a measure to assess the calibration quality in the following experiments. The Mean error after calibration is compared to the Mean error before calibration. Mean error is only calculated when a magnetometer heading is used, i.e. after data collection is done. The Mean error represents the mean of the absolute difference the magnetometer heading and the reference heading. The mean error before calibration in the pedestrian trajectory was 40 degrees and it became 4.8 degrees after calibration was done.

Example 5: Using Quality Check Routines for Calibration Assessment

The present example demonstrates the use of quality check routines that can be used for the assessment of the calibration parameters. If the magnetometer readings are not well calibrated and if the application in which calibration is required is determining the heading, then the heading calculated from magnetometer will be inaccurate and will result in a position error. The calibrated magnetometer readings can be invalid for heading calculation for many reasons; like changing the environment when entering an elevator after walking in a corridor, or if a magnet is placed near the navigation device. Therefore quality checks are essential for using a magnetometer for reliable heading estimation. In this example calibration parameters are not discarded in case they fail the quality checks, obviously they are not used at this time sample, but they can be saved for further use. Therefore there is specific space in memory assigned for storing the calibration parameters that succeeded certain number of checks called a "Shelf".

In the present example two different routines can be called to perform quality checks on calibration parameters, namely: (i) "PostCalibrationChecksRoutine" and (ii) "PeriodicChecksRoutine". The way parameters are stored in "Shelf" is discussed with the "PeriodicChecksRoutine".

In this example another common routine called "QualityChecksRoutine" is called by both "PostCalibrationChecksRoutine" and "PeriodicChecksRoutine". The quality checks performed in "QualityChecksRoutine" are as follows:

1. Scale Factor Check:
    Scale factor calculated for magnetometer calibration always have a minimum and a maximum value which can be determined statistically after many trials. Therefore upper and lower bounds are set for the scale factor value and can be used as thresholds. If the scale factor value calculated is higher than the upper bound threshold or if it is less than the lower bound threshold the calibration parameters will not pass from the quality checks.

2. Reading Check:
    In this check the calibrated magnetometer readings are compared to the earth magnetic field components acquired with any earth magnetic field model. The comparison is made between the horizontal earth magnetic field from the model and the horizontal leveled magnetometer readings. If the difference is less than certain threshold the calibration parameters pass this check 3. Heading Check:
    This check depends on the presence of an external heading source during calibration. A comparison is made between the heading calculated from calibrated magnetometer reading and the heading from the heading source. If the difference is less than a certain maximum error value the magnetometer heading is accepted and the calibration parameters pass this check. For demonstration purposes in this example, the prototype having the magnetometer is aligned with the moving platform, having zero heading misalignment.

"PostCalibrationChecksRoutine" is a routine that is directly called after calibration (2D or 3D) is performed; its main goal is to check whether the calibration parameters calculated are correct or not, so that when the calibrated magnetometer readings are used for heading determination they can determine heading with minimum error. The output from "PostCalibrationChecksRoutine" is whether to accept or reject the calibration parameters calculated; moreover PostCalibrationChecksRoutine can use the parameters saved in "Shelf" if they pass the quality checks.

In this example, for "PostCalibrationChecksRoutine" the inputs are the working parameters used in calibration, these working parameters are as follows: (i) calibration parameters (such as biases and scale factors) calculated after performing calibration (they can be either in 2D or 3D), (ii) a parameter that identifies whether the performed magnetometer calibration is a 2D or a 3D calibration, (iii) another parameter is used to identify the pitch-roll sector in which calibration was made in case of 2D calibration using pitch-roll sectors is used, and (iv) a counter indicating how many times these parameters succeeded in periodic checks.

Figure 25A:
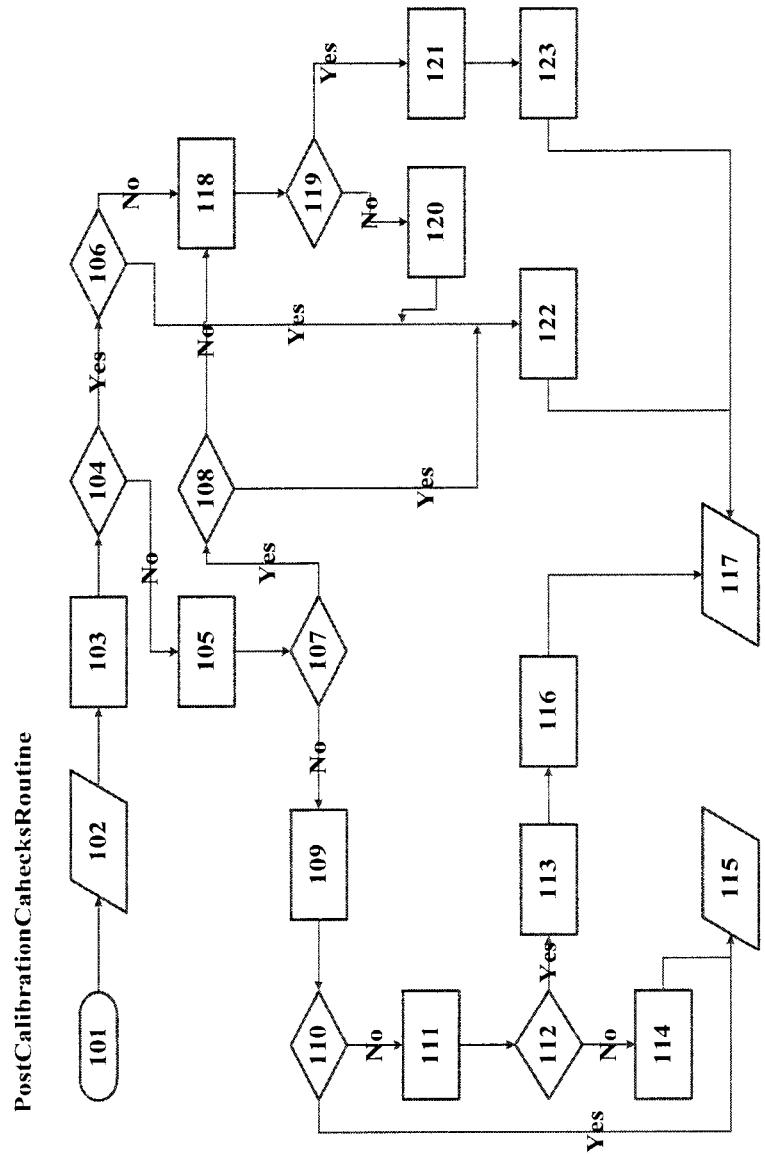

The flowchart in FIGS. 25A and 25B show how "PostCalibrationChecksRoutine" can be performed in a logical way. The routine starts (101); it takes the working parameters described in the previous paragraph as inputs (102). Quality checks are performed (103) as discussed earlier including a reading check, heading check and scale factor check. A check is made whether the quality checks succeeded or not (104), if they don't succeed another set of points can be taken from data collection buffer (105) to provide a another chance for calibration assuming the first set of data was contaminated by noise or anomalies, then the quality checks are performed again. Another check is made (107), if the quality checks failed after taking the new data set the whole data buffer is emptied (109). A check is made (110) to check whether the "Shelf" is empty or not. If "Shelf" is empty a flag is returned (115) indicating that post calibration checks failed. If "Shelf" is not empty quality checks are performed on parameters in "Shelf" and if they passed then the new "Working" parameters will be equal to the shelved parameters (113) and then the shelf will be emptied (116), while the return from the Post calibration routine will be a flag indicating success of post calibration checks and also the new Working calibration parameters (117).

If the quality checks succeeded (104, 107) a check is made whether the "Shelf" is empty or not and if it is empty the Working parameters will be equal to the new calibration parameters that passed the quality checks (122). If the shelf is not empty a comparison is made between the shelf parameters and the new calibration parameters (118) and the better is chosen. The parameters having minimum errors in terms of both reading error and heading error discussed earlier in Reading Check and Heading Check that are performed in "QualityChecksRoutine" will be chosen as better parameters. In case parameters in "Shelf" are better, "Working" parameters will be equal to parameters in "Shelf" (121) and then the shelf is emptied (123). On the other hand if the new parameters were better, then "Working" parameters will be equal to the new calibration parameters (122). Finally the return from the Post calibration routine will be a flag indicating success of post calibration checks and also the new Working calibration parameters (117). This is the end of "PostCalibrationChecksRoutine".

The second quality check routine, "PeriodicChecksRoutine", is a routine that is called periodically starting after the calibration is done. The time period that is used for calling the periodic checks routine depends on the calibration type whether 2D or 3D or both, and on the application for which magnetometer calibration is required. This periodic check routine is called to check whether the calibration parameters are valid or not every certain time period, and if they are not valid a recalibration is required which may require new data collection. This check can be useful in case calibration parameters are calculated when the device was in a certain environment and then the environment has changed, for example if the user entered a steel elevator after he was walking different environment.

Figure 26A:
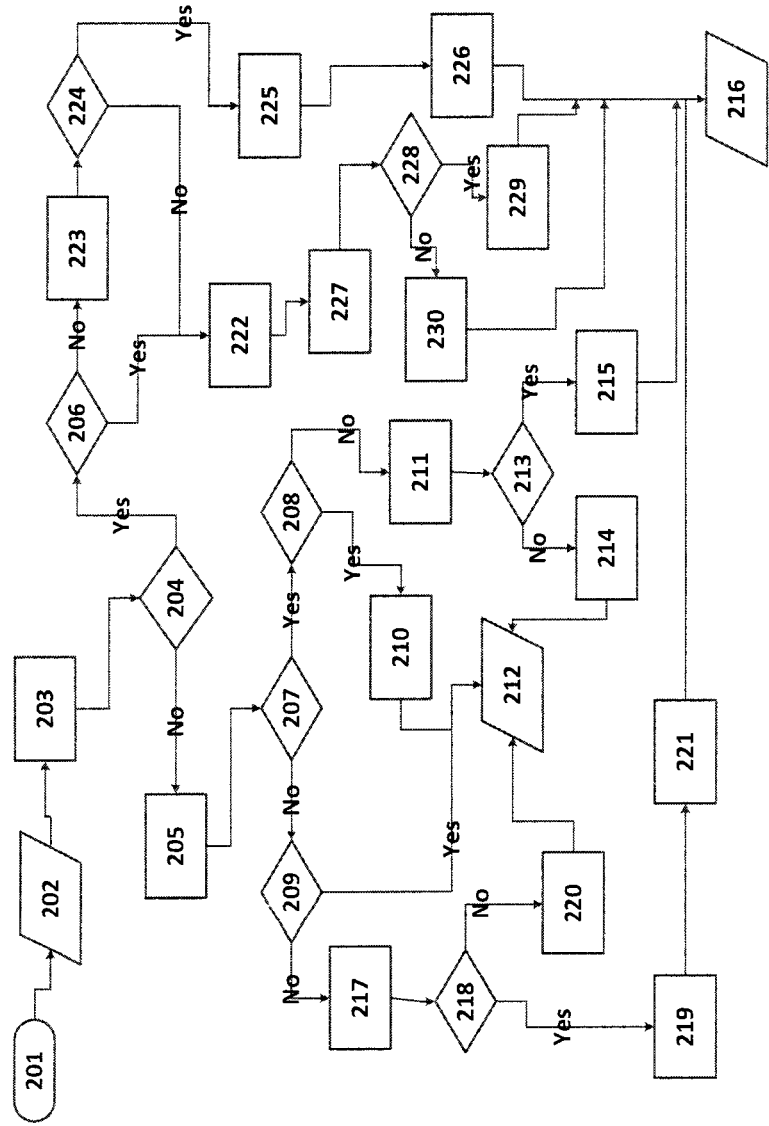

The flowchart in FIGS. 26A and 26B describe how the "PeriodicChecksRoutine" works, how the "Shelf" parameters are used, and how parameters are stored in shelf. When the routine is called it takes the current working parameters (202), these parameters include calibration parameters in use and also having a variable indicating whether the in use parameters are calculated after a 2D or a 3D calibration. In case of 2D calibration the parameters are only valid in a predefined pitch-roll sector. "QualityChecksRoutine" routine is called (203) to perform the quality checks mentioned earlier on the current calibration parameters either in 2D or 3D. Here the way parameters are shelved is clarified (204), a check is made whether the current parameters have passed quality checks or not, in case they didn't pass the number in which these parameters have successfully passed "PeriodicChecksRoutine" is checked (205). Passing "PeriodicChecksRoutine" means that the routine is called when the parameters are working and after the routine returns the same parameters remain in use. A counter is created specifically for this purpose. If this counter is greater than or equal to 1, this means that these parameters have formerly succeeded at least one periodic check which indicates that these parameters have been working well for a relatively long time period and failing quality checks this time doesn't necessarily mean they should be discarded forever. A check is then made (209) to check if the "Shelf" is empty, and if it is empty the current parameters will be shelved, i.e. they will be stored in shelf for future use (210). The "PeriodicChecksRoutine" will return failure in this case (212).

In case the shelf is not empty and it already has shelved (saved) parameters, then "QualityChecksRoutine" is called for the previously shelved parameters (211). A check is made to check if they pass the quality checks (213), if they don't they are replaced by the current working parameters (214) and the working parameters which failed the quality checks in step 204 will be the new "Shelf" parameters. The "PeriodicChecksRoutine" will return failure in this case also (212).

In case the previously shelved parameters pass the quality checks they will be swapped (215) with the current working parameters which failed the quality checks (204) and the new working parameters will be the previously shelved parameters. In this case the "PeriodicChecksRoutine" will return the new working parameters (216).

If the counter for successful periodic check for the current working parameters is less than 1 (207) which means that the current working parameters haven't passed any periodic checks before; i.e. they don't have previous good history, then the "Shelf" is checked if empty or not (209). If it is empty then the "PeriodicChecksRoutine" will return failure (212). If the "Shelf" is not empty "QualityChecksRoutine" is called for the previously shelved parameters (217), in case they didn't pass quality checks they will not be erased (220) and then "PeriodicChecksRoutine" will return failure (212).

If they passed, the new working parameters will be previously shelved parameters (219), the "Shelf" will be emptied (221) and the "PeriodicChecksRoutine" will return the new working parameters (216).

A check had been made on the output from "QualityChecksRoutine" (204), the case when the output indicated that the current working parameters failed. The other possibility is that these parameters succeed in quality check and then the output from "QualityChecksRoutine" will indicate this success. In case of these parameters succeeding in quality check a check is made (206) to check whether the "Shelf" is empty or not, if not empty a comparison is made (223) between the current working parameters calibration parameters with those in "Shelf" and if the shelf parameters are better the "Shelf" parameters will be taken as working parameters (225) and then the shelf will be emptied (226). The "PeriodicChecksRoutine" will return the new working parameters (216).

The comparison between current working parameters and shelf parameters includes which parameters provide the minimum heading error if a heading reference is available. Another comparison is made which is based on the earth magnetic field components; in this comparison the horizontal magnetic field acquired according the earth magnetic field model (in this example the IGRF model is used) is compared to the horizontal field calculated from magnetometer readings calibrated by both calibration parameters in "Shelf" and current working calibration parameters. The minimum square error between the levelled horizontal field calculated by the calibrated magnetometer and the horizontal field taken from the earth magnetic field model taken from the earth magnetic field model used, decides which calibration parameters reduces the error between the magnetometer readings and the true reference magnetic components according to the earth magnetic field model.

The previously mentioned two comparisons can decide together which calibration parameters are better and should be used.

In the check made in step 206 the shelf can be empty. Even if the Shelf is not empty, the shelved parameters may not be better than the current working parameters after the comparison made in step 223 and the check made in step 224, in both cases current working parameters will not be changed (222) and the counter indicating the successful number of times these parameters have passed successfully from periodic checks will be incremented (227). Another check is made (228) on "Shelf" to check if empty or not, in case the "Shelf" was already empty the current working parameters can be stored in "Shelf" (229) as they have just passed successfully from periodic check at least once as the success counter has just been incremented (227). If the check made in step 228 results that the "Shelf" is not empty, the "Shelf" parameters will not be changed (230). Even if parameters in "Shelf" were updated (229) or not updated (230) the "PeriodicChecksRoutine" will return the new working parameters (216) which will be the same working parameters that were input to the "PeriodicChecksRoutine" since they succeeded.

In "PeriodicChecksRoutine" only two quality checks are performed when "QualityChecksRoutine" is called, which are Reading check and Heading check described earlier in this example; there is no need for performing a Scale factor check since periodic checks always check working parameters which are already checked using "PostCalibrationChecksRoutine" once they are calculated.

Example 6: Using 2D and 3D Online Magnetometer Calibration Together for Heading Calculation in Pedestrian Navigation The present example demonstrates an embodiments of the present method and apparatus in which 3D space calibration can be performed using more than one approach at the same time. In this example 2D magnetometer calibration using pitch-roll sectors to calibrate the 3D space is used simultaneously with 3D magnetometer calibration to calculate calibration parameters when external heading is available during calibration. In this embodiment both 2D using pitch-roll sectors and 3D calibrations can run together (for example in the background), when data collection is done for one of them it can be triggered to correct magnetometer readings. 2D calibration using pitch-roll sectors and 3D calibrations can work simultaneously and parameters calculated by 2D calibration using pitch-roll sectors can replace parameters calculated by 3D calibration and vice versa where a determination can be made as to which parameters are better for use in certain sector; i.e. if the data collection is done for both 2D in a pitch-roll sector and 3D calibrations then a comparison can be made to decide which one to be used. Some examples for how this comparison can be done and which are used in this example are: checking which heading is closer to the reference heading that was used for calibration, or which corrected horizontal reading is closer to the earth's horizontal magnetic field acquired according the earth magnetic field model used. Another measure that can decide which calibration is better to run (which is also used in this example) is the "use-case" of the device, the "use-case" refers to the way or the moving scenario that the device is moved or placed by the user during calibration and usage, for example (among others) hand held in any orientation, hand dangling, placing the device in one of pants pockets while walking, placing the device in belt clip, mounting the device to the chest of the user, etc. In some cases when the device is partially tethered, for example chest mounted, running 2D calibration using pitch-roll sectors can be better and faster in data collection while on the other hand when hand dangling scenario is detected or any other use-case is detected in which the device is moving with high frequency between pitch-roll sectors, 3D calibration is more efficient as the high frequency of switching between pitch-roll sectors in some cases makes 2D calibration using pitch-roll sectors less accurate relative to full 3D calibration.

Another aspect that can affect the decision for choosing 2D calibration using pitch-roll sectors or full 3D calibration is the mode the device is used in (which is also used in this example); the mode is not like the use-case, it usually refers to the bigger picture which includes the moving platform in which a portable device can be used in, for example the mode can be (among others) walking mode, running mode, driving mode, train mode, etc. The mode can affect the decision as well, for example if a driving mode is detected 2D magnetometer calibration using pitch-roll sectors can be a better choice since the device can be placed on vehicle dashboard or any other place where its movement is limited, this will not prevent the 3D calibration from running as it can be triggered once sufficient data is collected and then the results from both 2D calibration using pitch-roll sector and 3D full calibration can be compared to decide which is better. Another example that can show how the mode not only affects the calibration decision but also can trigger a recalibration, is when the user is walking with the portable device and the magnetometer is calibrated, and then enters a vehicle which has its own magnetic field due to its ferrous materials and engine which can distort the earth's magnetic field readings in a different way from which the calibration was built upon, therefore a recalibration is required. Detecting "use-cases" and "mode" can depend on having separate modules that can decide which use-case or mode the device is involved in, the output from these modules can be an input to the magnetometer calibration method.

In the present example the main operation routine of the device calls a routine that performs magnetometer calibration. Both "PostCalibrationChecksRoutine" and "PeriodicChecksRoutine" mentioned in Example 5 are used in the present example to assess the quality of calibration parameters.

FIG. 27 shows a flow chart that shows the embodiment used in this example.

Figure 28A:
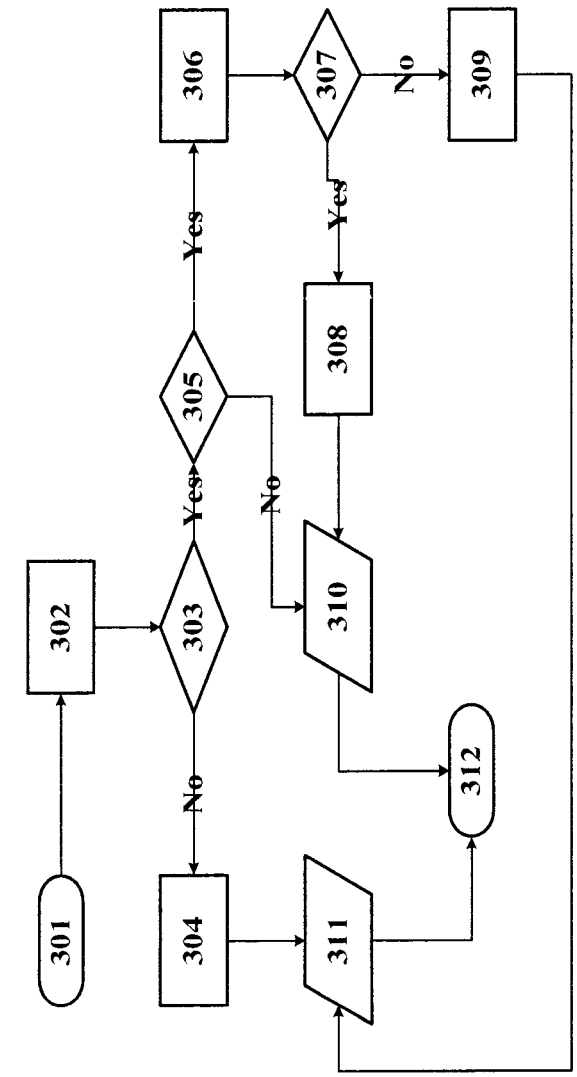
Figure 29A:
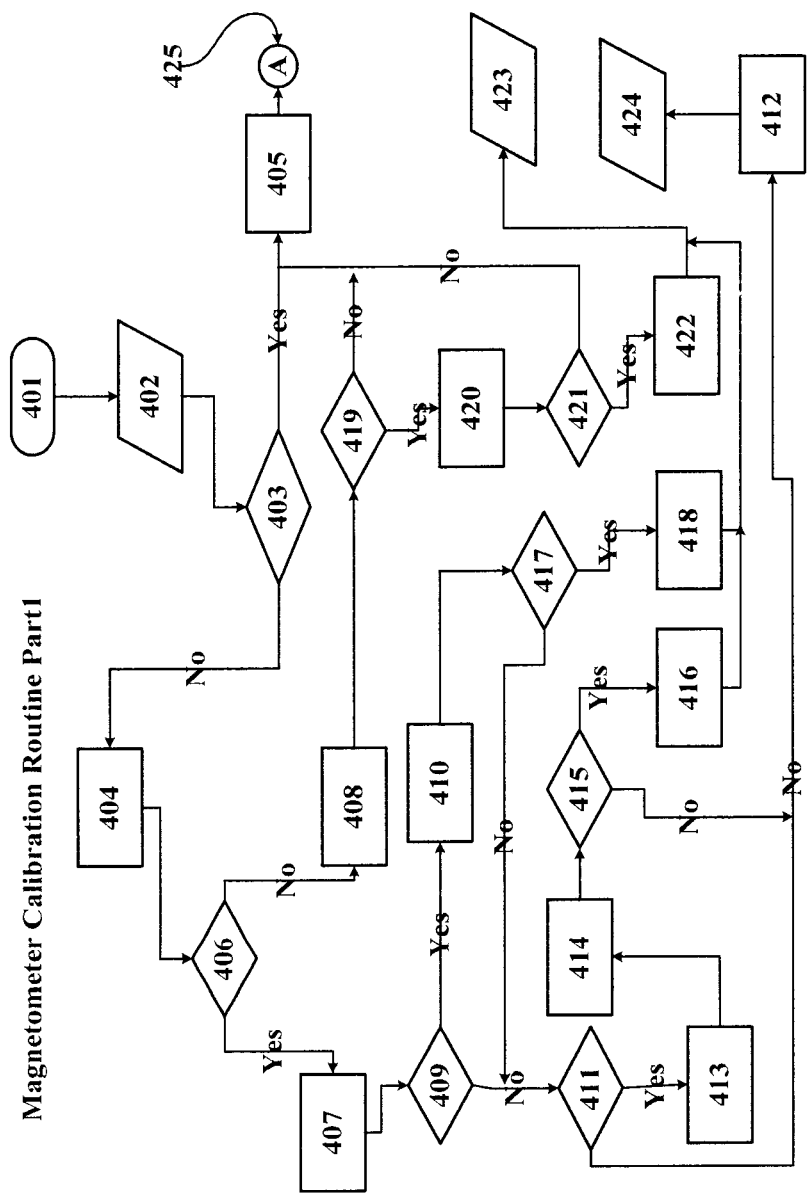

The flowchart in FIGS. 28A and 28B show an example of the main operation routine which calls "MagnetometerCalibrationRoutine" and calls "PeriodicChecksRoutine" to perform a periodic quality check to test the magnetometer calibration quality and decide whether a recalibration is required or not.

"MagnetometerCalibrationRoutine" is a routine called every epoch in runtime (302). One important output from the magnetometer calibration routine is a flag indicating whether the magnetometer is ready to be used for heading calculation this epoch or not, i.e. it indicates whether the magnetometer is well calibrated or not. If the value of "UseMagFlag" is equal to 1 (303) then the magnetometer can be used this iteration according to the magnetometer calibration routine output. At this point a check is made if it is time for calling periodic check routine (305), and if so "PeriodicChecksRoutine" is called (306) to check periodically if the calibration results are correct or not. The periodic time for calling the periodic checks routine is defined earlier, for example after some experimental trials to determine the most appropriate time period in order to avoid extra calls which consumes more computational power and memory and also to avoid having large time periods which may lead to using wrong calibration parameters when a recalibration is required and could have been triggered by periodic checks if called earlier. A check on the periodic checks is made whether the routine returns success or failure using a certain flag (307). If failure is detected the magnetometer will not be used in this epoch and a recalibration is required (309) and "UseMagFlag" will be the output from the magnetometer calibration routine and its value will be zero (311). In the case "PeriodicChecksRoutine" returns success the magnetometer will be used in this epoch for heading calculation and the calibration parameters calculated by magnetometer calibration routine can be used (310).

In another scenario the result from the check made in step 303 can be different, when the value of "UseMagFlag" is zero, which indicates that the calibration is not ready at this epoch (304), then there is no need for calling periodic checks as the "UseMagFlag" will be the output from the magnetometer calibration routine (311) and the magnetometer will not be used this epoch. Finally the iteration ends (312), a new iteration starts in the next time epoch.

The present example also demonstrates a magnetometer calibration routine that can call both 2D and 3D calibration functions that depend on external heading during calibration; it also calls "PostCalibrationChecksRoutine", "PeriodicChecksRoutine" and "QualityChecksRoutine".

In the present example "MagnetometerCalibrationRoutine" decides when to use each of 2D calibration using pitch-roll sectors and 3D calibration according to the context and when to switch between them in favor of achieving the best calibration results. "MagnetometerCalibrationRoutine" can also trigger or stop data collection for both 2D and 3D calibrations.

"MagnetometerCalibrationRoutine" is implemented in the present example to be used in in runtime, so that it can run in the background to perform an automatic magnetometer calibration when this calibration depends on other device sensors like accelerometers and gyroscopes to calculate pitch and roll angles for the device. Also the external heading source used during calibration can be acquired from an integrated navigation solution that integrates accelerometers, gyroscopes, and barometers with GPS, assuming there is no misalignment between the device and the moving platform in this example.

A flowchart describing "MagnetometerCalibrationRoutine" (Magnetometer calibration routine) is given in FIGS. 29A, 29B, 30A, 30B, 31A, and 31B in the form of three parts connected together.

"MagnetometerCalibrationRoutine" is started (401). The inputs to the routine are given (402) which are (i) 2D Working Parameters for current pitch-roll sector detected (Current pitch-roll sector detected will be called 'Y') if not empty or 3D Working Parameters if not empty and (ii) Shelf Parameters if not empty. In case there are no Working Parameters available or no Shelf Parameters available, a zero value is given to the routine to indicate that. Pitch-roll sector Y is checked (403) if maintained, i.e. a check is made whether the pitch-roll sector is the same as the previous epochs (maintained) or the device is placed or held in a new pitch-roll sector (not maintained). If pitch-roll is maintained data collection for both 3D calibration and 2D calibration in sector Y is triggered (405). Then the first part of "MagnetometerCalibrationRoutine" ends (425) at (A) and the second part starts as shown in FIGS. 30A and 30B.

If pitch-roll sector Y is not maintained a check is made to determine why pitch-roll sector Y is not maintained (404). There are two cases that can cause the pitch-roll sector to be changed; the first is due to normal device motion for example when the user makes a call with a smart phone placing it close to the ear after it was held in a landscape mode in his hand. The second case that causes the pitch-roll sector to be changed is when the device experiences an oscillatory motion in which the pitch-roll sector is changed in high frequency as the device oscillates between pitch-roll sectors. An example of this oscillatory motion is such as hand dangling mode while walking, A check is made (406) to check if an oscillation between pitch-roll sectors with high frequency is detected in which case the pitch and roll history can be used to help in this determination. If the reason for not maintaining pitch-roll sector Y was not due to oscillation between pitch-roll sectors then current pitch-roll sector is switched to the new pitch-roll detected sector (Y=new pitch-roll sector) (408). After switching to the new pitch-roll (a check (419) is made if there are saved 2D parameters for sector Y, if they are no saved 2D parameters found for sector Y then data collection for 3D calibration, and 2D calibration in sector Y is turned on (405), then the first part of "MagnetometerCalibrationRoutine" ends (425) at (A) and the second part starts as shown in FIGS. 30A and 30B. If there was saved parameters for pitch-roll sector Y then quality checks on the saved 2D calibration parameters are performed (420). These quality checks are checked for their success (421). If they did not succeed then data for 3D calibration and 2D calibration in sector Y is collected (405), then the first part of "MagnetometerCalibrationRoutine" ends (425) at (A) and the second part starts as shown in FIGS. 30A and 30B. If the quality checks did succeed (421) then the 2D saved parameters are used as Working parameters (Working parameters=2D saved parameters) (422) then the "MagnetometerCalibrationRoutine" returns UseMagFlag=1 and returns the new Working parameters (423). If oscillation between sectors with high frequency was found (406), and then 3D data collection is turned ON (407). A check is then made if 3D calibration parameters were saved earlier (409). If yes quality checks on the saved 3D calibration parameters are performed (410). If these quality checks did not succeed or if the 3D calibration parameters weren't saved earlier, then a check is made if 3D data collection is completed (411). If it was completed, then 3D magnetometer calibration is performed (413). After 3D magnetometer calibration is done "PostCalibrationChecksRoutine" with 3D calibration parameters is called (414). If it returns success, 3D calibration parameters are used as working parameters (Working parameters=new 3D calibration parameters) (416) then the "MagnetometerCalibrationRoutine" returns UseMagFlag=1 and returns the new Working parameters (423). If "PostCalibrationChecksRoutine" does not return success then the magnetometer cannot be used this iteration (412), then "MagnetometerCalibrationRoutine" returns UseMagFlag=0 (424).

Figure 30A:
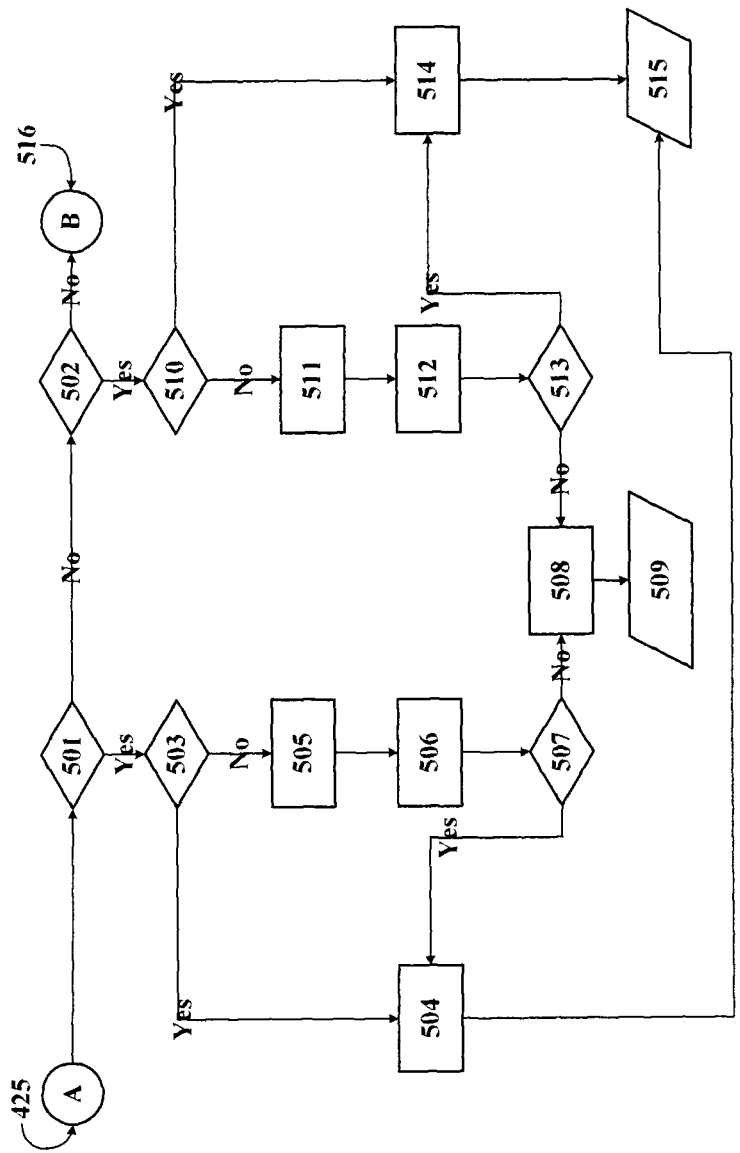

FIGS. 30A and 30B show a flowchart that describes the second part of "MagnetometerCalibrationRoutine" which is called at each time sample.

The second part of MagnetometerCalibrationRoutine" starts (425) at (A) from where the first part of "MagnetometerCalibrationRoutine" ended after data collection is turned ON for both 2D calibration in sector Y and for 3D calibration. A logical check is made (501) if 2D collection is completed for pitch-roll sector Y or if 2D calibration parameters are saved earlier for sector Y, at the same time 3D data collection is still not completed and 3D calibration parameters are not saved earlier. If the logical check (501) returns True (success) then another check is made whether 2D calibration parameters are saved earlier for sector Y (503). If True (success) these 2D saved parameters will be used in sector Y when (Working parameters=2D saved calibration parameters) (504) and "MagnetometerCalibrationRoutine" returns USeMagFlag=1 with the new Working calibration parameters (515). If the check made (503) returned False (failure) 2D calibration is performed (505), then "PostCalibrationChecksRoutine" is called (506) given the 2D calibration parameters calculated for sector Y. If "PostCalibrationChecksRoutine" returns success then newly calculated 2D calibration parameters will be used in sector Y (504) in which (Working parameters=new 2D calibration parameters) and "MagnetometerCalibrationRoutine" returns USeMagFlag=1 with the new Working calibration parameters (515). If "PostCalibrationChecksRoutine" returns failure then the magnetometer cannot be used for heading determination this epoch as in step 508 and 509 "MagnetometerCalibrationRoutine" returns USeMagFlag=0.

If the logical check in step 501 returns False (failure) another logical check is made (502) checking if 3D collection is completed or if 3D calibration parameters were saved earlier, at the same time 2D data collection is still not completed for pitch-roll sector Y and 2D calibration parameters are not saved earlier for pitch-roll sector Y. If the logical check in step 502 returns False (failure) then the second part of "MagnetometerCalibrationRoutine" ends (516) at (B) while the third and last part in "MagnetometerCalibrationRoutine" starts in FIGS. 30A and 30B. If the logical check made in step 502 returns True (success) then another check is made (510) whether 3D calibration parameters were saved earlier, if True (success) these 3D saved parameters will be used in step 514 when (Working parameters=3D saved calibration parameters) and "MagnetometerCalibrationRoutine" returns USeMagFlag=1 with the new Working calibration parameters (515). If the check made in step 510 returned False (failure) 3D calibration is performed (511), then "PostCalibrationChecksRoutine" is called (512) given the 3D calibration parameters calculated in step 511. If the "PostCalibrationChecksRoutine" returns success then newly calculated 3D calibration parameters will be available due to step 514 in which (Working parameters=new 3D calibration parameters) and "MagnetometerCalibrationRoutine" returns USeMagFlag=1 with the new Working calibration parameters (515). If "PostCalibrationChecksRoutine" returns failure then the magnetometer cannot be used for heading determination this epoch as in steps 508 and 509 "MagnetometerCalibrationRoutine" returns USeMagFlag=0.

Figure 31A:
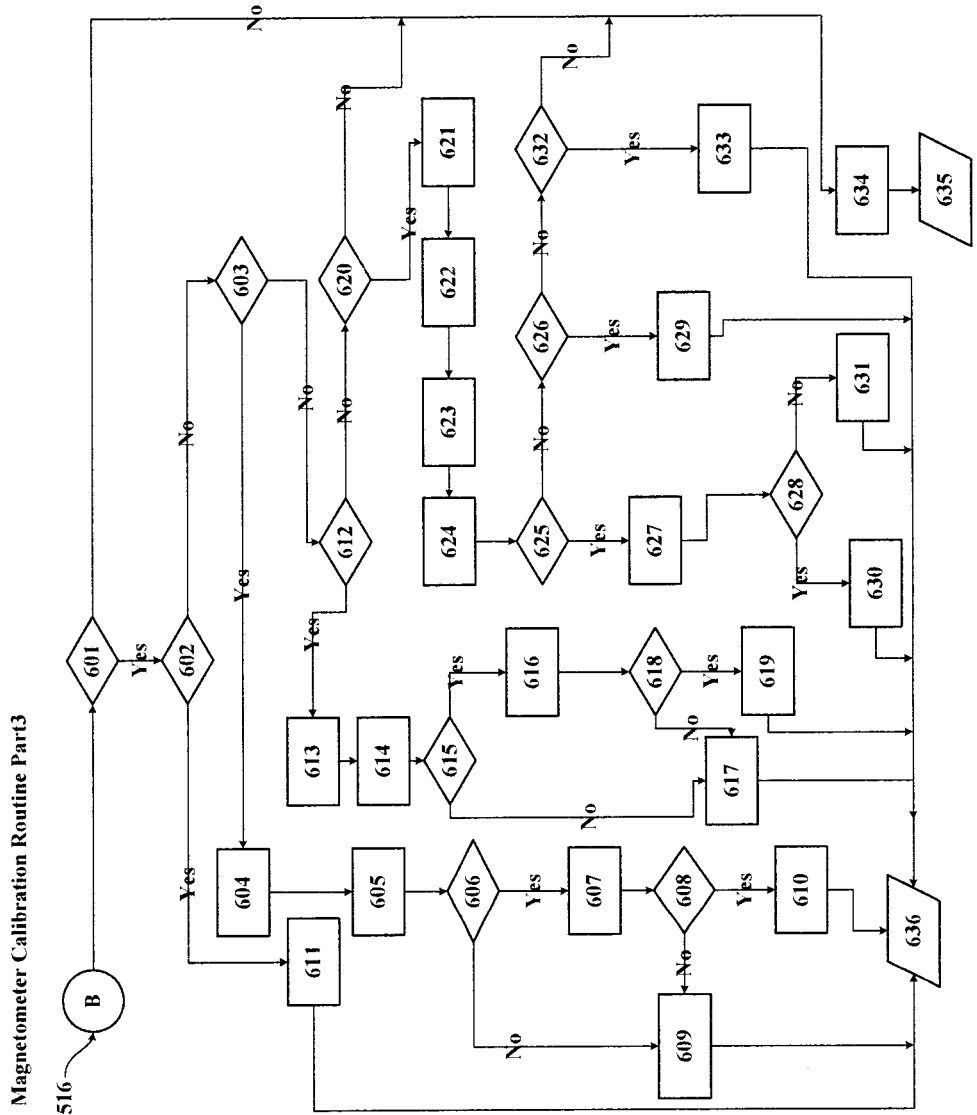

FIGS. 31A and 31B show a flowchart that describes the third and the last part of "Magnetometer Calibration Routine".

The third part of "Magnetometer Calibration Routine" starts (516) at (B) from where the second part of "Magnetometer Calibration Routine" has ended. A logical check is made (601) checking if 3D collection is completed or if 3D calibration parameters were saved earlier, and at the same time 2D collection data is completed or 2D calibration parameters were saved earlier for pitch-roll sector Y. If the logical check in step 601 returns False (failure) then magnetometer cannot be used for heading determination (634) and "Magnetometer Calibration Routine" return UseMagFlag=0 (635). If the check made in step 601 returns True (success) then another check is made (602) whether both 3D and 2D calibration parameters were saved earlier, if True (success) calibration parameters which were used in the previous epoch will be used in this epoch (611). If the check made in step 602 returned False (failure) another check is made (603) whether 3D calibration parameters were saved earlier and 2D collection is done. If True (success) 2D calibration is performed (604), then "PostCalibrationChecksRoutine" is called (605) given the 2D calibration parameters calculated for pitch-roll sector Y. A check is made on the output of "PostCalibrationChecksRoutine" (606). If the routine returns failure then saved 3D calibration parameters will be used (609). "Magnetometer Calibration Routine" returns use UseMagFlag=1 with the new Working Calibration parameters (636). If "PostCalibrationChecksRoutine" in step 606 returns True (success) newly calculated 2D parameters for pitch-roll sector Y will be compared with the saved 3D parameters (607). A check is made (608) if 2D parameters are better. If they are better, newly calculated 2D calibration parameters will be used (610) (Working Parameters=2D parameters) and "Magnetometer Calibration Routine" returns use UseMagFlag=1 with the new working calibration parameters (636). In step 608 if 2D parameters were not better, then saved 3D calibration parameters will be used in step 609. Returning to step 603, if the logical check made returned False (failure), another logical check will be made (612) to check whether 2D calibration parameters were saved earlier for the current pitch-roll sector and 3D collection is completed. If returned True (success) 3D calibration is performed (613), then "PostCalibrationChecksRoutine" is called (614) given the 3D calibration parameters calculated. A check is made (615) on the output of "PostCalibrationChecksRoutine", if it returns failure then saved 2D calibration parameters will be used (617) and "MagnetometerCalibrationRoutine" returns UseMagFlag=1 with the new working calibration parameters (636). If "post calibration checks routine" called in step 614 returns success then 3D calibration parameters newly calculated will be compared with the saved 2D parameters (616). A check is made if 3D parameters are better (618), if they are better, 3D calibration parameters will be used (619) and "MagnetometerCalibrationRoutine" returns UseMagFlag=1 with the new working Calibration parameters (636). If 3D parameters were not better in step 618 then saved 2D calibration parameters will be used in step 617 and "MagnetometerCalibrationRoutine" returns use UseMagFlag=1 with the new working Calibration parameters (636).

If the logical check made in step 612 returns False (failure), another check is made (620) to check whether both 2D collection for current pitch-roll sector and 3D data collection are completed. If returned false (failure) then in step 634 the magnetometer cannot be used for heading determination and "MagnetometerCalibrationRoutine" return useMagFlag=0 (635). If the check in step 620 returned True (success) 3D calibration is performed (621) and 2D calibration is performed (622), then "PostCalibrationChecksRoutine" is called (623) given the 3D calibration parameters calculated and 624 "PostCalibrationChecksRoutine" is called (624) given the 2D calibration parameters calculated for sector Y. A check is made whether "PostCalibrationChecksRoutine" returns success in both 2D and 3D (625). If True (success) a comparison is made between 2D and 3D calibration (627). A check is made whether 2D calibration parameters are better (628). If 2D calibration parameters are better, then newly calculated 2D calibration parameters are used (Working parameters=newly calculated 2D parameters) (630) and "MagnetometerCalibrationRoutine" returns UseMagFlag=1 with the new working Calibration parameters (636). If 2D calibration parameters are not better, newly calculated 3D calibration parameters are used in step 631 (Working parameters=newly calculated 3D parameters) and "MagnetometerCalibrationRoutine" returns UseMagFlag=1 with the new working Calibration parameters in step 636. In step 625, if "PostCalibrationChecksRoutine" does not return success with both 2D and 3D parameters, a check is made for 2D calibration routine only in step 626 to check its success. If returns true (success), newly calculated 2D calibration parameters will be used as working parameters (Working parameters=newly calculated 2D parameters) (629) and "Magnetometer CalibrationRoutine" returns UseMagFlag=1 with the new working Calibration parameters in step 636. If the check made in step 626 returns False (failure), another check is made whether "Post-CalibrationChecksRoutine" returns success given 3D parameters (632). If returned True (success), newly calculated 3D calibration parameters will be used as working parameters (Working parameters=newly calculated 3D parameters) (633) and "MagnetometerCalibrationRoutine" returns UseMagFlag=1 with the new working calibration parameters in step 636. If the check made in step 632 returns false (failure) then the magnetometer cannot be used for heading determination (634) and "Magnetometer Calibration Routine" return UseMagFlag=0 in 635.

Figure 32:
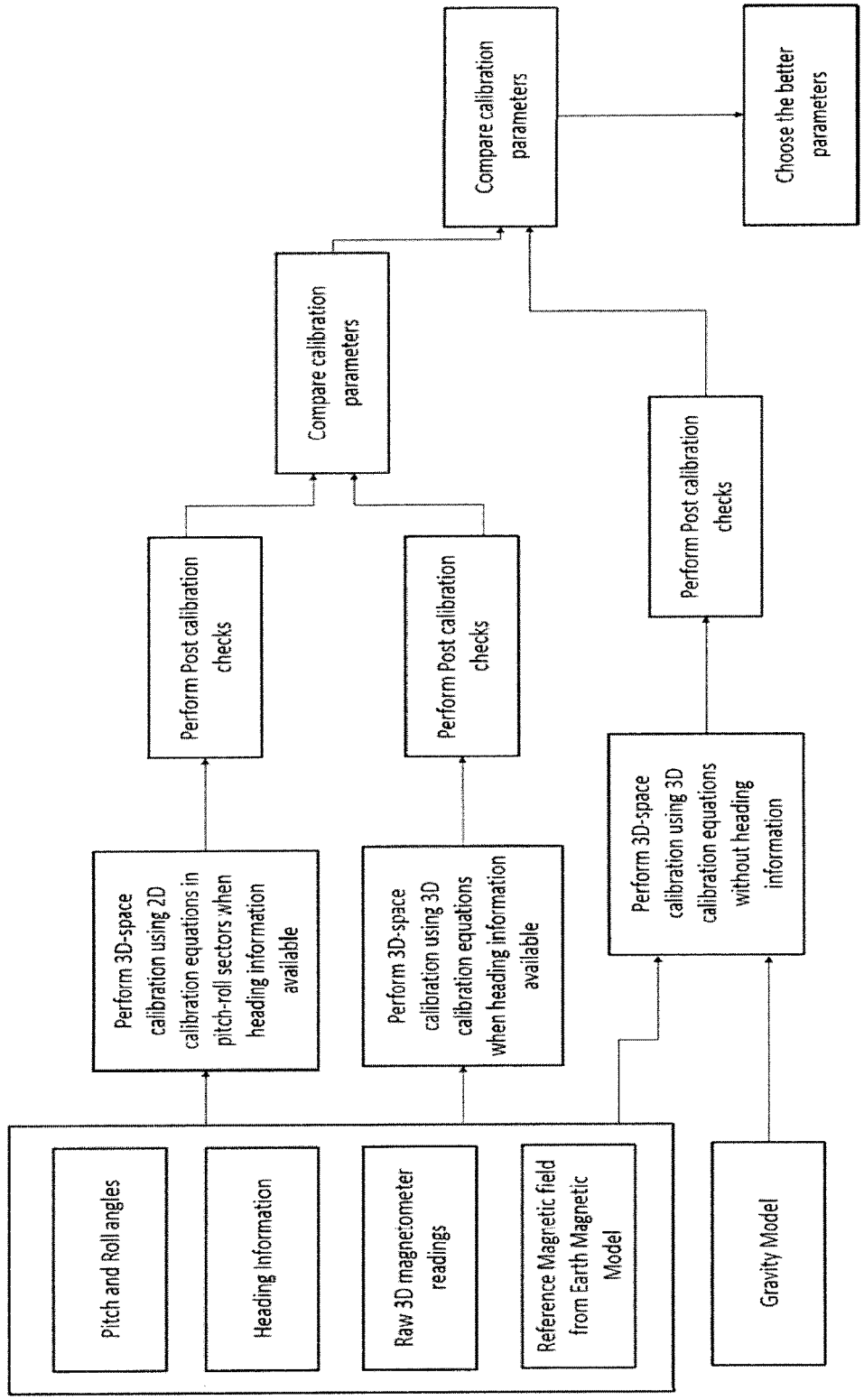
FIG. 32 is a block diagram showing the performance of 2D and 3D online magnetometer calibration together for heading calculation in pedestrian navigation wherein embodiments of the invention that depend on heading information are used with other embodiments of the invention that do not depend on heading information.

In this example, the the embodiment that performs calibration in 3D space using 3D calibration equations without depending on an external heading source can still be used for 3D magnetometer calibration in parallel with the Magnetometer Calibration Routine described above. It can be used with both 3D-space calibration using 2D calibration equations with pitch-roll sectors and 3D-space calibration using 3D calibration equations in a parallel manner. For demonstration purposes and for example, a block diagram shown in FIG. 32 describes how the three techniques can be used in parallel. In this example the two magnetometer calibration embodiments that depend on external heading can be used simultaneously as described earlier in this example and after a decision is made on which set of parameters to be used, the chosen parameters are compared with the output parameters of the third embodiment that does not require external heading, if they are available. The set of parameters that give calibrated magnetometer signals whose magnitude is closer to the reference earth magnetic field model should be chosen.

Figure 33:
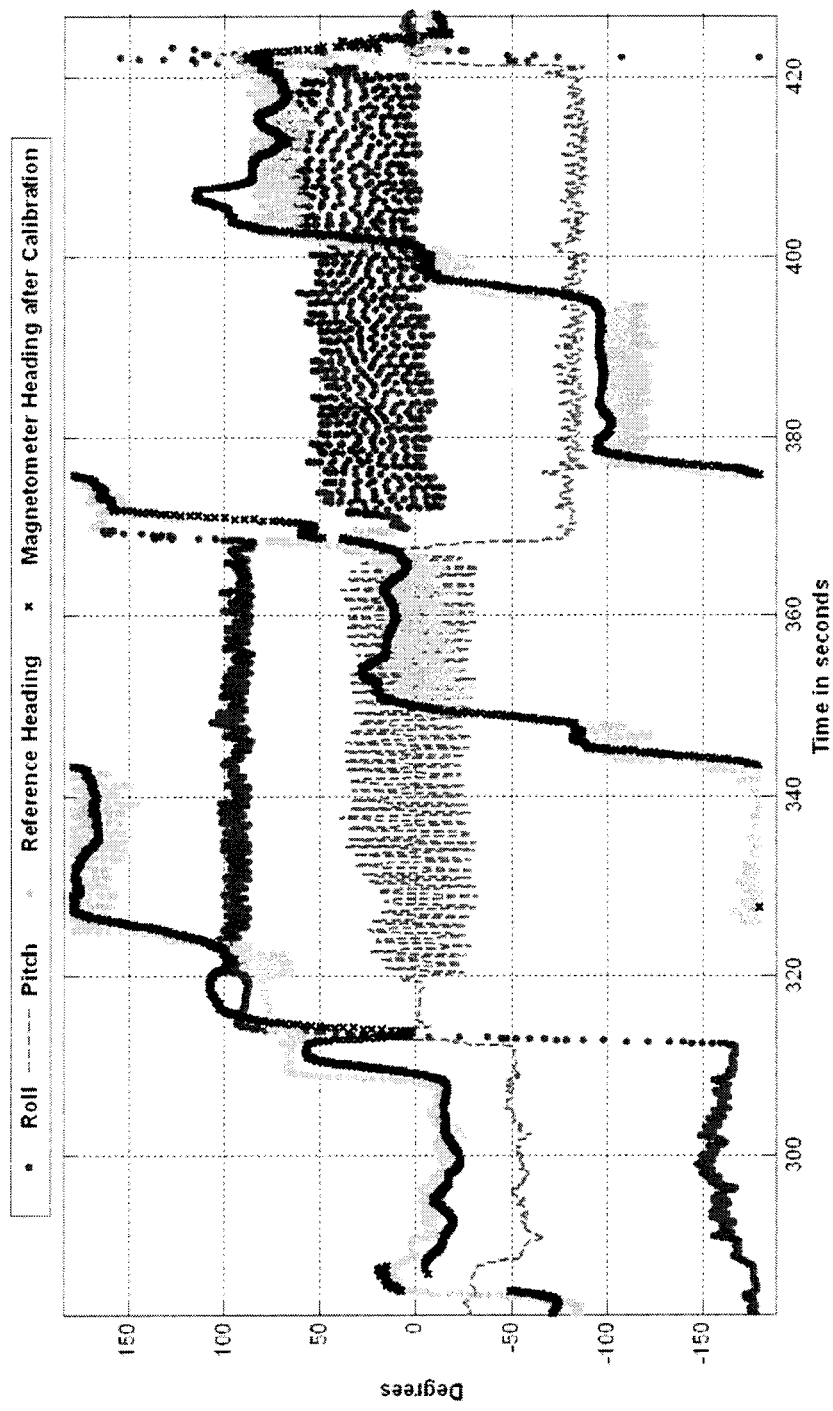
FIG. 33 shows a pedestrian heading calculated using a magnetometer after performing 2D and 3D online magnetometer calibration together for heading calculation in pedestrian navigation according to an embodiment of the invention.

For demonstration purposes a PDR trajectory is conducted in which heading is calculated from a magnetometer after calibration is performed using a full system of magnetometer calibration embodiment with quality checks used. The trajectory is conducted when the pedestrian moves in rectangular loops, while changing the device usage use-case between handheld and hand dangling. FIG. 33 shows the heading calculated using the magnetometer after calibration is performed. The calibrated magnetometer heading became available after the first turn in the trajectory since the 3D-space calibration using 2D calibration equation embodiment only needs one turn to provide results. Afterward the 3D-space calibration using 3D calibration equation also provided results after changes in pitch and roll.

The heading is shown in the figure after calibration is performed. The calibrated magnetometer heading is compared to a reference heading obtained from an integrated navigation solution that integrates accelerometers, gyroscopes, and barometers with GPS in open sky, assuming zero heading misalignment between the device and the platform.

Figure 34:
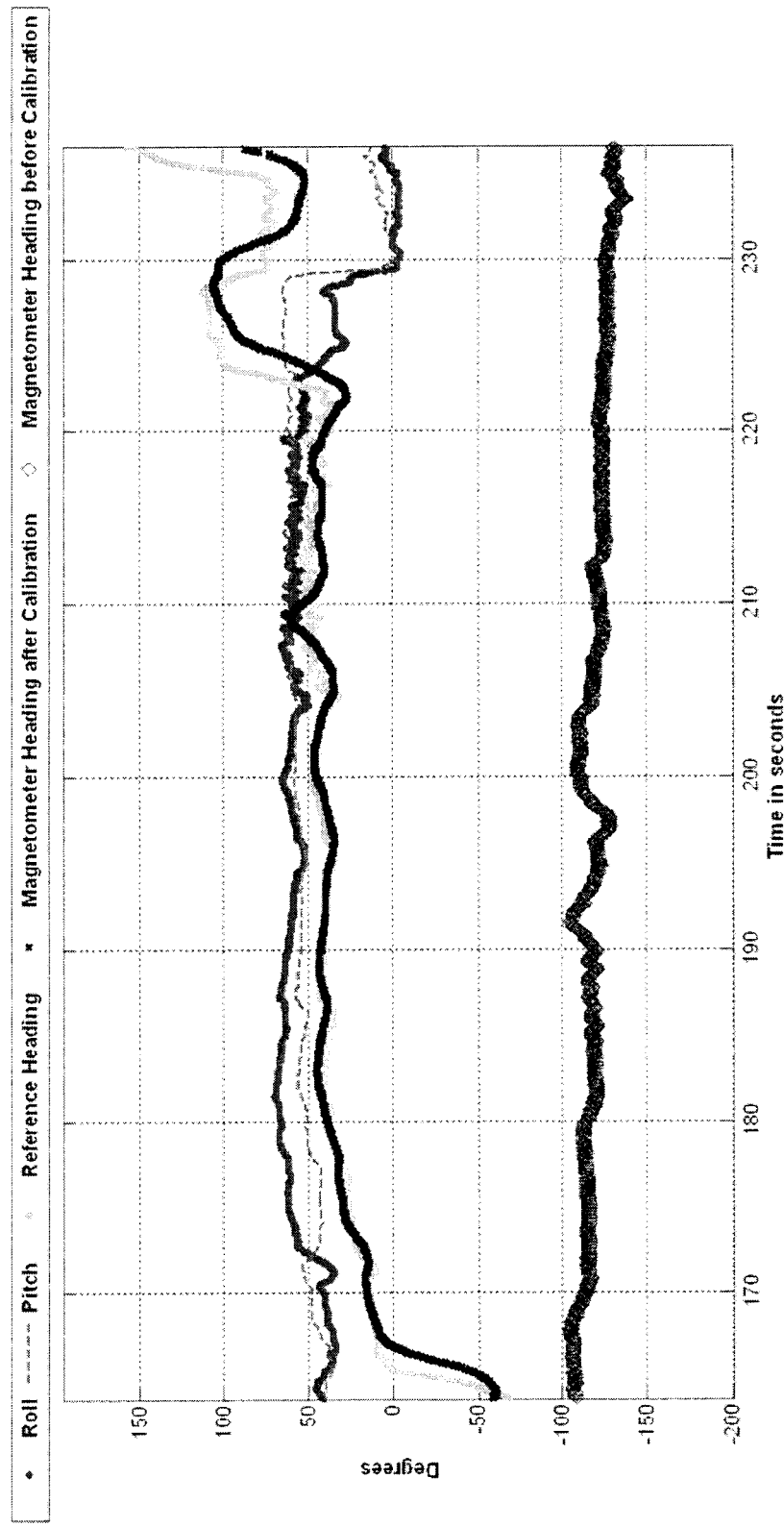
FIG. 34 shows a zoomed section of a pedestrian heading calculated using a magnetometer after performing 2D and 3D online magnetometer calibration together for heading calculation in pedestrian navigation according to an embodiment of the invention.

For further demonstration, FIG. 34 shows a zoomed section for the Hand-held trajectory.

The discontinuity of the drawn curves in the figures is due to the cyclicity of the heading and roll values where their range is from −180 degrees to 180 degrees.

The Mean error is used as a measure to assess the calibration quality in the following experiments. The Mean error after calibration is compared to the Mean error before calibration. Mean error is only calculated when magnetometer heading is used, i.e. after data collection is done. The Mean error represents the mean of the absolute difference the magnetometer heading and the reference heading. The mean error before calibration in the pedestrian trajectory was 51 degrees and it became 4.12 degrees after calibration is done.

The embodiments and techniques described above may be implemented as a system or plurality of systems working in conjunction, or in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for fast calibration of a magnetometer from natural motion with little space coverage, the method comprising the steps of:
 a) obtaining earth magnetic field information in a region where the magnetometer is located, the magnetic field information to be used as reference values;
 b) collecting magnetometer readings; and
 c) providing at least one processor configured to:
  i) obtain an absolute heading from a source of absolute navigational information that is different from the magnetometer, the absolute heading to be used as a second reference; and
  ii) make a determination of sufficient space coverage using at least the absolute heading, wherein the determination of sufficient space coverage comprises at least angular separation values in a heading domain; and
 d) based at least in part on the determination of sufficient space coverage made by the at least one processor, calibrating the magnetometer by calculating calibration parameters when the sufficient space coverage is available, wherein the calculation of calibration parameters comprises calculating error parameters in the magnetometer readings using a relationship between at least the earth magnetic field information, the magnetometer readings, the absolute heading from the source of absolute navigational information that is different from the magnetometer, and the error parameters in the magnetometer readings.

2. The method of claim 1, wherein the method is for performing 2-dimensional magnetometer calibration, wherein the earth magnetic field information is horizontal earth magnetic field information and wherein the 2-dimensional calibration uses a relationship between the horizontal earth magnetic field information, the magnetometer readings, the absolute heading, and the calibration parameters.

3. The method of claim 1, wherein the method is for performing 3-dimensional magnetometer calibration utilizing 2-dimensional calibration and different sectors covering pitch and roll angles, wherein each sector comprises a range of at least one of pitch and roll, wherein the earth magnetic field information is horizontal earth magnetic field information; wherein the method further comprises obtaining pitch and roll angles; wherein the method further comprises using the pitch and roll angles to level the magnetometer readings; wherein the method further comprises using the pitch and roll angles to determine a current sector; wherein determining sufficient space coverage for the current sector uses the heading information; and wherein the 2-dimensional calibration for the current sector uses a relationship between the horizontal earth magnetic field information, the levelled magnetometer readings, the absolute heading, and the calibration parameters.

4. The method of claim 1, wherein the method is for performing 3-dimensional magnetometer calibration utilizing the heading information from a source different from the magnetometer; wherein the method further comprises obtaining pitch and roll angles; wherein determining sufficient space coverage further uses one or both of the pitch and roll angles; and wherein the 3-dimensional calibration uses a relationship between the earth magnetic field information, the magnetometer readings, the pitch and roll angles, the absolute heading, and the calibration parameters.

5. The method of claim 1, wherein the method is for performing 3-dimensional magnetometer calibration utilizing gravity acceleration, wherein the method further comprises obtaining gravity acceleration; wherein the method further comprises obtaining pitch and roll angles; wherein determining sufficient space coverage uses the pitch and roll angles; and wherein the 3-dimensional calibration uses a relationship between the earth magnetic field information, the magnetometer readings, the pitch and roll angles, the gravity acceleration, and the calibration parameters.

6. The method of claim 1, wherein the method is for performing 3-dimensional magnetometer calibration; and wherein the method utilizes any one or any combination of the following:
(i) 2-dimensional calibration and use of different sectors covering pitch and roll angles, wherein each sector comprises a range of at least one of pitch and roll;
(ii) 3-dimensional calibration using the absolute heading from the source of absolute navigational information that is different from the magnetometer; or
(iii) 3-dimensional calibration using gravity acceleration.

7. The method of any one of claim 1, 2, 3, 4, 5, or 6, wherein the method further comprises any one or any combination of the following:
(i) conducting quality checks to determine if the calibration parameters are valid;
(ii) conducting a post-calibration quality check to determine if the calibration parameters are valid; or
(iii) conducting a periodic quality check that is called periodically starting after the calibration is done to check whether the calibration parameters are valid.

8. The method of 7, wherein the method further comprises shelving the calibration parameters for future use.

9. The method of claim 8, wherein the shelving of the calibration parameters happens even if quality checks determine that the calibration parameters are not valid.

10. The method of claim 7, wherein the method further comprises storing the calibration parameters.

11. The method of any one of claim 1, 2, 3, 4, 5 or 6, wherein the method further comprises storing the calibration parameters.

12. A device comprising:
a. a magnetometer; and
b. a processor, coupled to receive readings from the magnetometer, and operative to perform magnetometer calibration from natural motion with little space coverage, wherein the processor is operative to:
i) obtain earth magnetic field information in a region where the magnetometer is located, the magnetic field information to be used as reference values;
ii) collect magnetometer readings;
iii) obtain an absolute heading from a source of absolute navigational information that is different from the magnetometer, the absolute heading to be used as a second reference;
iv) make a determination of sufficient space coverage using at least the absolute heading, wherein the determination of sufficient space coverage comprises at least angular separation values in a heading domain; and
v) based at least in part on the determination of sufficient space coverage, calibrate the magnetometer by calculating calibration parameters when the sufficient space coverage is available, wherein the calculation of calibration parameters comprises calculating error parameters in the magnetometer readings using a relationship between at least the earth magnetic field information, the magnetometer readings, the absolute heading from the source of absolute navigational information that is different from the magnetometer, and the error parameters in the magnetometer readings.

13. The device of claim 12, wherein the processor is operative to perform 2-dimensional magnetometer calibration; wherein the earth magnetic field information is horizontal earth magnetic field information; and wherein the 2-dimensional calibration uses a relationship between the horizontal earth magnetic field information, the magnetometer readings, the absolute heading, and the calibration parameters.

14. The device of any one of claim 12 or 13, wherein the magnetometer is a two-axial magnetometer.

15. The device of claim 14, further comprising any one or any combination of:
(i) wherein the magnetometer is part of a plurality of sensors; or
(ii) wherein the device further comprises a receiver for receiving absolute navigational information about the device from an external source.

16. The device of claim 12, wherein the processor is operative to perform 3-dimensional magnetometer calibration utilizing 2-dimensional calibration and different sectors covering pitch and roll angles, wherein each sector comprises a range of at least one of pitch and roll; wherein the earth magnetic field information is horizontal earth magnetic field information; wherein the processor is further operative to obtain pitch and roll angles; wherein the processor is further operative to use the pitch and roll angles to level the magnetometer readings; wherein the processor is further operative to use the pitch and roll angles to determine the current sector; wherein the determination of sufficient space coverage for the current sector uses the heading information, and wherein the 2-dimensional calibration for the current sector uses a relationship between the horizontal earth magnetic field information, the levelled magnetometer readings, the absolute heading, and the calibration parameters.

17. The device of claim 12, wherein the processor is operative to perform 3-dimensional magnetometer calibration utilizing the heading information from a source different from the magnetometer; wherein the processor is further operative to obtain pitch and roll angles; wherein the determination of sufficient space coverage further uses one or both of the pitch and roll angles, and wherein the 3-dimensional calibration uses a relationship between the earth magnetic field information, the magnetometer readings, the pitch and roll angles, the absolute heading, and the calibration parameters.

18. The device of claim 12, wherein the processor is operative to perform 3-dimensional magnetometer calibration utilizing gravity acceleration; wherein the processor is further operative obtain gravity acceleration; wherein the processor is further operative to obtain pitch and roll angles; wherein the determination of sufficient space coverage further uses the pitch and roll angles, and wherein the 3-dimensional calibration uses a relationship between the earth magnetic field information, the magnetometer readings, the pitch and roll angles, the gravity acceleration, and the calibration parameters.

19. The device of claim 12, wherein the processor is operative to perform 3-dimensional magnetometer calibration; and wherein the processor is operative to utilize any one or any combination of the following:

(i) 2-dimensional calibration use of different sectors covering pitch and roll angles wherein each sector comprises a range of at least one of pitch and roll;
(ii) 3-dimensional calibration using the absolute heading from the source of absolute navigational information that is different from the magnetometer; or
(iii) 3-dimensional calibration using gravity acceleration.

20. The device of any one of claim 12, 13, 16, 17, 18 or 19, wherein the magnetometer is a tri-axial magnetometer.

21. The device of claim 20, further comprising any one or any combination of:
(i) wherein the magnetometer is part of a plurality of sensors; or
(ii) wherein the device further comprises a receiver for receiving absolute navigational information about the device from an external source.

22. The device of any one of claim 12, 13, 16, 17, 18 or 19, further comprising any one or any combination of:
(i) wherein the magnetometer is part of a plurality of sensors; or
(ii) wherein the device further comprises a receiver for receiving absolute navigational information about the device from an external source.

\* \* \* \* \*